(12) United States Patent
Marlow et al.

(10) Patent No.: US 10,536,163 B2
(45) Date of Patent: Jan. 14, 2020

(54) DATA PROCESSING METHOD AND APPARATUS

(71) Applicant: SISP Technologies Ltd., London (GB)

(72) Inventors: Stuart Marlow, London (GB); Nicholas Stavrinou, London (GB)

(73) Assignee: SISP Technologies Ltd., London (GB)

( * ) Notice: Subject to any disclaimer, the term of this patent is extended or adjusted under 35 U.S.C. 154(b) by 0 days.

(21) Appl. No.: 16/314,868

(22) PCT Filed: Jul. 4, 2017

(86) PCT No.: PCT/GB2017/051979
§ 371 (c)(1),
(2) Date: Jan. 3, 2019

(87) PCT Pub. No.: WO2018/007809
PCT Pub. Date: Jan. 11, 2018

(65) Prior Publication Data
US 2019/0312586 A1   Oct. 10, 2019

Related U.S. Application Data
(63) Continuation-in-part of application No. PCT/GB2016/052020, filed on Jul. 4, 2016.

(30) Foreign Application Priority Data

Jan. 4, 2017 (GB) .................................. 1700081.1

(51) Int. Cl.
*H03M 7/30* (2006.01)
*G06F 21/60* (2013.01)
(52) U.S. Cl.
CPC ........ *H03M 7/3064* (2013.01); *G06F 21/602* (2013.01); *H03M 7/3095* (2013.01)

(58) Field of Classification Search
None
See application file for complete search history.

(56) References Cited

U.S. PATENT DOCUMENTS

| | | | |
|---|---|---|---|
| 4,516,246 A * | 5/1985 | Kenemuth | H03M 7/40 341/107 |
| 5,594,435 A | 1/1997 | Remillard | |

(Continued)

FOREIGN PATENT DOCUMENTS

| | | |
|---|---|---|
| GB | 2510198 | 7/2014 |
| GB | 2523348 | 8/2015 |

(Continued)

OTHER PUBLICATIONS

International Search Report and the Written Opinion dated Sep. 22, 2017 From the International Searching Authority Re. Application No. PCT/GB2017/051979. (17 Pages).

(Continued)

*Primary Examiner* — Howard Williams

(57) ABSTRACT

A method of compression is disclosed in which an input sequence of bits is divided into a plurality of portions. Each portion is sub-divided into a plurality of sub-divisions. Frequency analysis is performed to determine the number of occurrences of each sub-division permutation and a processed sequence of bits is generated based on the frequency analysis. The processed sequence of bits includes extraction information for use in reconstructing said input sequence of bits from said processed sequence of bits. The extraction information comprises sub-division order information identifying an ordered sequence comprising each possible sub-division permutation arranged in order of how many times, within said input sequence of bits, a portion comprises a sub-division having bits arranged in that possible sub-division permutation. The sub-division order information includes an index value representing the order of the corre- (Continued)

sponding ordered sequence, based on a preconfigured mapping between said index value and the order of the corresponding ordered sequence.

14 Claims, 43 Drawing Sheets

(56) References Cited

U.S. PATENT DOCUMENTS

| | | | |
|---|---|---|---|
| 6,040,790 | A | 3/2000 | Law |
| 6,304,601 | B1 | 10/2001 | Davison |
| 6,618,506 | B1 | 9/2003 | Auerbach et al. |
| 6,667,700 | B1 | 12/2003 | McCanne et al. |
| 7,773,634 | B1 | 8/2010 | Machiraju |
| 10,090,856 | B2 | 10/2018 | Marpe et al. |
| 2002/0021754 | A1 | 2/2002 | Pian et al. |
| 2018/0191372 | A1 | 7/2018 | Marlow et al. |
| 2019/0013825 | A1 * | 1/2019 | Chan ................ H03M 7/55 |

FOREIGN PATENT DOCUMENTS

| | | | | |
|---|---|---|---|---|
| GB | 2539966 | | 1/2017 | |
| GB | 2553865 | | 3/2018 | |
| WO | WO-2006134521 | A1 * | 12/2006 | ............ H03M 7/40 |
| WO | WO 2017/006103 | | 1/2017 | |
| WO | WO 2018/007809 | | 1/2018 | |

OTHER PUBLICATIONS

International Search Report dated Sep. 9, 2016 From the International Searching Authority Re. Application No. PCT/GB2016/052020. (5 Pages).

Patents Act 1977: Examination Report Under Section 18(3) dated Sep. 6, 2016 From the Intellectual Property Office of the United Kingdom of Great Britain Re. Application No. GB1511740.1. (4 Pages).

Patents Act 1977: Search Report Under Section 17(5) dated Dec. 7, 2017 From the Intellectual Property Office of the United Kingdom of Great Britain Re. Application No. GB1700081.1. (3 Pages).

Patents Act 1977: Search Report Under Section 17(5) Dated 21 Jan. 2016 From the Intellectual Property Office of the United Kingdom of Great Britain Re. Application No. GB1511740.1. (5 Pages).

Patents Act 1977: Search Report Under Section 17(5) dated Jan. 23, 2017 From the Intellectual Property Office of the United Kingdom of Great Britain Re. Application No. GB1618768.4. (4 Pages).

Patents Act 1977: Search Report Under Section 17(6) dated Sep. 6, 2016 From the Intellectual Property Office of the United Kingdom of Great Britain Re. Application No. GB1511740.1. (2 Pages).

Govindan et al. "IDBE—An Intelligent Dictionary Based Encoding Algorithm for Text Data Compression for High Speed Data Transmission Over Internet", arXiv Preprint cs/0601077, XP002761046, 8 P., Jan. 17, 2006.

Jain et al. "Improving Data Compression Ratio by the Use of Optimality of LZW & Adaptive Huffman Algorithm (OLZWH)", International Journal on Information Theory, IJIT, XP002761045, 4(1): 11-19, Jan. 2015.

Mannan et al. "Block Huffman Coding", Computers and Mathematics With Applications, XP002761047, 46(10-11): 1581-1587, Nov. 2003.

Salomon "Huffman Coding", Data Compression, XP002773662, 3rd Ed., I(2.8): 68-69, 2004.

Szpankowski et al. "Minimum Expected Length of Fixed-to-Variable Lossless Compression to Memoryless Sources", IEEE Transactions of Information Theory, XP002761044, 57(7): 4017-4025, Jul. 2011. p. 1.

Unknown "Dictionay Techniques", Dictionay Techniques, XP0027610:2, Poster Slide Show, Retrieved From the Internet, Chap.5: 1-55, 2008. p. 4-5.

* cited by examiner

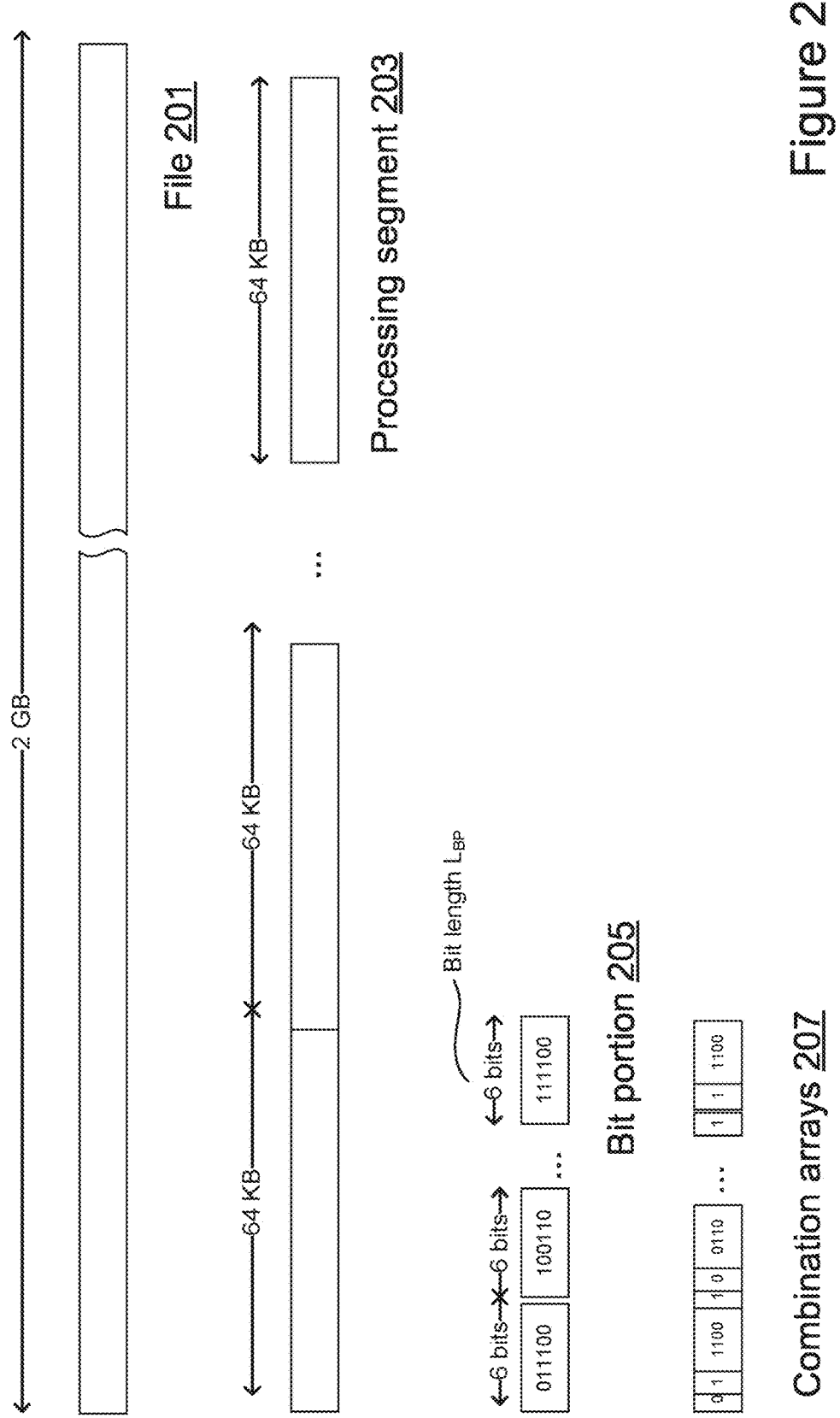

$L_{BP} = 2$    Frequency analysis of bit portion values having a bit length of 2 bits

| | Ranking | Bit portion value | Number of occurences | Level |
|---|---|---|---|---|
| Most occuring | 0 | 0 1 | 65,538 | |
| | 1 | 1 1 | 65,537 | 1st Level |
| ↓ | 2 | 1 0 | 65,536 | |
| Least occuring | 3 | 0 0 | 65,533 | |

Total number of 2-bit portions: 262144

Total number of levels: 1

Figure 3B

More than 50% of elements in use

---

$L_{BP} = 3$    Frequency analysis of bit portion values having a bit length of 3 bits

| | Ranking | Bit portion value | Number of occurances | Occurrence-based Level |
|---|---|---|---|---|
| Most occurring | 0 | 0 1 1 | 21,851 | |
| | 1 | 0 0 1 | 21,849 | |
| | 2 | 0 0 0 | 21,848 | |
| | 3 | 0 1 0 | 21,847 | |
| | 4 | 1 0 0 | 21,846 | Level 0 |
| | 5 | 1 1 1 | 21,845 | |
| | 6 | 1 1 0 | 21,844 | |
| Least occurring | 7 | 1 0 1 | 21,833 | |

Total number of 3-bit portions: 174763

Total number of levels: 1

Figure 3C

More than 50% of elements in use $L_{BP} = 7$   Bit portion values having a bit length of 7 bits

| Ranking ↓ | Bit portion value ↓ | Number of occurances ↓ | Level ↓ |
|---|---|---|---|
| 0 | 1 1 1 0 0 0 1 | 8,331 | |
| 1 | 1 1 0 1 0 1 1 | 8,330 | |
| 2 | 1 1 0 0 0 1 1 | 8,329 | |
| 3 | 1 1 1 1 0 0 1 | 8,329 | |
| 4 | 1 0 0 1 1 1 1 | 8,327 | Level 0 |
| 5 | 1 1 0 0 0 0 0 | 8,326 | |
| 6 | 1 1 0 0 1 0 1 | 8,325 | |
| 7 | 0 1 0 1 0 0 0 | 8,324 | |
| 8 | 1 1 0 1 1 0 1 | 8,278 | |
| 9 | 0 0 0 1 0 0 1 | 0 | |
| 10 | 0 0 0 1 0 1 0 | 0 | |
| 11 | 0 0 0 1 0 1 1 | 0 | |
| 12 | 0 0 0 1 1 0 0 | 0 | |
| 13 | 0 0 0 1 1 0 1 | 0 | |
| 14 | 0 0 0 1 1 1 0 | 0 | |
| 15 | 0 0 0 1 1 1 1 | 0 | |
| ⋮ | ⋮ | ⋮ | |
| 40 | 0 0 0 0 1 1 1 | 0 | |
| ⋮ | ⋮ | ⋮ | |
| 113 | 0 0 0 0 0 0 0 | 0 | |
| ⋮ | ⋮ | ⋮ | |
| 127 | 1 1 1 1 1 1 1 | 0 | |

Most occurring ↓ Least occurring

Total number of 7 bit occurrences: 74,899

Total number of levels: 1

Figure 4B

Fewer than 50% of elements in use

Frequency analysis of bit portion values having a bit length of 4 bits $L_{BP} = 4$

| Ranking | Bit Portion value | Number of occurrences | Occurrence-based Level (total occurrences) | Occurrence-based New BP Value | New BP value in binary | Disambiguation value in binary | Initial label 403 | Occurrence-based Label size | No. of bits used |
|---|---|---|---|---|---|---|---|---|---|
| 0 | 0 0 0 1 | 27369 | Level 0 (64539) | 0 | 000 | - | 000 | 3 bits | 193617 |
| 1 | 1 0 1 1 | 18629 | | 1 | 001 | - | 001 | | |
| 2 | 0 0 1 1 | 18541 | | 2 | 010 | - | 010 | | |
| 3 | 1 0 0 1 | 12646 | Level 1 (38803) | 3 | 011 | 0 | 0110 | 4 bits | 155212 |
| 4 | 1 1 1 1 | 11079 | | 3 | 011 | 1 | 0111 | | |
| 5 | 0 0 0 0 | 7900 | | 4 | 100 | 0 | 1000 | | |
| 6 | 0 1 0 1 | 7178 | | 4 | 100 | 1 | 1001 | | |
| 7 | 1 0 0 0 | 3923 | Level 2 (27730) | 5 | 101 | 00 | 10100 | 5 bits | 128840 |
| 8 | 1 1 0 1 | 3857 | | 5 | 101 | 01 | 10101 | | |
| 9 | 0 1 1 1 | 3658 | | 5 | 101 | 10 | 10110 | | |
| 10 | 0 0 1 0 | 3414 | | 5 | 101 | 11 | 10111 | | |
| 11 | 1 1 0 0 | 3169 | | 6 | 110 | 00 | 11000 | | |
| 12 | 0 1 0 0 | 3074 | | 6 | 110 | 01 | 11001 | | |
| 13 | 1 0 1 0 | 2605 | | 6 | 110 | 10 | 11010 | | |
| 14 | 0 1 1 0 | 2068 | | 6 | 110 | 11 | 11011 | | |
| 15 | 1 1 1 0 | 1962 | | 7 | 111 | - | 111 | 3 bits | 5886 |

Total number of bits analysed: 524288

Total number of 4-bit portions: 131072

Total number of bits used: 483555

Most occurring → Least occurring

Figure 5B

Frequency analysis of bit portion values having a bit length of 4 bits $L_{BP} = 4$

| Ranking | Bit Portion value | Number of occurrences | Occurrence-based Level | Optimised Level (total occurrences) | New Value | New value in binary | Disambiguation value in binary | Initial label 402 | Optimised initial label size | No. of bits used |
|---|---|---|---|---|---|---|---|---|---|---|
| 0 | 0 0 0 1 | 27369 | | Level 0 (77185) | 0 | 000 | - | 000 | 3 bits | 231555 |
| 1 | 1 0 1 1 | 18629 | | | 1 | 001 | - | 001 | | |
| 2 | 0 0 1 1 | 18541 | | | 2 | 010 | - | 010 | | |
| 3 | 1 0 0 1 | 12646 | | | 3 | 011 | - | 011 | | |
| 4 | 1 1 1 1 | 11079 | | Level 1 (30303) | 4 | 100 | 0 | 1000 | 4 bits | 121212 |
| 5 | 0 0 0 0 | 7900 | | | 4 | 100 | 1 | 1001 | | |
| 6 | 0 1 0 1 | 7178 | | | 5 | 101 | 0 | 1010 | | |
| 7 | 1 0 0 0 | 4146 | | | 5 | 101 | 1 | 1011 | | |
| 8 | 1 1 0 1 | 3857 | | Level 2 (23584) | 6 | 110 | 00 | 11000 | 5 bits | 117920 |
| 9 | 0 1 1 1 | 3658 | | | 6 | 110 | 01 | 11001 | | |
| 10 | 0 0 1 0 | 3191 | | | 6 | 110 | 10 | 11010 | | |
| 11 | 1 1 0 0 | 3169 | | | 6 | 110 | 11 | 11011 | | |
| 12 | 0 1 0 0 | 3074 | | | 7 | 111 | 00 | 11100 | | |
| 13 | 1 0 1 0 | 2605 | | | 7 | 111 | 01 | 11101 | | |
| 14 | 0 1 1 0 | 2068 | | | 7 | 111 | 10 | 11110 | | |
| 15 | 1 1 1 0 | 1962 | | | 7 | 111 | 11 | 11111 | | |

Total number of bits analysed: 524288

Total number of 4-bit portions: 131072

Total number of bits used: 470687

Most occurring → Least occurring

Figure 5C

| Header Size For 4 Bits | Minimum bits required | Maximum bits required |
|---|---|---|
| Signature | 32 | 32 |
| Bit Length | 5 | 5 |
| CA Configuration | 4 | 4 |
| Level Counts | 64 | 16 |
| CA Value info | 8 | 64 |
| Total Bits | 113 | 121 |

Figure 5D

| | |
|---|---|
| Header | 121 |
| Data | 470687 |
| Total | 470808 |
| In Bytes | 58851 |
| % Compression | 10.20% |

Figure 6B — Frequency analysis of 1st combination arrays ($L_{BP}=6$, $CA_0$)

| Ranking | | CA Value | Number of occurances | Occurrence-based Level |
|---|---|---|---|---|
| Most occurring | 0 | 0 1 0 | 30,000 | Level 0 |
| | 1 | 0 0 0 | 20,000 | |
| | 2 | 0 0 1 | 9,000 | Level 1 |
| | 3 | 0 1 1 | 8,000 | |
| | 4 | 1 0 1 | 8,000 | |
| | 5 | 1 1 0 | 4,400 | |
| | 6 | 1 1 1 | 4,001 | Level 2 |
| Least occurring | 7 | 1 0 0 | 3,981 | |

Total number of 3-bit portions: 87382
Total number of levels: 3

Figure 6C — Frequency analysis of 2nd combination arrays ($L_{BP}=6$, $CA_1$)

| Ranking | | CA Value | Number of occurances | Occurrence-based Level |
|---|---|---|---|---|
| Most occurring | 0 | 0 1 1 | 49,940 | Level 0 |
| | 1 | 0 0 1 | 8,752 | |
| | 2 | 0 0 0 | 6,240 | Level 1 |
| | 3 | 0 1 0 | 5,251 | |
| | 4 | 1 0 0 | 4,727 | |
| | 5 | 1 1 1 | 4,375 | |
| | 6 | 1 1 0 | 4,158 | Level 2 |
| Least occurring | 7 | 1 0 1 | 3,938 | |

Total number of 3-bit portions: 87382
Total number of levels: 3

Frequency analysis of 1st combination arrays

$CA_0$

| Ranking | CA Value | Number of occurances | Occurrence-based Level | Optimised Level | Initial Value 690 | New CA Value 701 | Instance | Disambiguation value 703 |
|---|---|---|---|---|---|---|---|---|
| 0 | 0 1 0 | 30,000 | Level 0 | Level 0 | 0 | 0 | 0 | - |
| 1 | 0 0 0 | 20,000 |  |  | 1 | 1 | 0 | - |
| 2 | 0 0 1 | 9,000 | Level 1 | Level 1 | 2 | 2 | 0 | 0 |
| 3 | 0 1 1 | 8,000 |  |  | 2 | 2 | 1 | 1 |
| 4 | 1 0 0 | 8,000 | Level 2 | Level 2 | 3 | 3 | 0 | 0 |
| 5 | 1 1 0 | 4,400 |  |  | 3 | 3 | 1 | 1 |
| 6 | 1 1 1 | 4,001 |  |  | 3 | 3 | 2 | 2 |
| 7 | 1 0 0 | 3,981 |  |  | 3 | 3 | 3 | 3 |

Most occurring → Least occurring

Total number of levels: 3

Total number of 3-bit portions: 87382

Figure 7A

Frequency analysis of 2nd combination arrays

$CA_1$

| Ranking | CA Value | Number of occurances | Occurrence-based Level | Optimised Level | Initial Value 690 | New CA Value 701 | Instance | Disambiguation value 703 combining with level 0 of $CA_0$ | combining with level 1 of $CA_0$ | combining with level 2 of $CA_0$ |
|---|---|---|---|---|---|---|---|---|---|---|
| 0 | 0 1 1 | 49,940 | Level 0 | Level 0 | 0 | 0 | 0 | - | - | - |
| 1 | 0 0 1 | 8,752 |  |  | 1 | 4 | 0 | 0 | 0 | 0 |
| 2 | 0 0 0 | 6,240 | Level 1 | Level 1 | 2 | 8 | 0 | 0 | 2 | 4 |
| 3 | 0 1 0 | 5,251 |  |  | 2 | 8 | 1 | 1 | 0 | 0 |
| 4 | 1 0 0 | 4,727 | Level 2 | Level 2 | 3 | 12 | 0 | 0 | 2 | 4 |
| 5 | 1 1 1 | 4,375 |  |  | 3 | 12 | 1 | 1 | 4 | 8 |
| 6 | 1 1 0 | 4,158 |  |  | 3 | 12 | 2 | 2 | 6 | 12 |
| 7 | 1 0 1 | 3,938 |  |  | 3 | 12 | 3 | 3 | - | - |

Most occurring → Least occurring

Total number of levels: 3

Total number of 3-bit portions: 87382

Figure 7B

|  | New CA$_1$ Values | | | |
|---|---|---|---|---|
|  | 0 | 4 | 8 | 12 |
| New CA$_0$ Values  0 | 0 | 4 | 8 | 12 |
| 1 | 1 | 5 | 9 | 13 |
| 2 | 2 | 6 | 10 | 14 |
| 3 | 3 | 7 | 11 | 15 |

Combined New CA Values

Figure 8A

|  | New CA$_1$ Values | | | |
|---|---|---|---|---|
|  | 0 | 4 | 8 | 12 |
| New CA$_0$ Values  0 | 0000 | 0100 | 1000 | 1100 |
| 1 | 0001 | 0101 | 1001 | 1101 |
| 2 | 0010 | 0110 | 1010 | 1110 |
| 3 | 0011 | 0111 | 1011 | 1111 |

Combined New CA Values in binary

Figure 8B

|  | New CA$_1$ Values | | | | | |
|---|---|---|---|---|---|---|
|  | $Y_0$ | $Y_1$ | $Y_2$ | $Y_3$ | ... | $Y_n$ |
| New CA$_0$ Values  $X_0$ | $X_0+Y_0$ | $X_0+Y_1$ | $X_0+Y_2$ | $X_0+Y_3$ | ... | $X_0+Y_n$ |
| $X_1$ | $X_1+Y_0$ | $X_1+Y_1$ | $X_1+Y_2$ | $X_1+Y_3$ | ... | $X_1+Y_n$ |
| $X_2$ | $X_2+Y_0$ | $X_2+Y_1$ | $X_2+Y_2$ | $X_2+Y_3$ | ... | $X_2+Y_n$ |
| $X_3$ | $X_3+Y_0$ | $X_3+Y_1$ | $X_3+Y_2$ | $X_3+Y_3$ | ... | $X_3+Y_n$ |
| ... | ... | ... | ... | ... | ... | ... |
| $X_n$ | $X_n+Y_0$ | $X_n+Y_1$ | $X_n+Y_2$ | $X_n+Y_3$ | ... | $X_n+Y_n$ |

Combined New CA Values using addition

Figure 8C

|  | New CA$_1$ Values | | | | |
|---|---|---|---|---|---|
|  | $y_0$ | $y_1$ | $y_2$ | $y_3$ | $y_4$ |
| New CA$_0$ Values  $x_0$ | $z_0$ | $z_1$ | $z_2$ | $z_3$ | $z_4$ |
| $x_1$ | $z_5$ | $z_6$ | $z_7$ | $z_8$ | $z_9$ |
| $x_2$ | $z_{10}$ | $z_{11}$ | $z_{12}$ | $z_{13}$ | $z_{14}$ |
| $x_3$ | $z_{15}$ | $z_{16}$ | $z_{17}$ | $z_{18}$ | $z_{19}$ |

Combined New CA Values

| Label outputs using CA configuration [3,3,0,0,0,0] (No Occurrence Sort) ||||||||
|---|---|---|---|---|---|---|---|
| Value | Bit portion | CA0 | CA1 | Label | Value | Bit portion | CA0 | CA1 | Label |
| 0 | 000000 | 000 | 000 | 10010 | 32 | 100000 | 100 | 000 | 1011011 |
| 1 | 000001 | 000 | 001 | 0101 | 33 | 100001 | 100 | 001 | 011111 |
| 2 | 000010 | 000 | 010 | 10011 | 34 | 100010 | 100 | 010 | 1011111 |
| 3 | 000011 | 000 | 011 | 0001 | 35 | 100011 | 100 | 011 | 001111 |
| 4 | 000100 | 000 | 100 | 110100 | 36 | 100100 | 100 | 100 | 11110011 |
| 5 | 000101 | 000 | 101 | 110111 | 37 | 100101 | 100 | 101 | 11111111 |
| 6 | 000110 | 000 | 110 | 110110 | 38 | 100110 | 100 | 110 | 11111011 |
| 7 | 000111 | 000 | 111 | 110101 | 39 | 100111 | 100 | 111 | 11110111 |
| 8 | 001000 | 001 | 000 | 101000 | 40 | 101000 | 101 | 000 | 1011000 |
| 9 | 001001 | 001 | 001 | 01100 | 41 | 101001 | 101 | 001 | 011100 |
| 10 | 001010 | 001 | 010 | 101010 | 42 | 101010 | 101 | 010 | 1011100 |
| 11 | 001011 | 001 | 011 | 00100 | 43 | 101011 | 101 | 011 | 001100 |
| 12 | 001100 | 001 | 100 | 1110000 | 44 | 101100 | 101 | 100 | 11110000 |
| 13 | 001101 | 001 | 101 | 1110110 | 45 | 101101 | 101 | 101 | 11111100 |
| 14 | 001110 | 001 | 110 | 1110100 | 46 | 101110 | 101 | 110 | 11111000 |
| 15 | 001111 | 001 | 111 | 1110010 | 47 | 101111 | 101 | 111 | 11110100 |
| 16 | 010000 | 010 | 000 | 10000 | 48 | 110000 | 110 | 000 | 1011001 |
| 17 | 010001 | 010 | 001 | 01000 | 49 | 110001 | 110 | 001 | 011101 |
| 18 | 010010 | 010 | 010 | 10001 | 50 | 110010 | 110 | 010 | 1011101 |
| 19 | 010011 | 010 | 011 | 0000 | 51 | 110011 | 110 | 011 | 001101 |
| 20 | 010100 | 010 | 100 | 110000 | 52 | 110100 | 110 | 100 | 11110001 |
| 21 | 010101 | 010 | 101 | 110011 | 53 | 110101 | 110 | 101 | 11111101 |
| 22 | 010110 | 010 | 110 | 110010 | 54 | 110110 | 110 | 110 | 11111001 |
| 23 | 010111 | 010 | 111 | 110001 | 55 | 110111 | 110 | 111 | 11110101 |
| 24 | 011000 | 011 | 000 | 101001 | 56 | 111000 | 111 | 000 | 1011010 |
| 25 | 011001 | 011 | 001 | 01011 | 57 | 111001 | 111 | 001 | 011110 |
| 26 | 011010 | 011 | 010 | 101011 | 58 | 111010 | 111 | 010 | 1011110 |
| 27 | 011011 | 011 | 011 | 00101 | 59 | 111011 | 111 | 011 | 001110 |
| 28 | 011100 | 011 | 100 | 1110001 | 60 | 111100 | 111 | 100 | 11110010 |
| 29 | 011101 | 011 | 101 | 1110111 | 61 | 111101 | 111 | 101 | 11111110 |
| 30 | 011110 | 011 | 110 | 1110101 | 62 | 111110 | 111 | 110 | 11111010 |
| 31 | 011111 | 011 | 111 | 1110011 | 63 | 111111 | 111 | 111 | 11110110 |

Figure 11

| CA₀ - 5 Bits | | | CA₀ - 3 Bits | | |
|---|---|---|---|---|---|
| Original | Original CA Value (Binary) | New CA value | Original | Original CA Value (Binary) | New CA value |
| 0 | 00000 | 0 | 0 | 000 | 0 |
| 1 | 00001 | 1 | 1 | 001 | 16 |
| 2 | 00010 | 2 | 2 | 010 | 32 |
| 3 | 00011 | 3 | 3 | 011 | 32 |
| 4 | 00100 | 4 | 4 | 100 | 48 |
| 5 | 00101 | 4 | 5 | 101 | 48 |
| 6 | 00110 | 5 | 6 | 110 | 48 |
| 7 | 00111 | 5 | 7 | 111 | 48 |
| 8 | 01000 | 6 | | | |
| 9 | 01001 | 6 | | | |
| 10 | 01010 | 7 | | | |
| 11 | 01011 | 7 | | | |
| 12 | 01100 | 8 | | | |
| 13 | 01101 | 8 | | | |
| 14 | 01110 | 9 | | | |
| 15 | 01111 | 9 | | | |
| 16 | 10000 | 10 | | | |
| 17 | 10001 | 10 | | | |
| 18 | 10010 | 11 | | | |
| 19 | 10011 | 11 | | | |
| 20 | 10100 | 12 | | | |
| 21 | 10101 | 12 | | | |
| 22 | 10110 | 13 | | | |
| 23 | 10111 | 13 | | | |
| 24 | 11000 | 14 | | | |
| 25 | 11001 | 14 | | | |
| 26 | 11010 | 14 | | | |
| 27 | 11011 | 14 | | | |
| 28 | 11100 | 15 | | | |
| 29 | 11101 | 15 | | | |
| 30 | 11110 | 15 | | | |
| 31 | 11111 | 15 | | | |

Figure 12A

| CA₀ Level | CA₁ Level | Disambiguation Bit Length | Label Bit Length |
|---|---|---|---|
| 0 | 0 | 0 | 6 |
| 0 | 1 | 1 | 7 |
| 0 | 2 | 2 | 8 |
| 1 | 0 | 1 | 7 |
| 1 | 1 | 2 | 8 |
| 1 | 2 | 3 | 9 |
| 2 | 0 | 2 | 8 |
| 2 | 1 | 3 | 9 |
| 2 | 2 | 4 | 10 |

Figure 12B

| 5 Bits | | | 3 Bits | | |
|---|---|---|---|---|---|
| Original | Original CA Value (Binary) | New CA Value | Original | Original CA Value (Binary) | New CA Value |
| 0 | 00000 | 0 | 0 | 000 | 0 |
| 1 | 00001 | 1 | 1 | 001 | 8 |
| 2 | 00010 | 2 | 2 | 010 | 16 |
| 3 | 00011 | 2 | 3 | 011 | 16 |
| 4 | 00100 | 3 | 4 | 100 | 24 |
| 5 | 00101 | 3 | 5 | 101 | 24 |
| 6 | 00110 | 3 | 6 | 110 | 24 |
| 7 | 00111 | 3 | 7 | 111 | 24 |
| 8 | 01000 | 4 | | | |
| 9 | 01001 | 4 | | | |
| 10 | 01010 | 4 | | | |
| 11 | 01011 | 4 | | | |
| 12 | 01100 | 5 | | | |
| 13 | 01101 | 5 | | | |
| 14 | 01110 | 5 | | | |
| 15 | 01111 | 5 | | | |
| 16 | 10000 | 6 | | | |
| 17 | 10001 | 6 | | | |
| 18 | 10010 | 6 | | | |
| 19 | 10011 | 6 | | | |
| 20 | 10100 | 6 | | | |
| 21 | 10101 | 6 | | | |
| 22 | 10110 | 6 | | | |
| 23 | 10111 | 6 | | | |
| 24 | 11000 | 7 | | | |
| 25 | 11001 | 7 | | | |
| 26 | 11010 | 7 | | | |
| 27 | 11011 | 7 | | | |
| 28 | 11100 | 7 | | | |
| 29 | 11101 | 7 | | | |
| 30 | 11110 | 7 | | | |
| 31 | 11111 | 7 | | | |

Figure 12C

| $CA_0$ Level | $CA_1$ Level | Disambiguation Bit Length | Label Bit Length |
|---|---|---|---|
| 0 | 0 | 0 | 5 |
| 0 | 1 | 1 | 6 |
| 0 | 2 | 2 | 7 |
| 1 | 1 | 0 | 6 |
| 1 | 1 | 1 | 7 |
| 1 | 2 | 2 | 8 |
| 2 | 2 | 0 | 7 |
| 2 | 2 | 1 | 8 |
| 2 | 2 | 2 | 9 |
| 3 | 3 | 0 | 8 |
| 3 | 3 | 1 | 9 |
| 3 | 3 | 2 | 10 |

Figure 12D

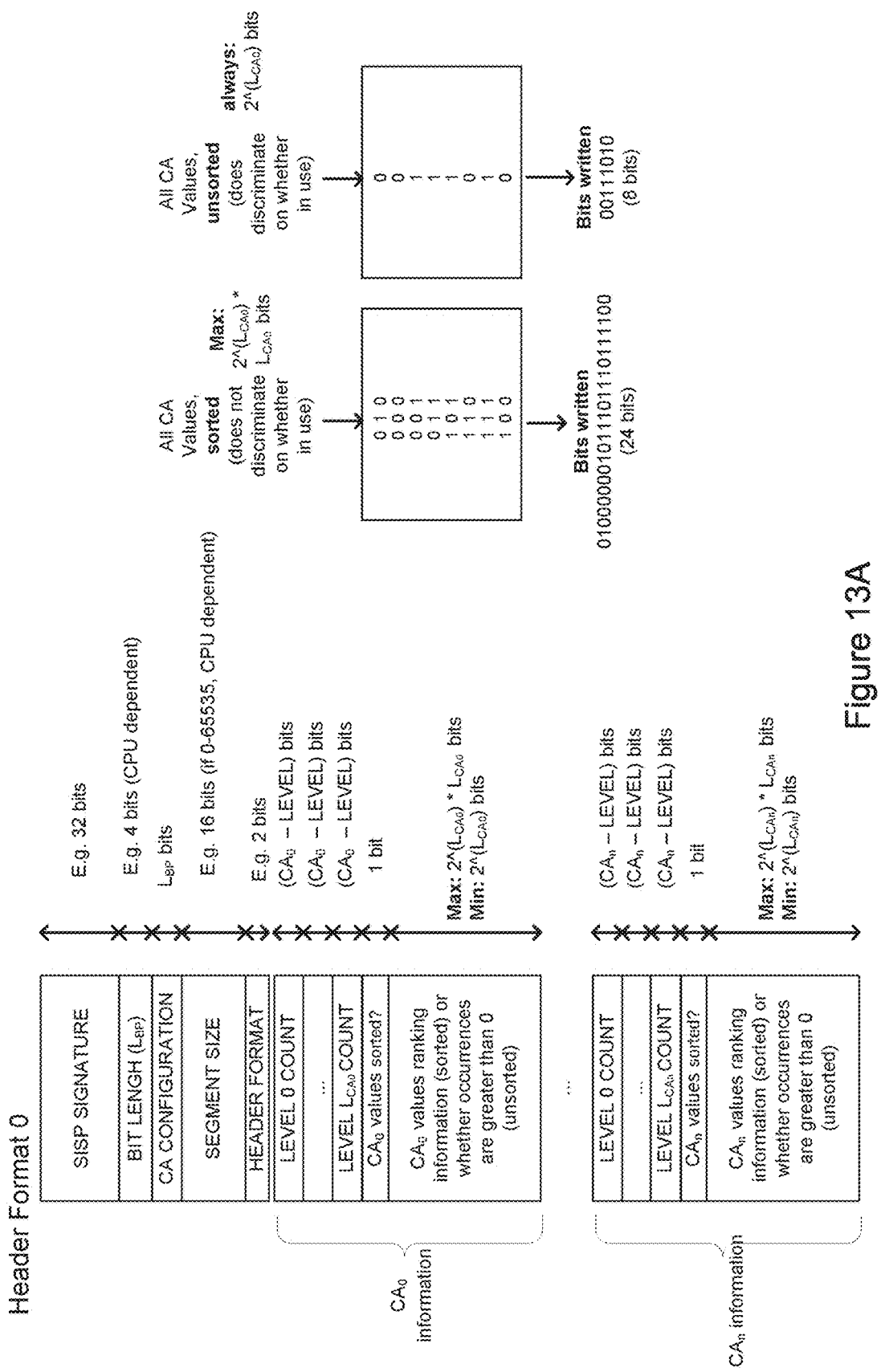

| Number of BP values/CA values in processing segment with an occurrence greater than 0 | Target Maximum CA/BP Value |
|---|---|
| 1 | 1 |
| 2 | 1 |
| 3 | 1 |
| 4 | 3 |
| 5 | 3 |
| 6 | 3 |
| 7 | 3 |
| 8 | 3 |
| 9 | 3 |
| 10 | 3 |
| 11 | 3 |
| 12 | 3 |
| 13 | 3 |
| 14 | 3 |
| 15 | 3 |
| 16 | 7 |
| 17 | 7 |
| ... | ... |
| 30 | 7 |
| 32 | 7 |
| 33 | 7 |
| ... | ... |
| 64 | 7 |
| ... | ... |
| 127 | 7 |
| 128 | 7 |
| ... | ... |
| 254 | 7 |
| 255 | 7 |
| 256 | 15 |

Figure 14

SISP number

| CAref | CAref in binary | Visual Mask | CA configuration | $L_{BP}$ |
|---|---|---|---|---|
| 1 | 1 | [x] | {1} | 1 |
| 2 | 10 | [x][x] | {1,1} | 2 |
| 3 | 11 | [xx] | {2,0} | 2 |
| 4 | 100 | [x][xx] | {1,2,0} | 3 |
| 5 | 101 | [x][x][x] | {1,1,1} | 3 |
| 6 | 110 | [xx][x] | {2,1,0} | 3 |
| 7 | 111 | [xxx] | {3,0,0} | 3 |
| 8 | 1000 | [x][xxx] | {1,3,0,0} | 4 |
| 9 | 1001 | [x][xx][x] | {1,2,1,0} | 4 |
| 10 | 1010 | [x][x][x][x] | {1,1,1,1} | 4 |
| 11 | 1011 | [x][x][xx] | {1,1,2,0} | 4 |
| 12 | 1100 | [xx][xx] | {2,2,0,0} | 4 |
| 13 | 1101 | [xx][x][x] | {2,1,1,0} | 4 |
| 14 | 1110 | [xxx][x] | {3,1,0,0} | 4 |
| ... | ... | ... | ... | ... |
| 21 | 10101 | [x][x][x][x][x] | {1,1,1,1,1} | 5 |
| 22 | 10110 | [x][x][xx][x] | {1,1,2,1,0} | 5 |
| 23 | 10111 | [x][x][xxx] | {1,1,3,0,0} | 5 |
| 24 | 11000 | [xx][xxx] | {2,3,0,0,0} | 5 |
| 25 | 11001 | [xx][xx][x] | {2,2,1,0,0} | 5 |
| ... | ... | ... | ... | ... |
| 63 | 111111 | [xxxxxx] | {1,1,1,1,1,1} | 6 |
| ... | ... | ... | ... | ... |
| 127 | 1111111 | [xxxxxxx] | {1,1,1,1,1,1,1} | 7 |
| ... | ... | ... | ... | ... |
| 192 | 11000000 | [xx][xxxxxx] | {2,6,0,0,0,0,0,0} | 8 |
| ... | ... | ... | ... | ... |
| 385 | 110000001 | [xx][xxxxxx][x] | {2,6,1,0,0,0,0,0,0} | 9 |
| ... | ... | ... | ... | ... |
| 453 | 111000101 | [xxx][xxx][x][x][x] | {3,3,1,1,1,0,0,0,0} | 9 |
| ... | ... | ... | ... | ... |
| 65535 | 1111111111111111 | [xxxxxxxxxxxxxxxx] | {16,0,0,0,0,0,0,0,0,0,0,0,0,0,0,0} | 16 |

| Byte position | Byte Value | Change in Byte Value |
|---|---|---|
| 0 | 244 | - |
| 1 | 150 | 94 |
| 2 | 210 | 60 |
| 3 | 75 | 135 |
| 4 | 250 | 175 |
| 5 | 121 | 129 |
| 6 | 35 | 86 |
| 7 | 144 | 109 |
| 8 | 49 | 95 |
| 9 | 146 | 97 |
| 10 | 147 | 1 |
| 11 | 148 | 1 |
| 12 | 163 | 15 |
| 13 | 90 | 73 |
| 14 | 119 | 29 |
| 15 | 2 | 117 |
| 16 | 243 | 241 |
| 17 | 67 | 176 |
| 18 | 129 | 62 |
| 19 | 2 | 127 |
| 20 | 200 | 198 |
| 21 | 2 | 198 |
| 22 | 57 | 55 |
| 23 | 76 | 19 |
| 24 | 42 | 34 |
| 25 | 71 | 29 |
| 26 | 185 | 114 |
| 27 | 4 | 181 |
| 28 | 14 | 167 |
| 29 | 48 | 34 |
| 30 | 183 | 135 |
| 31 | 20 | 163 |
| 32 | 81 | 61 |
| 33 | 107 | 26 |
| 34 | 111 | 4 |
| 35 | 53 | 58 |
| 36 | 60 | 7 |
| 37 | 241 | 181 |
| 38 | 8 | 233 |
| 39 | 144 | 136 |
| 40 | 31 | 113 |
| 41 | 87 | 56 |
| 42 | 136 | 49 |
| 43 | 13 | 123 |
| 44 | 192 | 179 |
| 45 | 251 | 59 |
| 46 | 32 | 219 |
| 47 | 107 | 75 |
| 48 | 118 | 11 |
| 49 | 102 | 16 |
| 50 | 4 | 98 |
| 51 | 231 | 227 |
| 52 | 68 | 163 |
| 53 | 24 | 44 |
| 54 | 90 | 66 |
| ... | ... | ... |

Figure 18b

| Byte Value | Byte Value Occurrence | Change in Byte Value Occurrence |
|---|---|---|
| 0 | 122 | - |
| 1 | 260 | 138 |
| 2 | 282 | 22 |
| 3 | 245 | 37 |
| 4 | 251 | 6 |
| 5 | 255 | 4 |
| 6 | 244 | 11 |
| 7 | 263 | 19 |
| 8 | 261 | 2 |
| 9 | 258 | 3 |
| 10 | 251 | 7 |
| 11 | 291 | 40 |
| 12 | 282 | 9 |
| 13 | 265 | 17 |
| 14 | 246 | 19 |
| 15 | 294 | 48 |
| ... | ... | ... |
| 250 | 257 | 12 |
| 251 | 279 | 22 |
| 252 | 241 | 38 |
| 253 | 253 | 12 |
| 254 | 261 | 8 |
| 255 | 127 | 134 |

| CAref | Success 1 | Success 2 | Success 3 | ... | Success 65535 | Success 65536 |
|---|---|---|---|---|---|---|
| 0 | | | | | | |
| 1 | | | | | | |
| 2 | | | | | | |
| 3 | | | | | | |
| 4 | | | | | | |
| ... | | | | | | |
| 2560 | 2560 | | | | | |
| 2561 | | | | | | |
| 2562 | | | | | | |
| 2563 | | | | | | |
| 2564 | | | | | | |
| ... | | | | | | |
| 65531 | | | | | | |
| 65532 | | | | | | |
| 65533 | | | | | | |
| 65534 | | | | | | |
| 65535 | | | | | | |

| CAref | Success 1 | Success 2 | Success 3 | ... | Success 65535 | Success 65536 |
|---|---|---|---|---|---|---|
| 0 | | | | | | |
| 1 | | | | | | |
| 2 | | | | | | |
| 3 | | | | | | |
| 4 | | | | | | |
| ... | | | | | | |
| 2560 | 2560 | | | | | |
| 2561 | | | | | | |
| 2562 | | | | | | |
| 2563 | 2563 | | | | | |
| 2564 | | | | | | |
| ... | | | | | | |
| 65531 | | | | | | |
| 65532 | | | | | | |
| 65533 | | | | | | |
| 65534 | | | | | | |
| 65535 | | | | | | |

| CAref | Success 1 | Success 2 | Success 3 | ... | Success 65535 | Success 65536 |
|---|---|---|---|---|---|---|
| 0 | | | | | | |
| 1 | | | | | | |
| 2 | | | | | | |
| 3 | | | | | | |
| 4 | | | | | | |
| ... | | | | | | |
| 2560 | 2560 | 12780 | | | | |
| 2561 | | | | | | |
| 2562 | | | | | | |
| 2563 | 2563 | | | | | |
| 2564 | | | | | | |
| ... | | | | | | |
| 65531 | | | | | | |
| 65532 | | | | | | |
| 65533 | | | | | | |
| 65534 | | | | | | |
| 65535 | | | | | | |

| CAref | Success 1 | Success 2 | Success 3 | ... | Success 65535 | Success 65536 |
|---|---|---|---|---|---|---|
| 0 | | | | | | |
| 1 | | | | | | |
| 2 | 2 | | | | | |
| 3 | | | | | | |
| 4 | 4 | 11 | | | | |
| ... | | | | | | |
| 2560 | 2560 | 12780 | | | | |
| 2561 | | | | | | |
| 2562 | 2562 | | | | | |
| 2563 | 2563 | | | | | |
| 2564 | | | | | | |
| ... | | | | | | |
| 65531 | 65531 | | | | | |
| 65532 | | | | | | |
| 65533 | 65533 | | | | | |
| 65534 | | | | | | |
| 65535 | | | | | | |

Processing segment 203

0,1,0,1,1,1,0,1,0,1,0,0,1,0,1,1...

↓

| Binary Value | 2 Bit Reps. | 3 Bit Reps. | 4 Bit Reps. | Tally | Recompression Index |
|---|---|---|---|---|---|
| 0000 | 3 | 2 | 1 | 6 | 0 |
| 1111 | 3 | 2 | 1 | 6 | 1 |
| 0001 | 2 | 1 | 0 | 3 | 2 |
| 0111 | 2 | 1 | 0 | 3 | 3 |
| 1000 | 2 | 1 | 0 | 3 | 4 |
| 1110 | 2 | 1 | 0 | 3 | 5 |
| 0011 | 2 | 0 | 0 | 2 | 6 |
| 1100 | 2 | 0 | 0 | 2 | 7 |
| 0010 | 1 | 0 | 0 | 1 | 8 |
| 0100 | 1 | 0 | 0 | 1 | 9 |
| 0110 | 1 | 0 | 0 | 1 | 10 |
| 1001 | 1 | 0 | 0 | 1 | 11 |
| 1011 | 1 | 0 | 0 | 1 | 12 |
| 1101 | 1 | 0 | 0 | 1 | 13 |
| 0101 | 0 | 0 | 0 | 0 | 14 |
| 1010 | 0 | 0 | 0 | 0 | 15 |

Figure 23a

| New CA Values | Standardised Binary | Optimised Binary |
|---|---|---|
| 0 | 0000 | 0000 |
| 1 | 0001 | 1111 |
| 2 | 0010 | 0001 |
| 3 | 0011 | 0111 |
| 4 | 0100 | 1000 |
| 5 | 0101 | 1110 |
| 6 | 0110 | 0011 |
| 7 | 0111 | 1100 |
| 8 | 1000 | 0010 |
| 9 | 1001 | 0100 |
| 10 | 1010 | 0110 |
| 11 | 1011 | 1001 |
| 12 | 1100 | 1011 |
| 13 | 1101 | 1101 |
| 14 | 1110 | 0101 |
| 15 | 1111 | 1010 |

Figure 23b

| Binary Value | 2 Bit Reps. | 3 Bit Reps. | 4 Bit Reps. | 5 Bit Reps. | 6 Bit Reps. | Repetition Tally | Recompression Index |
|---|---|---|---|---|---|---|---|
| 000000 | 5 | 4 | 3 | 2 | 1 | 15 | 0 |
| 111111 | 5 | 4 | 3 | 2 | 1 | 15 | 1 |
| 000001 | 4 | 3 | 2 | 1 | 0 | 10 | 2 |
| 011111 | 4 | 3 | 2 | 1 | 0 | 10 | 3 |
| 100000 | 4 | 3 | 2 | 1 | 0 | 10 | 4 |
| 111110 | 4 | 3 | 2 | 1 | 0 | 10 | 5 |
| 000011 | 4 | 2 | 1 | 0 | 0 | 7 | 6 |
| 001111 | 4 | 2 | 1 | 0 | 0 | 7 | 7 |
| 110000 | 4 | 2 | 1 | 0 | 0 | 7 | 8 |
| ... | ... | ... | ... | ... | ... | ... | ... |
| 101101 | 1 | 0 | 0 | 0 | 0 | 1 | 59 |
| 110010 | 1 | 0 | 0 | 0 | 0 | 1 | 60 |
| 110101 | 1 | 0 | 0 | 0 | 0 | 1 | 61 |
| 010101 | 0 | 0 | 0 | 0 | 0 | 0 | 62 |
| 101010 | 0 | 0 | 0 | 0 | 0 | 0 | 63 |

Figure 24a

| New CA Values | Optimised Binary |
|---|---|
| 0 | 000000 |
| 1 | 111111 |
| 2 | 000001 |
| 3 | 011111 |
| 4 | 100000 |
| 5 | 111110 |
| 6 | 000011 |
| 7 | 001111 |
| 8 | 110000 |
| ... | ... |
| 59 | 101101 |
| 60 | 110010 |
| 61 | 110101 |
| 62 | 010101 |
| 63 | 101010 |

| Binary Value | Occurrence |
|---|---|
| 000 | 21968 |
| 001 | 21879 |
| 010 | 21837 |
| 011 | 21891 |
| 100 | 21874 |
| 101 | 21995 |
| 110 | 21729 |
| 111 | 21590 |

| Binary Value | Occurrence |
|---|---|
| ... | ... |
| 0001 | 7958 |
| ... | ... |
| 1000 | 8367 |
| ... | ... |
| 1010 | 8397 |
| ... | ... |
| 1111 | 7837 |

| Binary Value | Occurrence |
|---|---|
| ... | ... |
| 00011 | 3347 |
| 00100 | 3344 |
| ... | ... |
| 10111 | 3350 |
| ... | ... |
| 11011 | 3180 |
| ... | ... |
| 11111 | 3062 |

| Binary Value | Occurrence |
|---|---|
| 010000 | 1296 |
| 010001 | 1287 |
| ... | ... |
| 100011 | 1437 |
| ... | ... |
| 111011 | 1428 |
| ... | ... |
| 111111 | 1180 |

Figure 28d

DATA PROCESSING METHOD AND APPARATUS

RELATED APPLICATIONS

This application is a National Phase of PCT Patent Application No. PCT/GB2017/051979 having International filing date of Jul. 4, 2017, which is a Continuation-in-Part (CIP) of PCT Patent Application No. PCT/GB2016/052020 having International filing date of Jul. 4, 2016, and also claims the benefit of priority of United Kingdom Patent Application No. 1700081.1 filed on Jan. 4, 2017. The contents of the above applications are all incorporated by reference as if fully set forth herein in their entirety.

FIELD AND BACKGROUND OF THE INVENTION

The present invention relates to a method and apparatus of processing data, in particular for compressing (and/or encrypting) data.

Currently, information held on a computer is stored as ones and zeros (bits) which are grouped into sets of eight bits which are referred to as bytes. Two bytes are referred to as a word (16 bits), and four bytes are referred to as a double word (32 bits) or can be used as the mathematical storage referred to as a 32-bit integer (int32 or Long). An integer which has a bit length of 32 can hold a value between −2147483648 and +2147483647; or by removing the sign and making it an unsigned 32-bit integer (UInt32), the longest number that can be stored is 4294967295 ($2^{32}-1$).

It is desirable to represent information using the smallest number of bits possible in order to reduce the space required for storage and to minimise the resources required for signalling information from one entity to another. In computer science and information theory, data compression (also referred to as source coding) involves encoding information using fewer bits than the original representation. Furthermore, it is important that sensitive data, represented using the American Standard Code Information Interchange (ASCII) standard or by other means, is protected, for example by preventing access to this data by unauthorised persons or machines. Therefore, methods of encrypting and decrypting data form an integral part of information technology.

Compression can be either lossy or lossless. Lossless compression reduces bits by identifying and eliminating statistical redundancy. No information is lost in lossless compression. In contrast, lossy compression reduces the total number of bits by identifying marginally important information and removing it.

Once data has been compressed, it must subsequently decompressed in order for it to be used. Both compression and decompression require computer processing. Therefore, data compression/decompression must find a compromise between the level of compression achieved and the computer processing required for compression and decompression. For example, a compression scheme for video may require expensive hardware for the video to be decompressed fast enough for it to be watched as it is being decompressed, and the option to decompress the video in full before watching it may be inconvenient and may require additional storage.

SUMMARY OF THE INVENTION

The present invention seeks to provide improved methods of compression and/or decompression and/or improved methods of encryption and/or decryption.

According to one aspect of the invention there is provided a method of processing data comprising an input sequence of bits, the method comprising the steps of: dividing the input sequence of bits into a plurality of portions; respectively sub-dividing each portion into a plurality of sub-divisions comprising at least a first sub-division and a second sub-division, wherein each sub-division of the plurality of sub-divisions comprises at least one bit, wherein the at least one bit of each first sub-division is arranged in a respective first sub-division permutation, and wherein the at least one bit of each second sub-division is arranged in a respective second sub-division permutation; performing frequency analysis: to determine, for each of a plurality of possible first sub-division permutations, how many times, within said input sequence of bits, a portion comprises a first sub-division having bits arranged in that possible first sub-division permutation; and to determine, for each of a plurality of possible second sub-division permutations, how many times, within said input sequence of bits, a portion comprises a second sub-division having bits arranged in that possible second sub-division permutation; and forming a processed (e.g. compressed or encrypted) sequence of bits based on said frequency analysis; wherein said forming a processed sequence of bits further comprises including extraction information in the processed sequence of bits, said extraction information for use in reconstructing said input sequence of bits from said processed sequence of bits; and wherein the extraction information comprises at least one of: first sub-division order information identifying an ordered sequence comprising each possible first sub-division permutation arranged in order of how many times, within said input sequence of bits, a portion comprises a first sub-division having bits arranged in that possible first sub-division permutation; and second sub-division order information identifying an ordered sequence comprising each possible second sub-division permutation arranged in order of how many times, within said input sequence of bits, a portion comprises a second sub-division having bits arranged in that possible second sub-division permutation; and wherein the at least one of said first sub-division order information and said second sub-division order information comprises an index value, representing the order of the corresponding ordered sequence, based on a preconfigured mapping between said index value and the order of the corresponding ordered sequence.

According to another aspect of the invention there is provided a method of processing data comprising an input sequence of bits, the method comprising the steps of: dividing the input sequence of bits into a plurality of portions; respectively sub-dividing each portion into a plurality of sub-divisions comprising at least a first sub-division and a second sub-division, wherein each sub-division of the plurality of sub-divisions comprises at least one bit, wherein the at least one bit of each first sub-division is arranged in a respective first sub-division permutation, and wherein the at least one bit of each second sub-division is arranged in a respective second sub-division permutation; performing frequency analysis: to determine, for each of a plurality of possible first sub-division permutations, how many times, within said input sequence of bits, a portion comprises a first sub-division having bits arranged in that possible first sub-division permutation; and to determine, for each of a plurality of possible second sub-division permutations, how many times, within said input sequence of bits, a portion comprises a second sub-division having bits arranged in that possible second sub-division permutation; and forming a processed (e.g. compressed or encrypted) sequence of bits based on said frequency analysis; wherein said forming a processed sequence of bits further comprises including a header portion in the processed sequence of bits, said header portion comprising extraction information for use in reconstructing said input sequence of bits from said processed sequence of bits; and wherein the extraction information comprises at least one of: first sub-division order information identifying an ordered sequence comprising each possible first sub-division permutation arranged in order of how many times, within said input sequence of bits, a portion comprises a first sub-division having bits arranged in that possible first sub-division permutation; and second sub-division order information identifying an ordered sequence comprising each possible second sub-division permutation arranged in order of how many times, within said input sequence of bits, a portion comprises a second sub-division having bits arranged in that possible second sub-division permutation; and wherein the at least one of said first sub-division order information and said second sub-division order information comprises an index value, representing the order of the corresponding ordered sequence, based on a preconfigured mapping between said index value and the order of the corresponding ordered sequence.

According to another aspect of the invention there is provided a method of processing data comprising an input sequence of bits, the method comprising the steps of: (i) identifying a processing bit length for use in processing said input sequence of bits; (ii) dividing the input sequence of bits into a plurality of portions wherein each portion has a respective portion bit length equal to said processing bit length and wherein the bits in each portion are arranged in a respective portion permutation; (iii) respectively sub-dividing each portion into a plurality of sub-divisions comprising at least a first sub-division and a second sub-division, wherein each sub-division of the plurality of sub-divisions comprises at least one bit, wherein the at least one bit of each first sub-division is arranged in a respective first sub-division permutation, and wherein the at least one bit of each second sub-division is arranged in a respective second sub-division permutation; (iv) performing frequency analysis: to determine, for each of a plurality of possible first sub-division permutations, how many times, within said input sequence of bits, a portion comprises a first sub-division having bits arranged in that possible first sub-division permutation; and to determine, for each of a plurality of possible second sub-division permutations, how many times, within said input sequence of bits, a portion comprises a second sub-division having bits arranged in that possible second sub-division permutation; (v) assigning a respective sub-division value to each of said plurality of possible first sub-division permutations based on how many times, within said input sequence of bits, a portion comprises a first sub-division having bits arranged in that possible first sub-division permutation; and assigning a respective sub-division value to each of said plurality of possible second sub-division permutations based on how many times, within said input sequence of bits, a portion comprises a second sub-division having bits arranged in that possible second sub-division permutation; (vi) for each portion permutation of a plurality of possible portion permutations, generating a respective label representing that portion permutation, wherein said generating comprises combining: the sub-division value assigned to the first sub-division permutation corresponding to the first sub-division of that portion permutation; with the sub-division value assigned to the second sub-division permutation corresponding to the second sub-division of that portion permutation; wherein said respective label comprises a representation of a combined value resulting from said combining; and (vii) forming a processed sequence of bits by replacing, within said input sequence of bits, bit portions comprising bits arranged in one of said plurality of possible portion permutations, with the respective label representing that one of said plurality of possible portion permutations, wherein said forming a processed sequence of bits further comprises including a header portion in the processed sequence of bits, said header portion comprising extraction information for use in reconstructing said input sequence of bits from said processed sequence of bits, and the extraction information being configured for use in identifying the respective portion permutation which each label represents; and wherein the extraction information comprises: first sub-division order information identifying an ordered sequence comprising each possible first sub-division permutation arranged in order of how many times, within said input sequence of bits, a portion comprises a first sub-division having bits arranged in that possible first sub-division permutation; and second sub-division order information identifying an ordered sequence comprising each possible second sub-division permutation arranged in order of how many times, within said input sequence of bits, a portion comprises a second sub-division having bits arranged in that possible second sub-division permutation; and wherein at least one of said first sub-division order information and said second sub-division order information comprises an index value, representing the order of the corresponding ordered sequence, based on a preconfigured mapping between said index value and the order of the corresponding ordered sequence.

According to one aspect of the invention there is provided a method of processing data comprising an input sequence of bits, the method comprising the steps of: (i) identifying a processing bit length for use in processing said input sequence of bits; (ii) dividing the input sequence of bits into a plurality of portions wherein each portion has a respective portion bit length equal to said processing bit length and wherein the bits in each portion are arranged in a respective portion permutation; (iii) respectively sub-dividing each portion into a plurality of sub-divisions comprising at least a first sub-division and a second sub-division, wherein each sub-division of the plurality of sub-divisions comprises at least one bit, wherein the at least one bit of each first sub-division is arranged in a respective first sub-division permutation, and wherein the at least one bit of each second sub-division is arranged in a respective second sub-division permutation; (iv) performing frequency analysis: to determine, for each of a plurality of possible first sub-division permutations, how many times, within said input sequence of bits, a portion comprises a first sub-division having bits arranged in that possible first sub-division permutation; and to determine, for each of a plurality of possible second sub-division permutations, how many times, within said input sequence of bits, a portion comprises a second sub-division having bits arranged in that possible second sub-division permutation; (v) assigning, based on said frequency analysis, a first respective sub-division value to each of said plurality of possible first sub-division permutations and assigning a second respective sub-division value to each of said plurality of possible second sub-division permutations; (vi) for each portion permutation of a plurality of possible portion permutations, generating a respective label representing that portion permutation, wherein said generating comprises combining: the first sub-division value assigned to the first sub-division permutation corresponding to the first sub-division of that portion permutation; with the second sub-division value assigned to the second sub-division permutation corresponding to the second sub-division of that portion permutation; wherein said respective label comprises a representation of a combined value resulting from said combining; and (vii) forming a processed sequence of bits by replacing, within said input sequence of bits, bit portions comprising bits arranged in one of said plurality of possible portion permutations, with the respective label representing that one of said plurality of possible portion permutations.

When generating, for each portion permutation, a respective label representing that portion permutation, said combining may comprise arithmetically adding said first sub-division value assigned to the first sub-division permutation corresponding to the first sub-division of that portion permutation to said second sub-division value assigned to the second sub-division permutation corresponding to the second sub-division of that portion permutation. The combined value may then comprise a result of the addition.

When generating, for each portion permutation, a respective label representing that portion permutation, said generating may comprise, when a particular first sub-division value is assigned for a plurality of different first sub-division permutations), generating, for each of said respective plurality of different first sub-division permutations having that particular first sub-division value, a different respective first additional value for use in discriminating between said respective plurality of first sub-division permutations having that particular first sub-division value.

When generating, for each portion permutation, a respective label representing that portion permutation, said generating may comprise, when a particular second sub-division value is to be assigned for a plurality of different second sub-division permutations, generating, for each of said respective plurality of different second sub-division permutations having that particular second sub-division value, a different respective second additional value for use in discriminating between said respective plurality of second sub-division permutations having that particular second sub-division value.

When generating, for each portion permutation, a respective label representing that portion permutation, said generating may comprise, when a first additional value and a second additional value have been generated for a particular portion permutation: combining said first additional value and said second additional value to produce a combined additional value, wherein the label for that particular portion permutation comprises a representation of the combined value together with the combined additional value for that particular portion permutation.

When generating, for each portion permutation, a respective label representing that portion permutation, said generating may comprise, when one of a first additional value and a second additional value have been generated for a particular portion permutation, generating a label for that particular portion permutation that comprises a representation of the combined value together with that one of a first additional value and a second additional value.

When respectively sub-dividing each portion into a plurality of sub-divisions, said first sub-division may have a different number of bits to said second sub-division.

When generating, for each portion permutation, a respective label representing that portion permutation, each label generated may have a respective label bit length, and the labels are generated such that labels generated for portion permutations which occur a greater number of times within said input sequence of bits may generally have a smaller label bit length than labels generated for portion permutations which occur a lesser number of times within said input sequence of bits.

When generating, for each portion permutation, a respective label representing that portion permutation, each label generated may have a respective label bit length, and the labels are generated such that at least some of the labels may have a label bit length which may be smaller than the processing bit length.

The frequency analysis may comprise, for each one of said plurality of possible first sub-division permutations, determining a respective occurrence level which is the number of times, within said sequence of bits, that a portion occurs comprising that one of said plurality of possible first sub-division permutations. The frequency analysis may comprise may comprise, for each one of said plurality of possible second sub-division permutations, determining a respective occurrence level which is the number of times, within said sequence of bits, a portion occurs comprising that one of said plurality of possible second sub-division permutations.

For a given first sub-division value, the number of first sub-division permutations which are assigned the given first sub-division value may depend on the occurrence levels associated with the first sub-division permutations which are assigned the given first sub-division value; and for a given second sub-division value, the number of second sub-division permutations which are assigned the given second sub-division value may depend on the occurrence levels associated with the second sub-division permutations which are assigned the given second sub-division value.

When assigning, based on said frequency analysis, a first (or second) respective sub-division value to each of said plurality of possible first sub-division permutations, said assigning may comprise: grouping, based on said frequency analysis, said plurality of possible first (or second) sub-division permutations into a plurality of sets (or 'levels'). Each set may comprise at least one first (or second) sub-division permutation. The at least one first (or second) sub-division permutation in each set may have a corresponding occurrence level that falls within a different respective range of occurrence levels associated with that set.

For a given first (or second) sub-division value, the number of first sub-division permutations which are assigned the given first sub-division value may depend on the set associated with the first (or second) sub-division permutation(s) which are assigned the given first sub-division value.

Forming a processed sequence of bits may further comprise including a header portion in the processed sequence, said header portion comprising extraction information for use in reconstructing said input sequence of bits from said processed sequence, and the extraction information being configured for use in identifying the respective portion permutation which each label represents.

The extraction information may be configured for use in identifying how the said plurality of possible first (or second) sub-division permutations are grouped into sets. The extraction information may identify how many first (or second) sub-division permutations each set comprises. The extraction information may be further configured to identify the processing bit length used in processing said input sequence of bits. The extraction information may be further configured to identify how each portion is sub-divided into a plurality of sub-divisions. The extraction information may be further configured to identify how many bits each first sub-division comprises and how many bits each second sub-division comprises. The extraction information may be further configured to identify how many bits the input sequence of bits comprises.

The process may further comprise repeating steps (i) to (vii) at least one further time using said processed sequence as said input sequence.

According to one aspect of the invention there is provided a method of processing data, the method comprising the steps of: (i) dividing the data into a plurality of processing segments wherein each processing segment comprises an input sequence of bits; (ii) identifying a current processing bit length for use in processing a current processing segment of said data to form a processed segment meeting at least one predetermined processing criterion; (ii) dividing the current processing segment into a plurality of portions wherein each portion has a respective portion bit length equal to said current processing bit length and wherein the bits in each portion are arranged in a respective one of a number of possible permutations; (iv) assigning a respective label to each of a plurality of said possible permutations; and (v) forming a processed segment by replacing, within said current processing segment, bit portions comprising bits arranged in one of said plurality of possible permutations with the respective label assigned to that one of said possible permutations; (vi) identifying a new processing bit length for use in processing a next processing segment of said data to form a processed segment meeting at least one predetermined processing criterion; (vii) repeating, for each of said plurality of processing segments, steps (ii) to (vi) wherein the new processing bit length is used as the current processing bit length and the next processing segment of said data is used as the current processing segment, and wherein a processing bit length used for at least one of said processing segments of said data is different to a processing bit length used for at least one other of said processing segments of said data.

According to one aspect of the invention there is provided a method of processing data comprising an input sequence of bits, the method comprising the steps of: (i) setting a current processing bit length, of at least one bit, for use in processing said input sequence of bits; (ii) dividing the input sequence of bits into a plurality of portions wherein each portion has a respective portion bit length equal to said current processing bit length and wherein the bits in each portion are arranged in a respective one of a number of possible permutations; (iii) for each of a plurality of possible permutations analysing the input sequence of bits to respectively identify how many times, within said input sequence of bits, a portion having that possible permutation occurs; (iv) determining whether at least one predetermined processing criterion has been achieved by comparing results of said analysing with the predetermined processing criterion; (v) processing said input sequence of bits based on said determining wherein said processing comprises: when the determining determines that the predetermined processing criterion has not been achieved performing at least one of: setting a new processing bit length that is different to the current processing bit length and repeating steps (ii) to (v) using said new processing bit length as the current processing bit length; and ending processing of said input sequence of bits; and when the determining determines that the at least one predetermined processing criterion has been achieved: assigning a respective label to each of said plurality of possible permutations; and forming a processed sequence of bits by replacing, within said sequence of bits, bit portions comprising bits arranged in one of said plurality of possible permutations with the respective label assigned to that one of said possible permutations.

The predetermined processing criterion may comprise whether 50% of the possible permutations which occur in the input sequence of bits occur at least twice as frequently as the other 50% of the possible permutations which occur in the input sequence of bits.

The predetermined processing criterion may comprise whether 50% of the possible permutations occur in the input sequence of bits.

According to one aspect of the invention there is provided a method of reconstructing a processed sequence of bits produced by a method according to any preceding claim, the method of reconstructing a processed sequence comprising the steps of: obtaining extraction information for use in reconstructing an original sequence of bits from said processed sequence; reconstructing said original sequence of bits from said processed sequence based on said extraction information.

According to another aspect there is provided a method of compression in which an input sequence of bits is divided into a plurality of portions; each portion is sub-divided into a plurality of sub-divisions; frequency analysis is performed to determine the number of occurrences of each sub-division permutation and new values are assigned, based on the frequency analysis, to each of the sub-division permutations. For each portion a label, representing the permutation of bits in that portion, is assigned, wherein the label comprises a representation of a combined value resulting from combining the new values associated with the sub-division permutations of that portion. A processed sequence of bits is generated by replacing, within the input sequence of bits, bit portions with the respective label representing the permutation of bits in that portion.

According to another aspect there is provided a method of processing data comprising an input sequence of bits, the method comprising the steps of: (i) identifying a processing bit length for use in processing said input sequence of bits; (ii) dividing the input sequence of bits into a plurality of portions wherein each portion has a respective portion bit length equal to said processing bit length and wherein the bits in each portion are arranged in a respective portion permutation; (iii) respectively sub-dividing each portion into a plurality of sub-divisions comprising at least a first sub-division and a second sub-division, wherein each sub-division of the plurality of sub-divisions comprises at least one bit, wherein the at least one bit of each first sub-division is arranged in a respective first sub-division permutation, and wherein the at least one bit of each second sub-division is arranged in a respective second sub-division permutation; (iv) performing frequency analysis: to determine, for each of a plurality of possible first sub-division permutations, how many times, within said input sequence of bits, a portion comprises a first sub-division having bits arranged in that possible first sub-division permutation; and to determine, for each of a plurality of possible second sub-division permutations, how many times, within said input sequence of bits, a portion comprises a second sub-division having bits arranged in that possible second sub-division permutation; (v) assigning a respective sub-division value to each of said plurality of possible first sub-division permutations based on how many times, within said input sequence of bits, a portion comprises a first sub-division having bits arranged in that possible first sub-division permutation; and assigning a respective sub-division value to each of said plurality of possible second sub-division permutations based on how many times, within said input sequence of bits, a portion comprises a second sub-division having bits arranged in that possible second sub-division permutation; (vi) for each portion permutation of a plurality of possible portion permutations, generating a respective label representing that portion permutation, wherein said generating comprises combining: the sub-division value assigned to the first sub-division permutation corresponding to the first sub-division of that portion permutation; with the sub-division value assigned to the second sub-division permutation corresponding to the second sub-division of that portion permutation; wherein said respective label comprises a representation of a combined value resulting from said combining; and (vii) forming a processed sequence of bits by replacing, within said input sequence of bits, bit portions comprising bits arranged in one of said plurality of possible portion permutations, with the respective label representing that one of said plurality of possible portion permutations.

When generating, for each portion permutation, a respective label representing that portion permutation, said combining may comprise: arithmetically adding said sub-division value assigned to the first sub-division permutation corresponding to the first sub-division of that portion permutation to said sub-division value assigned to the second sub-division permutation corresponding to the second sub-division of that portion permutation; wherein said combined value comprises a result of said addition.

When generating, for each portion permutation, a respective label representing that portion permutation, said generating may further comprise: when a first particular sub-division value is assigned for a plurality of different first sub-division permutations: generating, for each of said respective plurality of different first sub-division permutations having that first particular sub-division value, a different respective first additional value for use in discriminating between said respective plurality of first sub-division permutations having that first particular sub-division value; and when a second particular sub-division value is to be assigned for a plurality of different second sub-division permutations:
  generating, for each of said respective plurality of different second sub-division permutations having that second particular sub-division value, a different respective second additional value for use in discriminating between said respective plurality of second sub-division permutations having that second particular sub-division value.

For a first given sub-division value, the number of first sub-division permutations which are assigned the first given sub-division value may depend on the occurrence levels associated with the first sub-division permutations which are assigned the first given sub-division value; and for a second given sub-division value, the number of second sub-division permutations which are assigned the second given sub-division value may depend on the occurrence levels associated with the second sub-division permutations which are assigned the second given sub-division value.

When assigning, based on said frequency analysis, a respective sub-division value to each of said plurality of possible first (or second) sub-division permutations, said assigning may comprise: grouping, based on said frequency analysis, said plurality of possible first (or second) sub-division permutations into a plurality of sets (or 'levels'); wherein each set comprises at least one first (or second) sub-division permutation; and wherein the at least one first (or second) sub-division permutation in each set has a corresponding occurrence level that falls within a different respective range of occurrence levels associated with that set.

For a first (or second) given sub-division value, the number of first sub-division permutations which are assigned the first (or second) given sub-division value may depend on the set associated with the first (or second) sub-division permutation(s) which are assigned the first (or second) given sub-division value.

The method may further comprise repeating steps (i) to (vii) at least one further time using said processed sequence of bits as said input sequence of bits.

The sub-division values assigned to each of the plurality of possible first sub-division permutations and each of the plurality of second sub-division permutations may be assigned such that sub-division values assigned to permutations with a lower occurrence level have higher levels of statistical redundancy than the sub-division values assigned to permutations with a higher occurrence level.

According to another aspect there is provided a method of processing data, the method comprising the steps of: (i) dividing the data into a plurality of processing segments wherein each processing segment comprises an input sequence of bits; (ii) identifying a current processing configuration defining a current processing bit length for use in processing a current processing segment of said data to form a processed segment meeting at least one predetermined processing criterion; (ii) dividing the current processing segment into a plurality of portions wherein each portion has a respective portion bit length equal to said current processing bit length and wherein the bits in each portion are arranged in a respective one of a number of possible permutations; (iv) assigning a respective label to each of a plurality of said possible permutations; (v) forming a processed segment by replacing, within said current processing segment, bit portions comprising bits arranged in one of said plurality of possible permutations with the respective label assigned to that one of said possible permutations; (vi) identifying a new processing configuration for use in processing a next processing segment of said data to form a processed segment meeting at least one predetermined processing criterion; and (vii) repeating, for each of said plurality of processing segments, steps (ii) to (vi) wherein the new processing configuration is used as the current processing configuration and the next processing segment of said data is used as the current processing segment, and wherein the processing configuration used for at least one of said processing segments of said data defines a different processing bit length to a processing bit length defined by a processing configuration used for at least one other of said processing segments of said data.

Each processing segment may be assigned a marker which represents characteristics of the data within the processing segment, and the current processing configuration may be identified based on the marker assigned to the current processing segment.

Each processing configuration may define one of: a plurality of sub-divisions of each portion, each sub-division having a respective sub-division bit length, wherein a sum of said respective sub-division bit lengths equals said processing bit length; and an undivided processing portion, the bit length of which is said processing bit length.

The processing configuration used for at least one of said processing segments of said data may define a first plurality of sub-divisions having a first combination of sub-division bit lengths; and the processing configuration used for at least one other of said processing segments of said data may define a second plurality of sub-divisions having a second combination of sub-division bit lengths; and the first combination of sub-division bit lengths may be different to the second combination of sub-division bit lengths.

The processing configuration used for at least one of said processing segments of said data may define a plurality of sub-divisions having a combination of sub-division bit lengths; and the processing configuration used for at least one other of said processing segments of said data may define an undivided processing portion.

The method may further comprise, between steps (v) and (vi), identifying a new processing configuration for use in reprocessing the processed segment and repeating steps (ii) to (v) wherein the new processing configuration is used as the current processing configuration and the processed segment of said data is used as the current processing segment.

According to another aspect there is provided a method of processing data comprising an input sequence of bits, the method comprising the steps of: (i) identifying a current processing configuration defining a current processing bit length for use in processing said input sequence of bits, wherein the current processing configuration defines a plurality of sub-divisions of each portion, each sub-division having a respective sub-division bit length, wherein a sum of said respective sub-division bit lengths equals said current processing bit length; (ii) dividing the input sequence of bits into a plurality of portions, each portion comprising one or more sub-divisions according to the current processing configuration, wherein each portion has a respective portion bit length equal to said current processing bit length and wherein the bits in each sub-division are arranged in a respective one of a number of possible sub-division permutations; (iii) for each of a plurality of possible sub-division permutations, analysing the input sequence of bits to respectively identify how many times, within said input sequence of bits, a portion comprises a sub-division having that possible sub-division permutation occurs; (iv) determining whether at least one predetermined processing criterion has been achieved by comparing results of said analysing with the predetermined processing criterion; (v) processing said input sequence of bits based on said determining wherein said processing comprises: when the determining determines that the predetermined processing criterion has not been achieved, performing at least one of: identifying a new processing configuration that is different to the current processing configuration and repeating steps (ii) to (v) using said new processing configuration as the current processing configuration; and ending processing of said input sequence of bits; and when the determining determines that the at least one predetermined processing criterion has been achieved: assigning a respective sub-division value to each of said plurality of possible sub-division permutations; and forming a processed sequence of bits by replacing, within said sequence of bits, bit portions comprising a sub-division having bits arranged in one of said plurality of possible sub-division permutations with a portion label based on the sub-division values assigned to that sub-division permutation.

The respective sub-division value assigned to each of said plurality of possible permutations may be based on how many times, within said input sequence of bits, a portion comprises a sub-division having bits arranged in that possible permutation.

The sub-division values assigned to each of the plurality of possible permutations may be assigned such that sub-division values assigned to permutations which occur less often have higher levels of statistical redundancy than the sub-division values assigned to permutations which occur more often.

When the determining determines that the predetermined processing criterion has not been achieved and a new processing configuration is identified, the new processing configuration may be selected in a predetermined order, for example ascending order of processing bit length.

The input sequence of bits may comprise a processing segment, and the processing segment may be assigned a marker which represents a distribution characteristic of the data within the processing segment, and said identification of current processing configuration may be based on the marker of the processing segment.

Identification of the current processing configuration may comprise using the marker of the processing segment to identify a processing configuration which has previously been used to process a different processing segment (e.g. in a different file).

The marker may be determined based on mathematical analysis of the distribution characteristic of the data within the processing segment.

The marker may be determined by: dividing the input sequence of bits into a plurality of portions, where the bits in each portion are arranged in a respective one of a number of possible portion permutations; determining the occurrence of each possible portion permutation within the input sequence of bits; and measuring the distribution of the occurrences of the possible portion permutations.

The distribution characteristic may comprise at least one of: the average byte value of the data within the processing segment, the average change in byte value of the data within the processing segment, and the average change in byte value occurrence of the data within the processing segment.

The marker may comprise a multi-dimensional marker.

The processing configuration may be one of a plurality of processing configurations, each having a respective reference number, and said processing configuration may be identified by means of its reference number.

Each reference number may provide a binary representation of the sub-divisions defined by the corresponding processing configuration.

The processing configuration may be identified based on Fourier analysis of the input sequence of bits.

The processing configuration may be identified by performing Fourier analysis on the input sequence of bits and obtaining at least one Fourier coefficient; selecting a processing bit length based on the at least one Fourier coefficient; and identifying a processing configuration indicating the selected processing bit length.

The predetermined processing criterion may comprise whether at least one possible permutations does not occur in the input sequence of bits.

The predetermined processing criterion may comprise whether a measure of a distribution (e.g. a coefficient of variation) of occurrences of the possible permutations within the sequence of bits exceeds a threshold.

According to another aspect there is provided a method of processing data, the method comprising the steps of: (i) dividing the data into a plurality of processing segments wherein each processing segment comprises an input sequence of bits; (ii) performing a mathematical analysis of a processing segment to determine a distribution characteristic of data within the processing segment and assigning at least one marker to the processing segment based on the mathematical analysis; (ii) identifying, based on the marker assigned to the processing segment, a current processing configuration defining a current processing bit length for use in processing a current processing segment of said data to form a processed segment meeting at least one predetermined processing criterion; (ii) dividing the current processing segment into a plurality of portions wherein each portion has a respective portion bit length equal to said current processing bit length and wherein the bits in each portion are arranged in a respective one of a number of possible permutations; (iv) assigning a respective label to each of a plurality of said possible permutations; and (v) forming a processed segment by replacing, within said current processing segment, bit portions comprising bits arranged in one of said plurality of possible permutations with the respective label assigned to that one of said possible permutations.

The current processing configuration may define a plurality of sub-divisions of each portion, each sub-division having a respective sub-division bit length, wherein a sum of said respective sub-division bit lengths equals said current processing bit length.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF THE SEVERAL VIEWS OF THE DRAWINGS

Embodiments of the invention will now be described, by way of example only, with reference to the attached figures in which:

FIG. 2 illustrates the main data groups used in the methods of compression described below, including exemplary data sizes/values for the purposes of explanation only;

FIGS. 3A, 3B, 3C and 3D illustrate how a bit portion length is selected in a first example;

FIGS. 4A and 4B illustrate how a bit portion length is selected in a second example;

FIGS. 5A, 5B, 5C, 5D and 5E illustrate an alternative method of selecting a bit portion length;

FIGS. 6A, 6B, 6C and 6D illustrate a method of determining which configuration of combination arrays to use once a bit portion length has been determined according to one or more of the methods of FIGS. 3A to 3D, 4A and 4B and 5A to 5E;

FIGS. 7A and 7B illustrate a first part of a method of assigning labels to bit portions once a combination array CA configuration has been selected according to the method illustrated in FIGS. 6A to 6D;

FIGS. 8A, 8B, 8C and 8D are tables detailing possible combined new CA values with their corresponding new CA0 values and new CA1 values;

FIG. 9 is a table detailing possible combination of $CA_0$ disambiguation values and $CA_1$ disambiguation values, and the resulting combined disambiguation values, for the example illustrated in FIGS. 7A and 7B;

FIG. 11 is a table listing all of the possible bit portions of length 6 bits and the labels assigned to each bit portion, based on the combination arrays $CA_0$ and $CA_1$ in FIGS. 7A and 7B;

FIGS. 12A, 12B, 12C and 12D are examples of generating new CA values (and disambiguation values) for bit portions having a bit portion length of 8 bits, using a particular CA configuration;

FIGS. 13A, 13B, 13C and 13D are simplified representations of four exemplary header structures;

FIG. 14 illustrates the target maximum BP and/or CA values calculated in accordance with an alternative embodiment;

FIG. 15 illustrates a number of CA configurations and associated reference numbers;

FIGS. 18a and 18b are tables showing extracts from an exemplary 65536 byte processing segment and data related to the processing segment;

FIG. 23a is a table showing every possible 4 bit binary value from 0000 to 1111, in which a recompression index is assigned to each binary value, and FIG. 23b is a table showing optimised binary values which are assigned to combined new CA values;

FIGS. 24a and 24b are equivalent to FIGS. 23a and 23b, but instead show how binary values with a bit length of 6 are optimised;

FIG. 25a is an extract from an exemplary array which represents a segment of randomly organised and evenly distributed data, and FIG. 25b is a table showing the number of occurrences, within the segment, of the first 17 byte values;

FIG. 26 is an extract from the exemplary array of FIG. 25a written as a binary stream;

FIGS. 27a, 27b, 27c and 27d are extracts from the exemplary array of FIG. 25a, written as a binary stream and split into portions having different bit lengths;

FIGS. 28a, 28b, 28c and 28d are tables showing the number of occurrences, within the segment, of a selection of portion values, including the portion values having the highest and lowest occurrences.

DESCRIPTION OF SPECIFIC EMBODIMENTS OF THE INVENTION

Figure 1A:
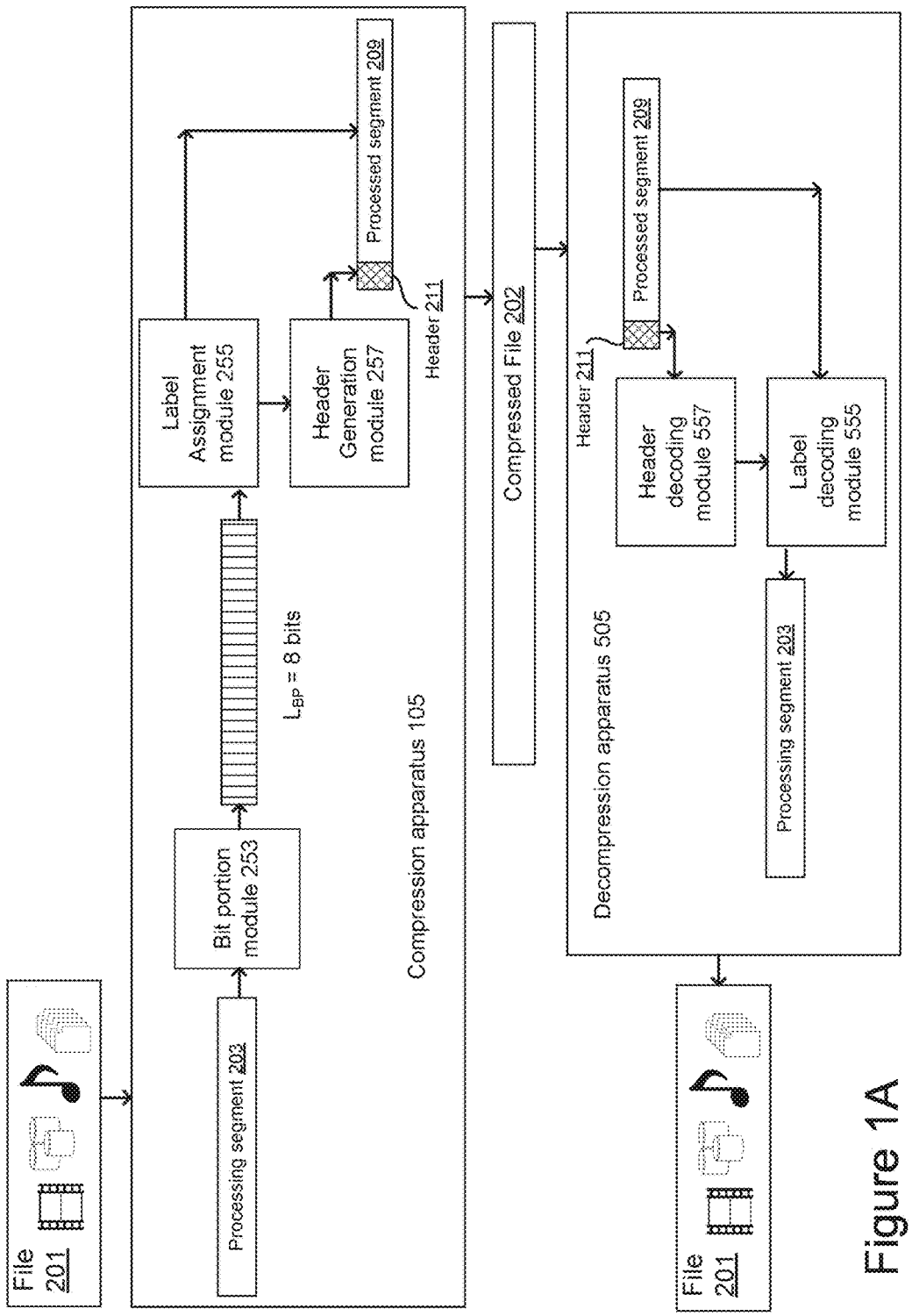
FIG. 1a is a simplified schematic block diagram illustrating a system for compressing and decompressing data.
Figure 1B:
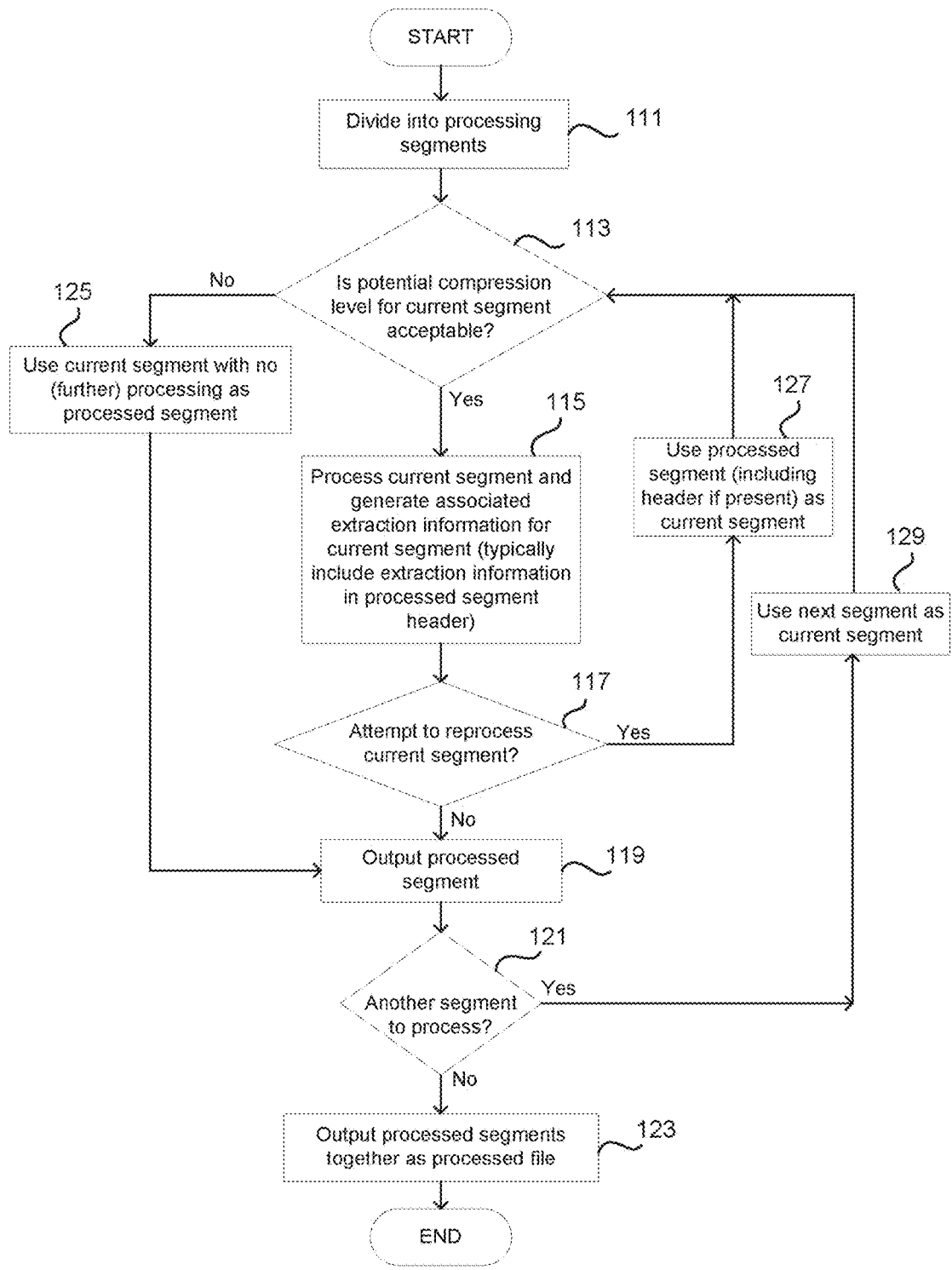
FIG. 1b is a flow chart illustrating an overview of a method of compression.
Figure 1C:
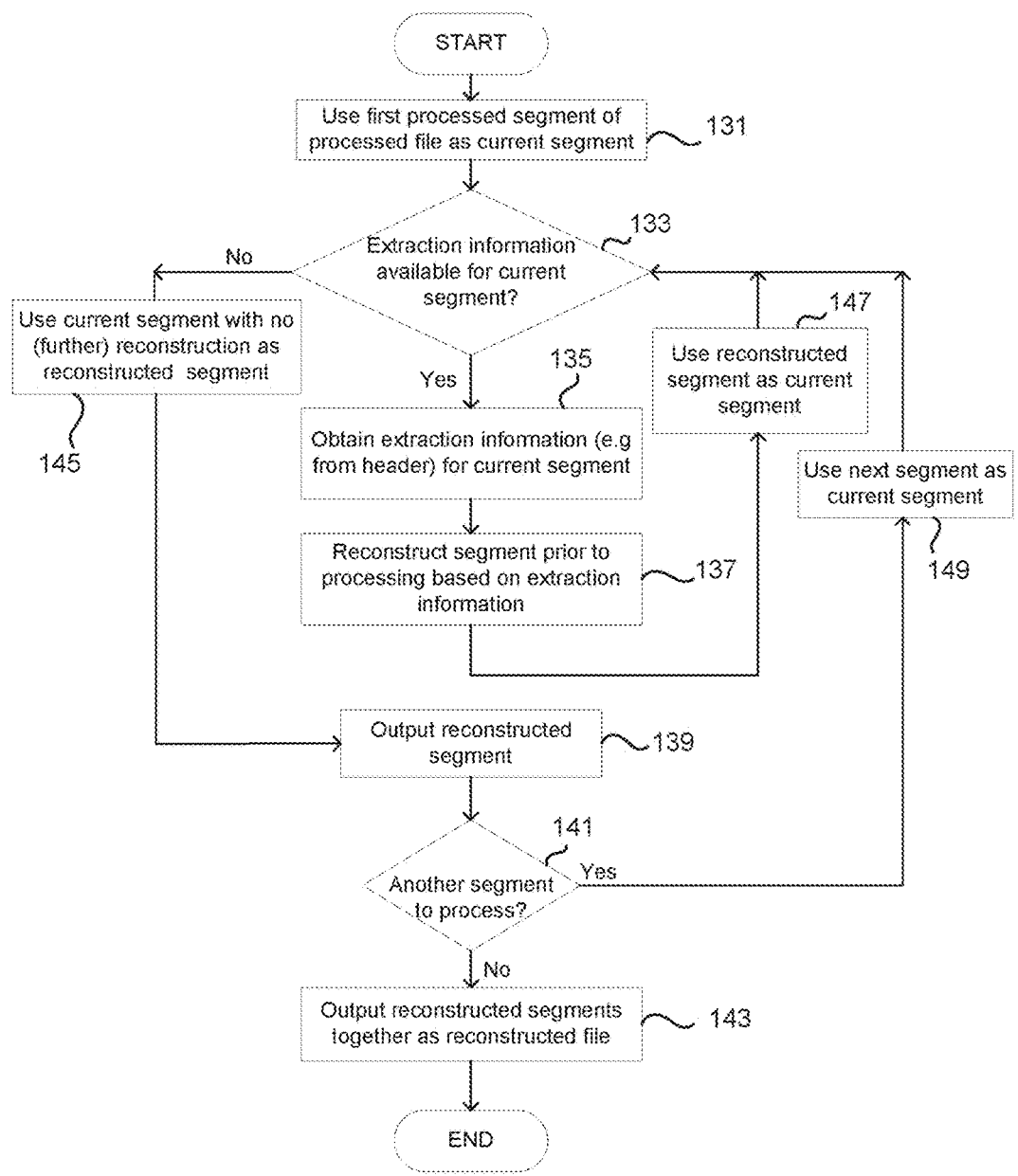
FIG. 1c is a flow chart illustrating an overview of a method of decompression.

FIG. 1a is a simplified schematic block diagram illustrating a system for compressing and decompressing data, and FIGS. 1b and 1c show related methods. The system of FIG.

1a comprises compression apparatus 105 for compressing a file 201 to produce a compressed file 202.

The system of FIG. 1a also comprises decompression apparatus 505 for decompressing a compressed file 202, which has been compressed using the compression apparatus 105, in order to re-create the original file 201.

As indicated in FIG. 1a the file 201 may comprise, for example, a text document, music data, the contents of a database or video data.

The compression apparatus 105 is configured to extract data comprising a sequence of bits from the file 201, the sequence of bits corresponding to a processing segment 203. The processing segments 203 can be configured, on the fly, to be any suitable size, therefore allowing the processing segment size to be selected adaptively based, for example, on the processing capabilities of the compression apparatus 105 or other relevant factors.

The compression apparatus 105 comprises a bit portion module 253, which is beneficially configured to analyse each of the processing segments 203 and select, based on this analysis, a bit portion length $L_{BP}$ (also referred to as a bit length) for use in dividing the processing segments into smaller data units referred to as 'bit portions' 205. As an example, FIG. 1a illustrates a processing segment having been assigned a bit portion length $L_{BP}$ of 8 bits by the bit portion module 253, however the bit portion module 253 is configured to select a respective bit portion length $L_{BP}$ based on frequency analysis of each processing segment 203, and therefore different processing segments can be assigned different bit portion lengths. Using this frequency analysis, the bit portion module 253 is configured to select the bit portion length $L_{BP}$ based on which bit portion length $L_{BP}$ apparently provides the best (or among the best) prospects for compression. The bit portion module 253 can also be configured to select any bit portion length $L_{BP}$ with acceptable prospects for compression, for example to optimise for speed as opposed to compression.

If the bit portion module 253 determines that no bit portion length will allow compression of the processing segment 203 (or the compression does not meet a predefined compression threshold, for example a greater than 5% reduction in size), it is configured to refrain from assigning a bit portion length to the processing segment, and the processing segment 203 will be output by the compression apparatus 105 in in its original (unprocessed) form.

Once a bit portion length is selected and the processing segment 203 sub-divided into bit portions 205 accordingly, the bit portions 205 may advantageously be further sub-divided into smaller data sub-divisions referred to as combination arrays (although, depending on requirements, such further sub-division may not be implemented). These combination arrays represent the smallest data unit used in processing the processing segment 203.

The way in which a file may be sub-divided into smaller data units to aid efficient processing is described in more detail below, in the section titled 'Overview—Main Data Groups', with reference to FIG. 2.

The compression apparatus 105 further comprises a label assignment module 255 which is configured to assign a respective label to each permutation of bits represented by the bit portions 205, based on analysis of the frequency of occurrence of the bit portion value corresponding to that permutation, and/or frequency of occurrence of combination array values that form that permutation, within a processing segment.

The way in which a label for a bit portion permutation may be assigned is introduced below in the section titled 'Overview—Assigning Labels'.

Where a bit portion is sub-divided into combination arrays, the respective combination array values within each bit portion 205 are assigned a new value (or laber). The new values assigned to the combination array values within each bit portion are combined together and, if necessary, the resulting combination concatenated with any additional information required for transforming the resulting combination back into its original form. The respective combination for each bit portion 205, together with any information concatenated with that combination, form a bit portion label that is, in effect, assigned to a corresponding permutation bits represented by that bit portion 205. In so doing, each bit portion label is, in effect, also assigned to every bit portion 205 comprising bits arranged in the permutation associated with that label.

The concept of combining different data values is introduced below, in the section titled 'Overview—Combine Method'. The way in which combination array values may be labelled and combined to form a label for a bit portion permutation is described in more detail below in the section titled 'Method of Assigning labels to Bit Portion Permutations using Combination Arrays'.

The label assignment module 255 is configured to output a processed segment 209 corresponding to a processing segment 203 in which each bit portion 205 has been replaced with the bit portion label assigned to the permutation of bits represented by that bit portion 205. In this example, the resulting processed segment 209 is smaller than the processing segment and can thus be thought of as a 'compressed' segment. The processed segment 209 comprises each of the labels assigned to the bit portions 205 of the processing segment 203.

The compression apparatus 105 further comprises a header generation module 257 which is configured to generate a header 211 for each processing segment 203. The header 211 comprises extraction information which is used by the decompression apparatus 505 to extract the processing segment 203 from the processed segment 209. The extraction information preferably allows the decompression apparatus 505 to interpret the labels in the processed segment 209 in order to allow the decompression apparatus 505 to map the labels to their associated bit portion values.

Preferably, each header starts with a compression method signature, and provides information relating to the chosen bit portion length $L_{BP}$, the combination array configuration used, the size of the original processing segment 203, and information on how labels were assigned to each of the bit portions 205.

As visually indicated in FIG. 1a, the total size of each of the processed segments 209 in combination with its header 211 is less than the size of the corresponding processing segment 203. Furthermore, the size of the processed segments 209 and their associated headers 211 may vary.

As shown in FIG. 1a, the compression apparatus 105 outputs a compressed file 202, which comprises fewer bits in total than the original file 201. This is due to the fact that the size of each of the processed segments 209 in combination with its header 211 is less than the size of the corresponding processing segment 203.

The decompression apparatus 505 is configured to process each header 211 and associated processed segment 209 of the compressed file 202. Each header can be identified, for example, by the signature included in the header.

The decompression apparatus 505 comprises a header decoding module 557 and a label decoding module 555. The header decoding module 557 is configured to decode the information in the header 211, for use by the label decoding module 555 in decoding the labels in the processed segment 209 and thus map the labels to their associated bit portion values. The label decoding module is configured to output a processing segment 203 comprising all the bit portion values associated with the labels in the processed segment 209. The processing segment 203 therefore corresponds to the original processing segment 203.

The system for compressing and decompressing data illustrated in FIG. 1a can alternatively or additionally be used to encrypt and decrypt data. Any file 202 produced by the apparatus 105 will exhibit some level of encryption, because the information contained in the file 202 is represented by different data to that used in the original file 201. In such embodiments where the system of FIG. 1a is used to encrypt and/or decrypt data, the total size of each of the processed segments 209 in combination with its header 211 may be greater than the size of the corresponding processing segment 203. Accordingly, when the apparatus 105 is used as encryption/decryption apparatus, the encrypted file 202 output by the encryption side of the apparatus 105 may not always be a 'compressed' file.

FIG. 1b is a flow chart illustrating, in overview, a method of compression that may be employed by the compression apparatus 105 of FIG. 1a.

In the method of FIG. 1a, at step 111 an input sequence of bits is divided into the processing segments. At step 113 the determination is made of whether there is a bit portion length that will allow compression of the processing segment 203 (or the compression does not meet a predefined compression threshold, for example a greater than 5% reduction in size). In other words it is determined whether the potential compression level for the current processing segment is acceptable, for example whether a predetermined processing criterion is satisfied.

If it is determined that the potential compression level for the current processing segment is acceptable, the method continues to step 115 in which the current segment is processed, as described above. Specifically, the possessing segment is analysed and a bit length is selected based on the analysis. The labels are then assigned to each of the bit portions. Extraction information for use in reconstructing the original processing segment is then generated and, in this example, placed in a header. More detail on how the current segment is processed is provided in FIGS. 2-10 and the associated description.

At step 117, it is determined whether to attempt to reprocess the current segment. If the current segment is to be reprocessed, the processed segment (including the header if present) is used as the current segment, and the method returns to step 113. If the current segment is not reprocessed, the method continues to step 119 where a processed segment is output.

If at step 113 it is determined that the potential compression level for the current processing segment is not acceptable, the method continues to step 125 in which the current segment is used as the processed segment, without any processing (or further processing) of the current segment. Then, at step 119, the processed segment is output.

After the processed segment is output, it is determined at step 121 whether there is another processing segment in the input sequence of bits for processing. If yes, the next processing segment of the input sequence of bits is used as the current segment, and the method returns to step 113.

If it is determined at step 121 that there are no more processing segments in the input sequence of bits for processing, the processed segments are output together as a processed file at step 123.

FIG. 1c is a flow chart illustrating in overview, a method of decompression that may be employed by the decompression apparatus 505 of FIG. 1a.

At step 131 the first processed segment of processed file is used as the current segment.

At step 133 it is determined whether extraction information is available for the current segment. In this example, any extraction information is found in the header of the processed segment. If extraction information is available, the method proceeds to step 135 where extraction information is obtained for current segment, for example from an associated header.

Next, at step 137, the processing segment in its form prior to processing is reconstructed from the current segment, based on extraction information.

At step 147, the reconstructed segment is used as the current segment, and the method returns to step 133.

If, at step 133, extraction information is not available, the method proceeds to step 145 where the current segment is used as the reconstructed segment, without any reconstruction (or further reconstruction) of the current segment. Then, at step 139, the processed segment is output.

Next, at step 141, it is determined whether there is another processed segment of the processed file. If yes, the next processed segment of the processed file is used as the current segment, and the method returns to step 133.

If it is determined at step 141 that there are no more processed segments in the processed file, the reconstructed segments are output together as a reconstructed file at step 143.

It will be appreciated that the methods of compressing and decompressing data described herein can beneficially be used in various applications.

For example, compressing data using the methods described herein can allow larger amounts of data to be stored in a given storage medium, and larger amounts of data to be transmitted in any given transmission of data. This in turn will reduce the cost for data storage, which could be particularly advantageous where large amounts of data need to be stored, such as in data farms. Cost saving can be made because, for example, data farms will require less power to maintain their data storing devices. Advantageously, even if different types of data are being stored (e.g. in a data farm) the methods of compression described allow compression to be achieved for generally any data, regardless of the data type (e.g. audio, text, video).

In the field of telecommunications, the described techniques can be used to compress data before transmission, which would allow a reduction in the amount of resources needed to make transmissions.

Devices can be configured to carry out both compression and decompression of data according to the described methods, or devices can be configured to carry out only one of compression and decompression. Media-playing devices, such as mobile phones and DVD players, may only be configured to decompress compressed media files using the methods described herein. In some cases such media-playing devices may be provided with a dedicated chip for this purpose, or the decompression may be performed by software modules in the device which are not tied to any specific hardware. Providing the processing power of a device is sufficient and enough storage space is available, entire files can be decompressed before use (for example a short video clip can be decompressed and then viewed). In other cases, files can be decompressed on the fly during use (for example a film can be decompressed and watched simultaneously). Considering, mobile phones, storing data in compressed form and then decompressing the data when required using the methods described herein would allow significant amounts of space to be saved on mobile phones, for example allowing multiple high quality films to be stored on the mobile phone memory.

Although the time and/or power taken to compress/decompress a given piece of data can vary, in many instances compression takes significantly longer (and/or requires more processing power) than decompression. In some applications this is not especially limiting, for example where films are compressed at a central internet server, and downloaded or streamed in compressed form and then decompressed at a user device for viewing.

In some cases the time and/or processing power required for compression using the methods described herein can be greater than existing compressions techniques. However, the methods described herein have the advantage that greater compression can be achieved, and additionally or alternatively substantial compression can be achieved more consistently across different types of data when compared to existing data compression techniques. The compression methods described can achieve this because the ability to use different bit lengths and different combination array configuration when processing data means that, in effect, different compression algorithms are applied, not only to different iterations of compression for the same file, but also to different parts of the same file.

As described below, the use of combination arrays allows header sizes to be reduced. This is advantageous because headers 211 are generally added to all compressed segments 209. This contrasts with many existing compression techniques in which files are analysed as a whole, and data for use in decompression, such as a hash table, relates to the file as a whole and is only included once in the compressed file.

The compression methods described herein advantageously analyse each processing segment 203 of a file 201 individually, unlike existing compression methods which analyse a file as a whole. Analysing the processing segments 203 individually (and analysing a processing segment in multiple different ways using bit portions and/or combination arrays) allows the described methods to achieve better and more consistent compression of data.

Overview—Main Data Groups

The way in which a file may be sub-divided into smaller data units to aid efficient processing will now be described, by way of example only with reference to FIG. 2.

FIG. 2 illustrates the main data groups used in the methods of compression described below, including exemplary data sizes/values for the purposes of explanation only.

A file 201 may comprise, for example, a text document, a music file, a database or a video file. The file 201 may have any size; in this example the file size is 2 GB. As a further example, an ultra-high 4K definition DVD is approximately 100 GB. A traditional high definition DVD is approximately 6 GB. An hour of high definition downloadable video from the internet is approximately 1 GB. As an example, using the compression techniques described below, it has been found that any of these types of file can be compressed, typically down to 1/64 of their original size.

In the compression methods described below, the file 201 is divided up into one or more processing segments 203, which are generally smaller in size than the file 201. In this example, the 2 GB file 201 is broken up into a plurality of 64 KB processing segments 203. Padding bits/bytes may be used to ensure a file 201 can be divided into an integer number of segments 203.

The processing segments 203 can be used where the size of the file 201 is too large for a computer processor to read and/or process the whole file at once. Generally most files fall into this category, however in some cases a whole file 201 may be read and/or processed without being divided into processing segments.

The size of the processing segments 203 is usually fixed and selected based on normal computer processing capabilities; however in some examples the size of processing segments 203 is not fixed (see Modifications and Alternatives section).

The method involves assigning labels to groups of bits in a processing segment 203, where the grouping of bits and corresponding labels are chosen in a way which ensures that the number of bits required to represent the information of the processing segment 203 is less than the original size of the processing segment 203 in bits. In overview, smaller labels (i.e. labels comprising fewer bits) are used to represent more frequently occurring groups of bits, while larger labels (i.e. labels comprising more bits) are used to represent less frequently occurring groups of bits.

In preferred embodiments, two or more main groupings of bits in the processing segment are used: bit portions 205, and combination arrays 207.

As illustrated in FIG. 2, each bit portion 205 generally comprises a plurality of consecutive bits, and each combination array 207 generally comprises a sub-group of consecutive bits (or a single bit) from a bit portion 205.

In this example, a 64 KB processing segment 203 is divided into a plurality of bit portions 205 each having a bit portion length $L_{BP}$ of 6 bits. As shown in FIG. 2, each of the bit portions 205 comprises a permutation of 6 bits, where the first three bit portions have permutations of 011100, 100110 and 111100 respectively. The first bit portion, comprising the bit permutation 011100, is considered to have a bit portion (BP) value of 011100, or 28 in base 10.

Dividing each processing segment 203 up into bit portions 205 provides a way of analysing the characteristics of the processing segment 203, where the results of this analysis are used to determine the prospects for compressing the segment 203 using a particular bit length.

Advantageously, the size of the bit portions 205 is not predetermined, and it can therefore be determined for each processing segment 203 what size of bit portion provides the best prospects for compressing the segment 203.

In this example, the bit portion 205 has a bit portion length $L_{BP}$ of 6 bits, which are sub-divided into three combination arrays 207. The first two combination arrays each comprise a single bit, and the third combination array comprises four consecutive bits. As shown in FIG. 2, all bit portions 205 are divided up into combination arrays of the same configuration—in this example the configuration is: [1 bit array][1 bit array][4 bit array]. As also shown in FIG. 2, while the configuration (or pattern) of combination arrays 207 is the same for each bit portion 205 of a processing segment 203, the contents of the combination arrays 207 may vary between each bit portion 205, depending on the permutation of bits in each bit portion 205.

As shown in FIG. 2, each of the combination arrays comprises permutation of any number of bits (including one bit), where the number of bits in the permutation depends on the combination array (CA) configuration. In FIG. 2, the first three combination arrays have permutations of 0, 1 and 1100 respectively. These first three combination array permutations are considered to have combination array (CA) values of 0, 1 and 1100 respectively; or 0, 1 and 12 respectively in base 10.

In some alternative embodiments, processing segments are only divided up into groups of consecutive bits (or single bits) once, without these groups (e.g. bit portions 205) being sub-divided into further groups of consecutive bits or single bits (e.g. combination arrays 207).

Although in this example the bit portion 205 comprises three combination arrays 207, the bit portion can advantageously be divided into any number of combination arrays 207, each combination array 207 having any size. This means that the particular configuration of compression arrays can be selected to provide optimised compression for a particular segment. In this example, where the bit portion length $L_{BP}$ of the bit portions 205 is 6 bits, there are 32 different possible configurations of the combination arrays 207, as set out below:

TABLE 2

Configurations for a Combination Array Bit portion length $L_{BP}$ of 6

{1,1,1,1,1,1},{1,1,1,1,2,0},{1,1,1,2,1,0},{1,1,1,3,0,0},{1,1,2,1,1,0}, {1,1,2,2,0,0},
{1,1,3,1,0,0},{1,1,4,0,0,0},{1,2,1,1,1,0},{1,2,1,2,0,0},{1,2,2,1,0,0}, {1,2,3,0,0,0},
{1,3,1,1,0,0},{1,3,2,0,0,0},{1,4,1,0,0,0},{1,5,0,0,0,0},{2,1,1,1,1,0}, {2,1,1,2,0,0},
{2,1,2,1,0,0},{2,1,3,0,0,0},{2,2,1,1,0,0},{2,2,2,0,0,0},{2,3,1,0,0,0}, {2,4,0,0,0,0},
{3,1,1,0,0},{3,1,2,0,0,0},{3,2,1,0,0,0},{3,3,0,0,0,0},{4,1,1,0,0,0}, {4,2,0,0,0,0},
{5,1,0,0,0,0},{6,0,0,0,0,0},

In Table 2, each set of six numbers within curly brackets represents a possible configuration of combination arrays 207. Each number represents the size of a combination array in bits, where 0 indicates that no array is used. For example, {1, 1, 3, 1, 0, 0} denotes dividing a bit portion 205 into four combination arrays 207, the first two combination arrays comprising a single bit each, followed by a 3 bit combination array, in turn followed by another single bit array.

It is noted that the total number of different possible configurations of combination arrays depends on the bit portion length, where the number of possible configurations is equal to $2^{L_{BP}-1}$.

As stated above, the configuration of combination arrays is selected to provide the best compression of a segment 203. Generally, all bit portions 205 of a particular processing segment 203 are divided into the same configuration of combination arrays and the combination array configuration exploits any patterns, repetition and/or redundancy in the processing segment 203 in order to achieve effective compression.

Overview—Combine Method

The concept of combining different data values will now be introduced and explained, by way of example only.

A byte can hold a value between 0 (00000000) and 255 (11111111). The ASCII standard provides for representation of characters, letters or symbols where each character, letter or symbol is represented using an ASCII code which has a value of between 0 and 255. As a result, each letter, character or symbol requires one byte of information to be represented, as Table 1, below, illustrates.

TABLE 1

| Letter | ASCII Code | Binary | Letter | ASCII Code | Binary |
|---|---|---|---|---|---|
| a | 097 | 01100001 | A | 065 | 01000001 |
| b | 098 | 01100010 | B | 066 | 01000010 |
| c | 099 | 01100011 | C | 067 | 01000011 |
| d | 100 | 01100100 | D | 068 | 01000100 |
| e | 101 | 01100101 | E | 069 | 01000101 |
| f | 102 | 01100110 | F | 070 | 01000110 |
| g | 103 | 01100111 | G | 071 | 01000111 |
| h | 104 | 01101000 | H | 072 | 01001000 |
| i | 105 | 01101001 | I | 073 | 01001001 |
| j | 106 | 01101010 | J | 074 | 01001010 |
| k | 107 | 01101011 | K | 075 | 01001011 |
| l | 108 | 01101100 | L | 076 | 01001100 |
| m | 109 | 01101101 | M | 077 | 01001101 |
| n | 110 | 01101110 | N | 078 | 01001110 |
| o | 111 | 01101111 | O | 079 | 01001111 |
| p | 112 | 01110000 | P | 080 | 01010000 |
| q | 113 | 01110001 | Q | 081 | 01010001 |
| r | 114 | 01110010 | R | 082 | 01010010 |
| s | 115 | 01110011 | S | 083 | 01010011 |
| t | 116 | 01110100 | T | 084 | 01010100 |
| u | 117 | 01110101 | U | 085 | 01010101 |
| v | 118 | 01110110 | V | 086 | 01010110 |
| w | 119 | 01110111 | W | 087 | 01010111 |
| x | 120 | 01111000 | X | 088 | 01011000 |
| y | 121 | 01111001 | Y | 089 | 01011001 |
| z | 122 | 01111010 | Z | 090 | 01011010 |

Considering, for example, the letters J and o, these have ASCII codes of 74 (01001010) and 111 (01101111) respectively. Therefore, a conventional representation of the name Jo would be 0100101001101111, which is 16 bits long.

The number of bits required to represent the name can be decreased by combining the respective ASCII values using at least one mathematical operation. For example, the two values can be added together:

74+111=185

Advantageously, the number 185 can be represented in binary using only 8 bits (10111001), therefore saving 8 bits on the 16 bit value of 0100101001101111.

However, the letters J and o are not the only combination of letters which would sum to give the total 185. For example, the letters I and p would also yield the total 185 when added together. This is referred to as a collision.

Therefore, in this example it is necessary to provide additional disambiguation information in order to indicate which of the potential combinations of ASCII characters is being represented.

The number of collisions (i.e. combinations resulting in the same total when combined using a mathematical operation such as addition) can be decreased by changing the numeric value used to represent the characters being combined.

For example, the first ASCII character value can be multiplied by 10 before the two values are combined. Taking the example of "Jo" again:

74×10+111=740+111=851

The number 851 can be represented in binary using only 10 bits (1101010011), therefore saving 6 bits on the 16 bit value of 0100101001101111.

In this example, it is also necessary to provide additional disambiguation information in order to indicate which of the potential combinations of ASCII characters is being represented.

However, multiplying the first ASCII character value by 10 before the two values are added has the effect of reducing the number of combinations yielding the same result ("collisions"). This means that less additional disambiguation information is required.

Collisions when combining bytes can be reduced still further by replacing the ASCII values used to represent characters with numeric labels. Labels can also reduce the number of bits used to represent the combined value. For example, if the letters J and O are represented by the labels 0 and 1 respectively, then combining the two labels using addition results in a combined value of 1. As long as no other characters are assigned the labels 0 or 1, the combined value of 1 will be unique, with no collisions occurring. Moreover, in this example the combined value can be represented using only 1 bit.

Although described with reference to ASCII characters for ease of understanding, the above-described methods of combining data can be applied to any data, comprising any number of bits.

The methods described herein allow data, such as a file, to be compressed by dividing the data into groups of bits, assigning labels to the groups of bits and then "combining" two or more of these groups of data together by combining their respective labels. In some embodiments, the combining comprises a mathematical operation such as addition.

In an e-book that uses letters and numbers (see Table 1), it is possible that either the first bit or the last bit is only ever 0 and the 1 is never used, or vice versa, depending on encoding.

Advantageously, in preferred embodiments the way in which a file is divided into groups of bits can be chosen in order to provide improved compression of the file. For example, when one part of the file is being processed it may be divided up in a different way to another part of the file.

Also, the preferred embodiments allow data from different types of media, and by extension having vary different characteristics, to be compressed effectively, due to the flexibility when dividing the data into groups of bits and assigning labels to the groups of bits. Existing compression techniques tend to be more effective in compressing particular types of media data (e.g. text, image data or the like) because they are better optimised for the inherent characteristics of that data. Advantageously, the preferred embodiments can achieve compression of files and/or data which would ordinarily be difficult to compress using such existing compression techniques.

Overview—Assigning Labels

The bits of the processing segment are analysed to determine a way of dividing the processing segment into groups of bits which will allow compression to be achieved when labels are assigned to the groups of bits. The processing segment is then divided into groups of bits according to the determined configuration. The groups of bits may comprise bit portions and/or combination arrays as introduced above.

Next, a label is assigned to each of the groups of bits, wherein each label is unique (although generally only unique for the processing segment being processed; labels may be reused between processing segments). Some or all of the labels may comprise multiple parts. Preferably, all labels comprise a first part which acts as a primary identifier of the bit portion value (later referred to as "Combined new CA value").

The first part of the bit label may uniquely (i.e. unambiguously) identify a bit portion value, in which case the label need only comprise the first part. However, when the first part of the label does not unambiguously identify the bit portion value (i.e. multiple different bit portion values are associated with the same first part of the label), the label further comprises a second part (later referred to as "Combined disambiguation information DI").

The purpose of the second part of the label is to identify which of the multiple different bit portion values associated with the first part is being represented by the label.

In order to illustrate this with an example, consider the following four different bit portion values:

01011, 10110, 10111, 10010

Each of these four different bit portion values may be associated with the same first part of a label (e.g. 11):

| 01011, | 10110, | 10111, | 10010 |
|--------|--------|--------|-------|
| ↓ | ↓ | ↓ | ↓ |
| 11 | 11 | 11 | 11 |

In such a case, each bit portion value can be unambiguously identified using one of four second parts of the label (e.g. 00, 01, 10, 11):

| 01011, | 10110, | 10111, | 10010 |
|--------|--------|--------|-------|
| ↓ | ↓ | ↓ | ↓ |
| 11 | 11 | 11 | 11 |
| 00 | 01 | 10 | 11 |

In the examples provided here, the complete label for the bit portion values would be as follows:

| 01011, | 10110, | 10111, | 10010 |
|--------|--------|--------|-------|
| ↓ | ↓ | ↓ | ↓ |
| 1100 | 1101 | 1110 | 1111 |

Preferably, the length of the first part in bits remains constant for all bit portion values in a processing segment 203, while the length of the second part can vary, or the second part may not be used at all to identify some bit portion values.

It can therefore be seen that the label as a whole can vary in length of bits. All the labels used for the bit portion values of a particular processing segment can vary in length but share a common minimum length, corresponding to the length of the first part of the label. However, between different processing segments the length of the first part of the label can vary, as it is assigned based on frequency analysis of the processing segment (as described in further detail below).

Method of Selecting Bit Portion Length

FIGS. 3A to 3D illustrate a method of selecting what bit portion length $L_{BP}$ should be used when dividing a processing segment 203 into a number of bit portions 205.

This is done by dividing the processing segment 203 up into bit portions 205 of different bit portion lengths $L_{BP}$, and performing frequency analysis for each of the different bit portion lengths used.

Some existing compression techniques use fixed bit portion lengths. It has been found that by using variable bit portion lengths, which can change depending on which part of a file is being processed, additional compression can be obtained which would otherwise not have been achievable.

Figure 3A:
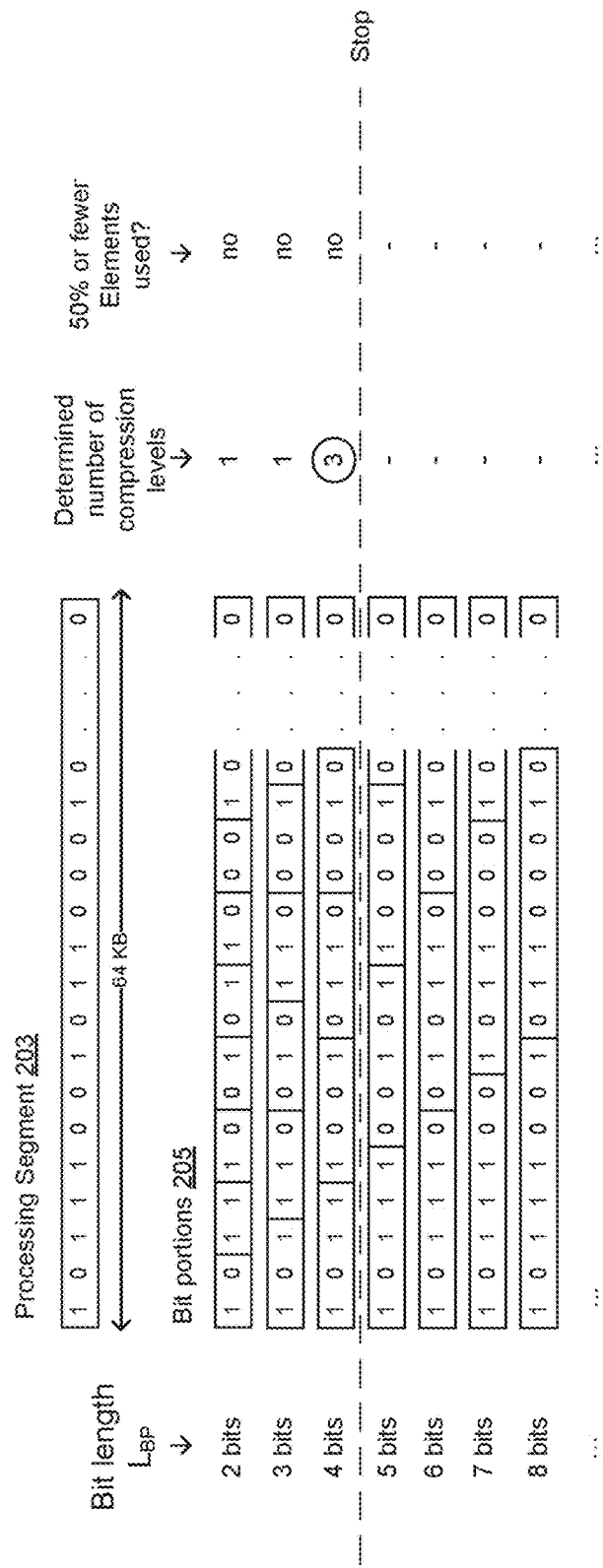
Figure 3D:
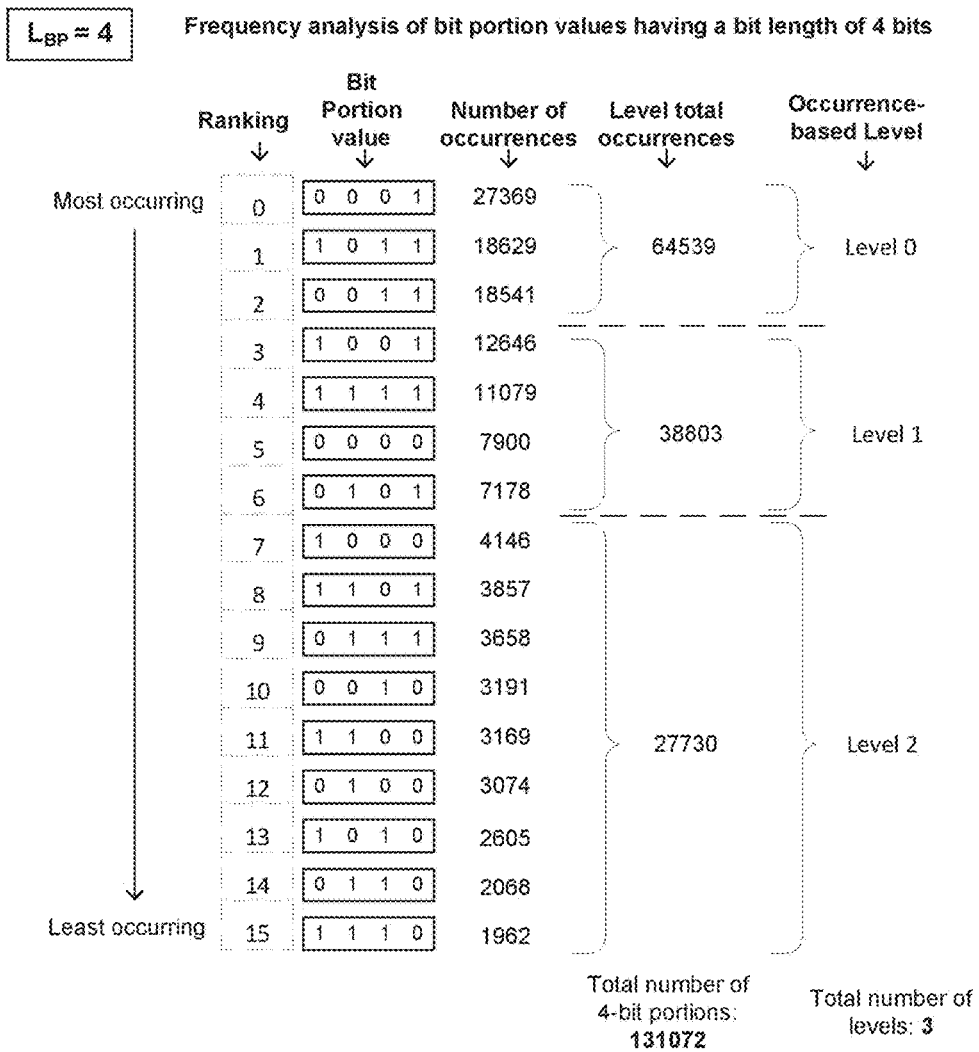
Figure 4A:
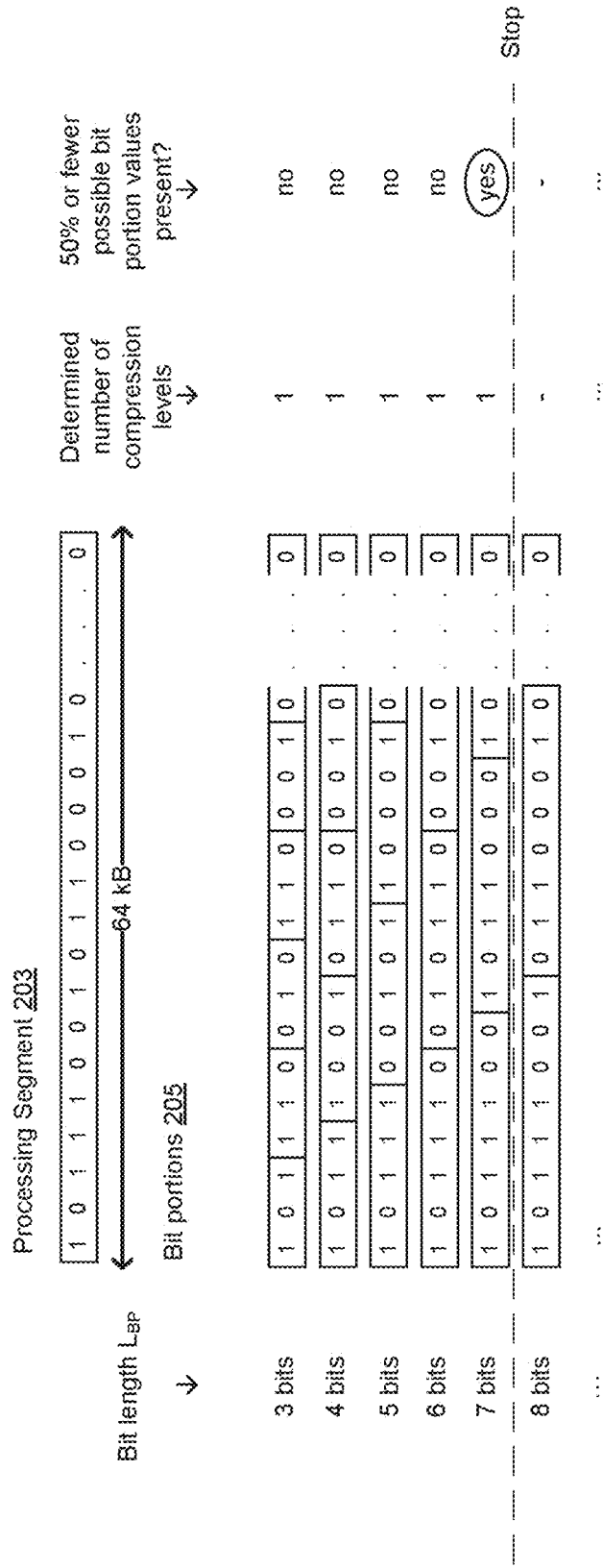

FIGS. 3A and 4A provide overviews of the frequency analysis results obtained for bit portion lengths 2 to 4 and 3 to 7 respectively, with different exemplary results. FIGS. 3B, 3C, 3D and 4B illustrate frequency analysis performed on bit portion lengths of 2, 3, 4 and 7 respectively.

As shown in FIG. 3A, in this example a bit portion length of 2 bits is tested first. The processing segment 203 is divided up into a plurality of bit portions 205, each having a bit portion length of 2 bits. As shown in FIG. 3A, frequency analysis is performed on the bit portions 205 of this initial bit portion length $L_{BP}=2$, and it is determined whether at least one of two criteria are fulfilled.

The first criterion is whether two or more compression "levels" (levels are described further below) are present within the analysed bit portion BP values, and the second criterion is whether 50% or fewer of the possible bit values are present in the processing segment 203.

If neither of the criteria are fulfilled, the bit portion length is incremented by one bit—to 3 bits—and the processing segment 203 is re-divided up into a plurality of bit portions 205, this time each having a bit portion length of 3 bits. For each bit portion length being tested, if the frequency analysis results fail to fulfil either of the two criteria, the next bit portion length is tested (i.e. the bit portion length is incremented by one bit and the processing segment 203 is re-divided up into a plurality of bit portions 205, each having the same number of bits as the current bit portion length).

FIG. 3B illustrates the frequency analysis performed on the plurality of bit portions 205, in this case each having a bit portion length of 2 bits. As each bit portion 205 of the processing segment 203 is only made up of 2 bits, a bit portion 205 can only have one of four values—00, 01, 10 or 11. Once the processing segment 203 has been divided into the plurality of bit portions 205, the number of occurrences of each possible bit portion value is determined (i.e. the frequency of each value).

The bit portion values are then sorted in order of most occurring to least occurring, as shown in FIG. 3B. In this example, the bit portion value 01 occurs the greatest number of times, with 65,538 occurrences and the bit portion value 00 occurs the least number of times, with 65,533 occurrences.

The number of compression levels is then determined based on the number of occurrences of each of the bit portions values.

The level in which a bit portion (BP) value is placed determines how many bits the label assigned to the BP value will have. All BP values in the same level will be assigned the same number of bits. In preferred embodiments, the $1^{st}$ level (level 0) is allocated labels with the minimum possible number of bits. Furthermore, in preferred embodiments, the labels allocated to each successive level are one bit longer than the previous level. An exemplary set of labels and associated labels are shown in Table 3 below.

TABLE 3

| Level | Label |
|---|---|
| 0 | 00 |
| 0 | 01 |
| 1 | 100 |
| 1 | 101 |
| 2 | 1100 |
| 2 | 1101 |
| 2 | 1110 |
| 2 | 1111 |

In preferred embodiments, a "level" is defined as being a group of bit portion values in which none of the bit portion values occur less than half as frequently as the most occurring bit portion value in that group. For example, in a group of bit portion values where the most occurring bit portion value occurs 28,000 times, all of the bit portion values in the group will have occurrences greater than 14,000. In the example shown in FIG. 3B, the least occurring bit portion value occurs 65,533 times, and therefore all of the bit portion values are considered to occupy the same level. Bit portion length $L_{BP}=2$ therefore fails to satisfy the first criterion.

Next, it is determined whether 50% of the possible bit portion values occur in the processing segment. For example, if only the bit portion values 01 and 11 occurred in the processing segment 203, and bit portion values 10 and 00 both never occurred, then exactly 50% of the possible bit portion values are present in the processing segment. This would be an indication that the processing segment 203 can be compressed using the selected bit portion length. However, in the example illustrated in FIG. 3B all four of the possible bit portion values are present in the processing segment and therefore 100% of the possible bit portion values are present. As can be seen in FIG. 3A, the bit portion length of 2 bits is listed as having one compression level and as not satisfying the requirement that 50% or fewer of the possible bit portion values are present. Bit portion length $L_{BP}=2$ therefore fails to satisfy the second criterion.

Therefore, the processing segment 203 is divided into a plurality of bit portions each having a bit portion length of 3 bits instead of 2 bits and frequency analysis is again performed. This is illustrated in FIG. 3C. FIG. 3C shows that if bit portion length $L_{BP}=3$ there are 8 possible bit portion values.

The bit portion values are then sorted in order of most occurring to least occurring, as shown in FIG. 3C. In this example, the bit portion value 011 occurs the greatest number of times, with 21,851 occurrences and the bit portion value 101 occurs the least number of times, with 21,833 occurrences.

Bit portion length $L_{BP}=3$ therefore fails to satisfy the first criterion.

Furthermore, in the example illustrated in FIG. 3C all eight (i.e. 100%) of the possible bit portion values are present in the processing segment. Bit portion length $L_{BP}=2$ therefore fails to satisfy the second criterion.

Next, the processing segment 203 will be divided into a plurality of bit portions 205 having a bit portion length of 4 bits. This is illustrated in FIG. 3D.

FIG. 3D shows that if bit portion length $L_{BP}=4$ there are 16 possible bit portion values.

As shown in FIG. 3D, bit portion values are sorted in order of most occurring to least occurring. In this example, the bit portion value 0001 occurs the greatest number of times, with 27,369 occurrences and the bit portion value 1110 occurs the least number of times, with 1,962 occurrences.

Therefore, unlike for bit portion lengths 2 and 3 described above, multiple compression levels are present within the analysed bit portion BP values. Specifically, the 4th BP value (1001) occurs 12,646 times, which is less than half of 27,369. Therefore, the 4th bit portion value belongs to a $2^{nd}$ level (level 1).

Furthermore, the $8^{th}$ BP value (1000) occurs 4,146 times, which is less than half of 12,646. Therefore, the 4th bit portion value belongs to a $3^{rd}$ level (level 2).

This means that three levels are present, and bit portion length $L_{BP}=4$ therefore satisfies the first criterion.

As a result, bit portion length $L_{BP}=4$ would be selected as the chosen bit portion length in this example.

In the exemplary method of FIG. 4A, the processing segment 203 is initially divided up into a plurality of bit portions 205 each having a bit portion length of 3 bits (rather than 2 bits as illustrated in FIG. 3A). As the exemplary results of FIG. 4A, none of bit portion lengths 3 to 6 satisfy either of the criteria.

FIG. 4B shows exemplary frequency analysis results for bit portion length $L_{BP}=7$. If bit portion length $L_{BP}=7$, there are 128 possible bit portion values (some are omitted for legibility).

As shown in FIG. 4B, bit portion values are sorted in order of most occurring to least occurring. In this example, all bit portion values from the 10th value onwards have an occurrence of 0, and therefore bit portion length $L_{BP}=7$ satisfies the second criterion. BP values with an occurrence of 0 are not assigned to a level, and therefore the total number of levels present for $L_{BP}=7$ is 1 (the first criterion is therefore not fulfilled).

As a result, bit portion length $L_{BP}=7$ would be selected as the chosen bit portion length in this example.

It is noted that in the particular example illustrated in FIG. 4B, it is possible to achieve improved compression by assigning levels according to alternative embodiments, such as those described below.

Alternative Method of Selecting Bit Portion Length

FIGS. 5A to 5E illustrate an advantageous alternative method of selecting a bit portion length $L_{BP}$. The method involves testing multiple bit portion lengths and determining if compression of the processing segment can be achieved using the bit portion length being tested, and if so how much compression can be achieved.

The determination is made by assigning labels to each of the possible bit portion (BP) values, and then determining whether the processing segment 203 can be represented using fewer bits if the bit portions are represented using their respective labels (i.e. determining whether the processing segment 203 can be compressed using the labels). In order to assign the labels and make the determination as to whether compression can be achieved, frequency analysis is performed on the bit portion values to determine how many times each possible bit portion value occurs within the processing segment 203.

Figure 5A:
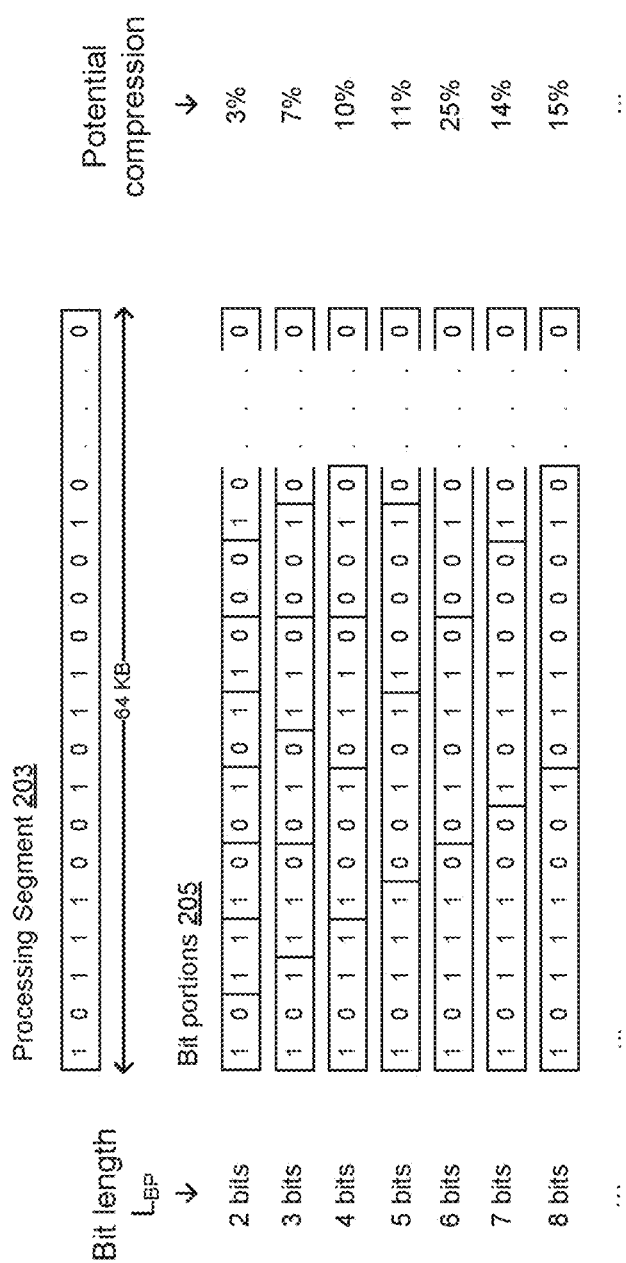

The frequency analysis results in a value for the achievable compression of the processing segment 203 for each bit portion length tested (i.e. the minimum compression that is known to be achievable for the processing segment based on the chosen bit portion length). In FIG. 5A, bit portion lengths from 2 bits to 8 bits are tested, with achievable compressions ranging from 3% (2 bits) to 25% (6 bits). It is noted that the final compression achieved for the selected bit portion length, once the full compression method described below has been carried out, may be higher than the achievable compression value.

It can also been seen from FIG. 5A that the bit portion length having the highest potential compression is 6 bits, whereas a bit portion length of 8 bits would, for this particular segment being processed, have a lower potential compression. Therefore, in this case any compression techniques which divide the processing segment into bytes (i.e. 8 bits) would fail to exploit potential additional compression.

As illustrated by the exemplary bit values in FIG. 5A, the same processing segment 203 comprising the same bits may be analysed multiple times, being divided into bit portions 205 of different sizes each time.

As shown in FIG. 5A, frequency analysis using different bit portion lengths is performed on a processing segment, in this example of size 64 KB (only the first 16 bits and the final bit of the segment are shown for simplicity).

FIGS. 5B and 5C illustrate the frequency analysis performed on the processing segment 203 when divided up into a plurality of bit portions 205, each having a bit portion length of 4 bits. As each bit portion 205 of the processing segment 203 is made up of 4 bits, a bit portion 205 can have one of sixteen values—from 0 (0000) to 15 (1111).

Once the processing segment 203 has been divided into the plurality of bit portions 205, the number of occurrences of each possible bit portion value is determined (i.e. the frequency of each value). The bit portion values are then sorted in order of most occurring to least occurring, as shown in FIG. 5B. In this example, the bit portion value 0001 occurs the greatest number of times, and the bit portion value 1110 occurs the least number of times.

The default order of bit portion values is from smallest to largest, and therefore when two bit portion values have the same number of occurrences within a processing segment (which may be, for example, zero), the bit values are not sorted and accordingly will remain in size order. As shown in FIG. 5B, each of the sorted bit portion values is associated with a ranking corresponding to their sorted position. As can be seen, the most occurring bit portion value is ranked 0 and the least occurring bit portion value is ranked 15.

In some embodiments, the sorted bit portion values are assigned new values which correspond to their ranking, with value 0000 corresponding to ranking 0, and value 1111 corresponding to value 15.

Referring to FIGS. 5B and 5C, in some embodiments the sorted bit portion values are not renumbered with new values, for example when fewer than 50% of the BP values occur in the processing segment being analysed.

The occurrences of the bit portions are then analysed in order to split the BP values into levels where possible. As explained above, a "level" is defined as being a group of bit portion values in which none of the bit portion values occur less than half as frequently as the most occurring bit portion value in that group. For example, in a group of bit portion values where the most occurring bit portion value occurs 28,000 times, all of the bit portion values in the group will have occurrences greater than 14,000.

In the example shown in FIG. 5B, it is determined that the BP values can be grouped to create three levels. These levels are referred to as occurrence-based levels. As can be seen, in Level 0 the highest occurring bit portion value has 27369 occurrences; in Level 1 the highest occurring bit portion value has 12646 occurrences; and in Level 2 the highest occurring bit portion value has 3923 occurrences.

In some alternative embodiments, the levels can be defined using different methods. For example, the occurrences of the BP values may be analysed in order to determine whether the occurrences can be divided into two or more groups in which the total number of occurrences of one group (i.e. all occurrence counts in the group summed) of one group is less than or equal to half the total number of occurrences of another group.

If there are only two levels in a bit portion, compression cannot be achieved unless the bit portion is broken up into two or more combination arrays (see below for description of how bit portions are broken up into combination arrays). For example, if a bit portion length of 4 is used, and two levels are present within the bit portion values, the bit portion can then be broken into two combination arrays. It has been found that one combination array may have one level in its CA values, while the other CA may have three levels in its CA values (this becomes more likely the longer the bit portion length being used).

Once each of the bit portion values has been assigned to an occurrence-based level, each of the bit portion values can be assigned an initial label 403. However, in some preferred embodiments the BP values are first re-grouped into optimised levels before the initial labels 403 are assigned. This re-grouping of the BP values into optimised levels is illustrated in FIG. 5C.

The initial labels are assigned to bit portion values to determine an achievable compression ratio for the processing segment 203, and whether compression can be achieved at all. They are referred to as "initial labels" because the actual labels assigned to bit portions may be different once the full compression method as described below is carried out.

As can be seen in FIG. 5B, the initial labels 403 have varied lengths, but in general bit portion values with a high frequency of occurrences are assigned a short initial label (e.g. 3 bits long) and bit portion values with a low frequency of occurrence are assigned a longer initial label (e.g. 5 bits long).

As can also be seen from FIG. 5B, the initial labels 403 can comprise one or two parts: all initial labels 403 comprise a new bit portion (BP) value part; while some initial labels 403 additionally comprise a disambiguation part.

The new values act as primary identifiers of the bit portion values, and all new BP values assigned have the same length in bits—in the example shown in FIG. 5B, all new BP values are three bits long. The size in bits of the new BP values is determined by the maximum new BP value. In this case the maximum new BP value is 7, which is represented in binary as 111, and as a result all new BP values comprise three bits. However, if the maximum new BP value was 8, this would be represented in binary as 1000, and as a results all new BP values would comprise 4 bits.

However, new BP values do not unambiguously identify an associated bit portion value in all cases because in some cases the same new BP value is assigned to multiple BP values. In such cases, a disambiguation value is used to identify a particular one of the multiple bit portion values associated with the same new BP value.

In order to ensure that the most frequently occurring bit portion values are assigned the shortest initial labels, the bit portion values in the first level (Level 0) are each assigned unique new values, as can be seen in FIG. 5B. No disambiguation values are therefore used, and the initial label assigned to the bit portion values of level 0 only comprises the new value part.

When assigning new bit portion values to the bit portion values in level 1 onwards, the same new BP values can be assigned to multiple BP values. Where this re-use of new BP values occurs, the number of disambiguation values which are needed corresponds to the number of bit portion values which have been assigned the same new bit portion value.

For example, if four bit portion values have been assigned the same new bit portion value, four disambiguation values are required in order to unambiguously identify a particular bit portion value. This means that each disambiguation value will comprise two bits. It will be appreciated that, in general, the higher the number of BP values which are assigned the same new BP value, the larger the disambiguation value which is assigned to each BP value.

To achieve compression, bit portion values with a high frequency of occurrences should generally be assigned a short initial label and bit portion values with a with a low frequency of occurrence should generally be assigned a longer initial label. Since the new BP values comprise the same number of bits for all possible BP values, it is the disambiguation which principally affects the size of the initial label 403.

As a general rule, the lower the level (where Level 0 is the lowest), the fewer BP values are assigned the same new BP value. In this embodiment, the maximum number of repetitions of a new bit portion value is set to be $2^{Lev}$, where Lev is the level of the bit portion values being assigned new values. For example, in level 2, the same new bit portion value can be assigned to up to 4 bit portion values.

A more general example of new BP value repetition is shown in Table 4, below.

TABLE 4

| BP Level | New BP Value |
| --- | --- |
| Level 0 | $z_0$ |
| Level 0 | $z_1$ |
| Level 0 | $z_2$ |
| Level 0 | $z_3$ |
| Level 0 | $z_4$ |
| Level 1 | $z_5$ |
| Level 1 | $z_5$ |
| Level 1 | $z_6$ |
| Level 1 | $z_6$ |
| Level 2 | $z_7$ |
| Level 2 | $z_7$ |
| Level 2 | $z_7$ |
| Level 2 | $z_7$ |

As shown in Table 4, each new BP value is repeated $2^{Lev}$ times. In level 0, new BP values are repeated $2^0=1$ times each. In level 1, new BP values are repeated $2^1=2$ times each. In level 2, new BP values are repeated $2^2=4$ times each.

In FIG. 5B, level 2 comprises 9 BP values. In this level new BP values can be assigned to up to four original BP values. Therefore, the four most-occurring BP values are assigned the new BP value 5, the next four most-occurring BP values are assigned the new BP value 6, and the remaining BP value in Level 2 is assigned the new BP value 7.

In such a situation, as can be seen from FIG. 5B the new BP value 7 is unique, and therefore the least-occurring BP value in Level 2 is not assigned a disambiguation value. This means that the least-occurring BP value in Level 2 has an initial label of only 3 bits, while the rest of the (more-occurring) BP values in level 2 have initial labels of 5 bits. This is not optimum for compression, and therefore a method of level optimisation is used to move BP values between levels, as illustrated in FIG. 5C.

Nevertheless, even without any level optimisation having been performed, it can be seen from FIG. 5B that compression can be achieved. The size in bits of each occurrence-based label is shown in FIG. 5B, and from this the number of bits used to represent the BP values in each level can be determined. This is given by the total number of occurrences for a level multiplied by the occurrence-based label size.

The total number of bits used to represent all of the BP values in the bit portion 203 can then be determined by summing the number of bits used for each level. As shown in FIG. 5B, this is equal to 483555, which is less than the total number of bits in the processing segment (524288). Accordingly, assuming a header size of 121 bits, a 7.7% compression is possible. In some embodiments, the bit portion length may be selected based on this possible compression measure, without any optimisation of the levels (since compression is achieved without optimisation in some cases).

FIG. 5C illustrates how the bit portion length is selected according to preferred embodiments, where levels are optimised before the potential compression is determined.

In FIG. 5C, BP values are first re-grouped into optimised levels before the initial labels 403 are assigned. The occurrence-based levels determined in FIG. 5B are indicated on FIG. 5C using dashed braces. It can therefore be seen that the optimised levels are generally different to the occurrence based levels.

A general aim of level optimisation is to ensure that the number $N_{Lev}^{BP}$ of BP values in each level is divisible by $2^{Lev}$ without remainder, where Lev is the level. This ensures efficient use of the assigned new BP values.

This can be represented mathematically as:

$$N_{Lev}^{BP} \bmod 2^{Lev} = 0 \qquad \text{Equation 1}$$

For example, as shown in FIG. 5B, Level 2 includes 9 BP values, so $N_{Lev}^{BP}=9$, and for Level 2, Lev=2, therefore the number $N_{Lev}^{BP}$ of BP values in the level is not divisible by $2^{Lev}$ without a remainder.

Specifically:

$$N_{Lev}^{BP} \bmod 2^{Lev} = 9 \bmod 2^2 = 9 \bmod 4 = 1$$

The result of $N_{Lev}^{BP} \bmod 2^{Lev}$ can be used to indicate how many BP values should be moved out of the level and into a different level. In this example, one BP value should be moved out of level 2.

In some examples, the condition $N_{Lev}^{BP} \bmod 2^{Lev}=0$ is satisfied by moving the highest-occurring BP values in the level from level Lev to level Lev −1. In the present example, the most-occurring BP value, 1000, is moved from level 2 to level 1.

It will be appreciated that in other examples, the condition $N_{Lev}^{BP} \bmod 2^{Lev}=0$ may be satisfied by adding additional BP values to the level (e.g. the lowest-occurring BP values from level Lev −1 are moved to level Lev).

In this way, the levels are optimised such that the number of BP values in each level is a multiple of $2^{Lev}$ or equal to $2^{Lev}$, satisfying $N_{Lev}^{BP} \bmod 2^{Lev}=0$.

This process of determining whether the number $N_{Lev}^{BP}$ of BP values in a level is divisible by $2^{Lev}$ is repeated for each level, from the highest level to level 0.

It is noted that for level 0, $N_{Lev}^{BP} \bmod 2^{Lev}$ will always equal 0, because $2^0$ is equal to 1. Therefore, the condition $N_{Lev}^{BP} \bmod 2^{Lev}=0$ is always fulfilled for level 0, regardless of how many bit portion values are present in level 0.

Preferred further conditions for optimising bit portion levels are described below.

An initial label 403 is assigned to each BP value based on its level, in a similar way to that shown in FIG. 5B.

The size in bits of each optimised initial label 403 is shown in FIG. 5C, and from this the number of bits used to represent the BP values in each level can be determined. This is given by the total number of occurrences for a level multiplied by the optimised initial label size.

As can be seen from FIG. 5B, the total number of bits used to represent the bit portions 205 of the processing segment 203 is 483555 when labels are assigned to bit portions 205 based on occurrences, without any optimisation of the levels. In contrast, as can be seen from FIG. 5C, the total number of bits used to represent the bit portions 205 of the processing segment 203 is 470687 when labels are assigned to bit portions 205 using optimised levels. This demonstrates that optimising levels results in a higher achievable compression.

FIGS. 5D and 5E illustrate how the achievable percentage compression of the processing segment is determined, based on a bit portion length $L_{BP}$ of 4 bits and the frequency analysis shown in FIGS. 5B and 5C.

FIG. 5D is a table which summarises the total possible bits used in the header 211 which is assigned to the compressed portion 209. As shown in FIG. 5D, this calculation is based on the header 211 comprising a signature, and information on the bit portion length, combination array configuration, and two types of label assignment information—"level counts" and "CA value information". A minimum and maximum size of each of these parts is determined, and summed in order to provide minimum and maximum total sizes of the header 211.

FIG. 5E is a table which shows the calculation of the achievable compression of the processing segment 203 as a percentage of its original size. The maximum header size is used in this calculation in order to ensure that the percentage compression is achievable.

As shown in FIG. 5E, the determined achievable compression for the processing segment based on a bit portion length $L_{BP}$ of 4 bits is 10.20%.

Preferred Conditions for Optimising Bit Portion Levels

In preferred embodiments, in addition to the condition defined by equation 1, level optimisation is based on the following further conditions.

Firstly, the number of levels in a bit portion should not exceed the bit portion length:

$$N_{BP}^{LevelsMax} = L_{BP} \qquad \text{Equation 2}$$

Secondly, the maximum new bit portion value should equal a target maximum new bit portion value $$\text{MaxNewBPVal} = \text{TargetMaxNewBPVal} \qquad \text{Equation 3}$$

Where the target maximum new bit portion value assigned to one or more bit portion values in a processing segment is defined as follows:

$$\text{TargetMaxNewBPVal} = 2^{\lfloor \log_2(N_{BP}^{Levels}) \rfloor + 1} - 1 \qquad \text{Equation 4}$$

And where the maximum new bit portion value is defined as follows:

$$\text{MaxNewBPVal} = \left( \sum_{Lev=0}^{Lev=N_{BP}^{Levels}-1} \frac{N_{Lev}^{BP}}{2^{Lev}} \right) - 1 \qquad \text{Equation 5}$$

$L_{BP}$ is the bit portion length in bits;
$N_{BP}^{Levels}$ is the number of levels into which the bit portions values of a bit portion 205 are divided;
$N_{BP}^{LevelsMAX}$ is the maximum number of levels into which the bit portion values of a bit portion 205 can be divided;
Lev is the level index, for example Lev=0 for level 0 and Lev=1 for level 1;
MaxNewBPVal is the maximum new bit portion value assigned to one or more bit portion values in a processing segment
TargetMaxNewBPVal is the target maximum new bit portion value assigned to one or more bit portion values in a processing segment;
$N_{Lev}^{BP}$ is the number of bit portion values in a level;
Splitting the analysed BP values into more levels, while still fulfilling the conditions above, typically results in a smaller maximum new value and therefore smaller initial labels 403 being assigned to each of the BP values. This allows greater compression to be achieved.

Method of Selecting Configuration of Combination Arrays

FIGS. 6A to 6D illustrate a method of determining which configuration of combination arrays 207 to use once a bit portion length $L_{BP}$ has been determined according to one or more of the methods described above. The method involves dividing the bit portions 205 into combination arrays 207 according to different configurations and performing frequency analysis on the combination arrays, in order to determine which configuration of combination arrays 207 has the best prospects for compressing the processing segment 203.

Figure 6A:
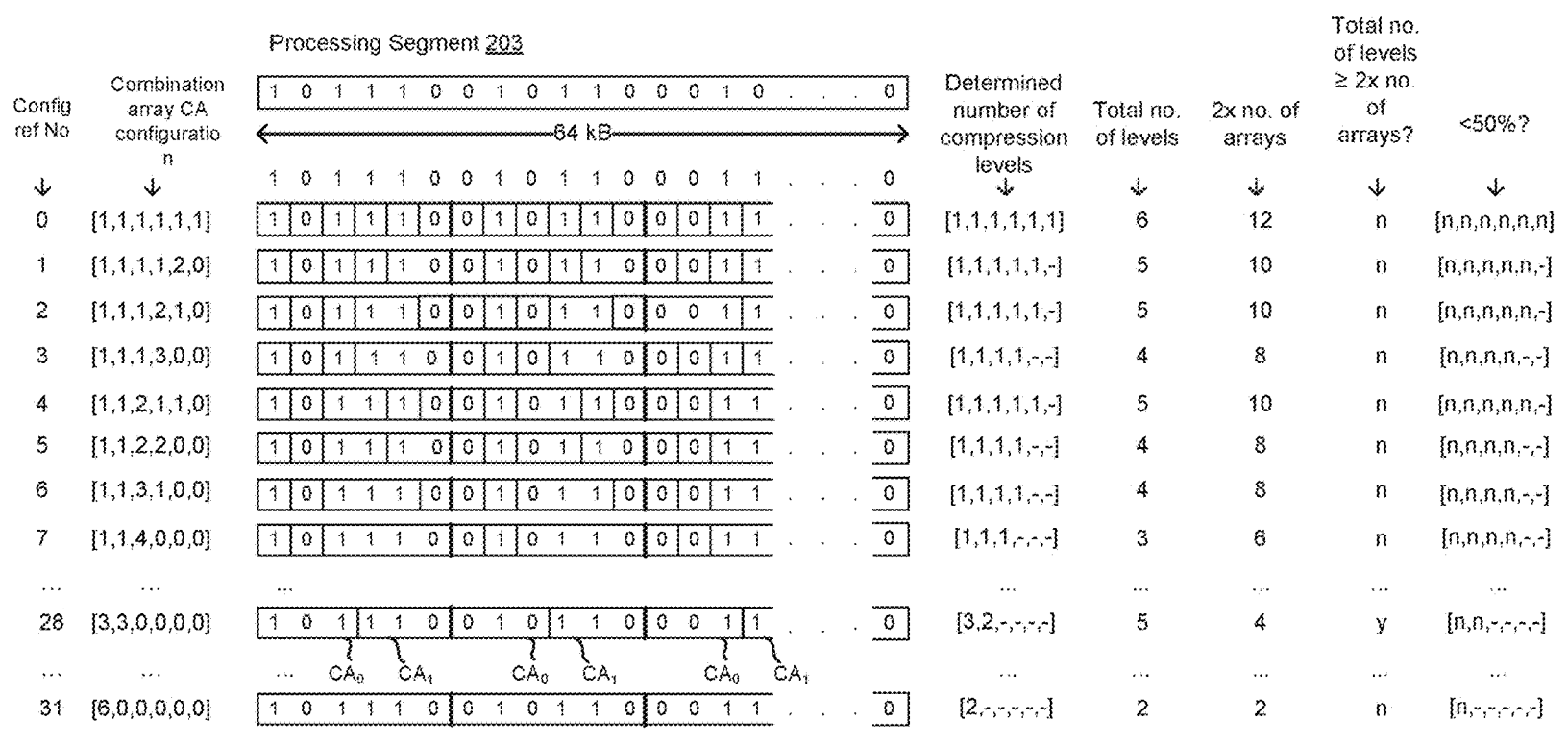
Figure 6D:
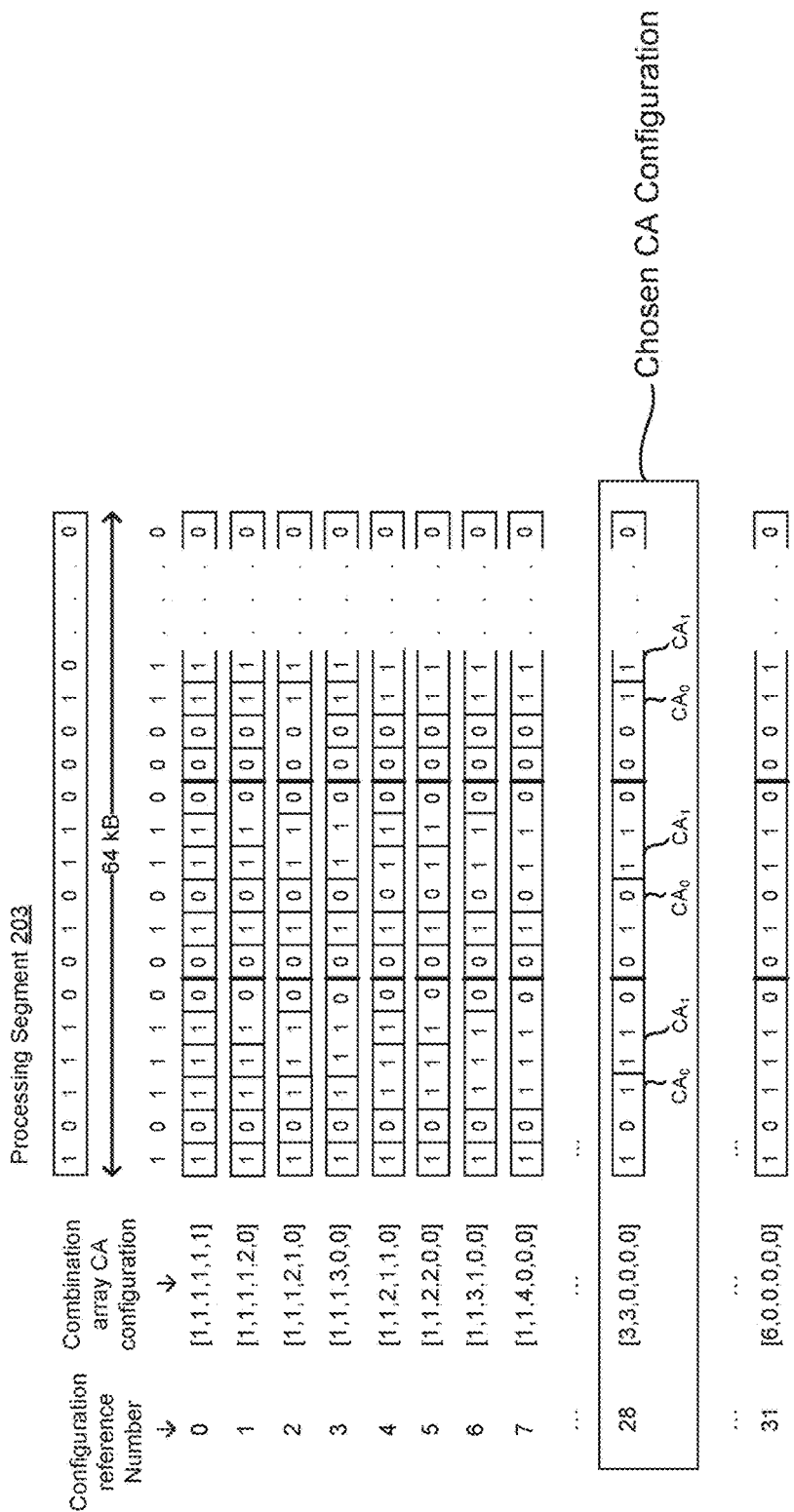

In FIGS. 6A to 6D an exemplary bit portion length $L_{BP}$ of 6 bits is used. As illustrated in Table 2, above, a bit portion 205 having a bit portion length $L_{BP}$ of 6 can be divided up into combination arrays using 32 different configurations. FIG. 6A provides a visual overview of how each bit portion 205 of a processing segment 203 is divided into combination arrays 207 according to the first 8 combination array (CA) configurations, the 29th CA configuration and the final ($32^{nd}$) CA configuration.

As shown in FIG. 6A, each of the possible CA configurations is assigned a reference number, in this example starting at 0 for the CA configuration [1, 1, 1, 1, 1, 1] and continuing to 31 for the CA configuration [6, 0, 0, 0, 0, 0].

Frequency analysis is performed on each of the combination array CA configurations, and it is determined whether at least one of two criteria is fulfilled. The first criterion is whether the total number of levels is greater than or equal to twice the number of arrays. The second criterion is whether, for any of the combination arrays of a CA configuration, 50% or fewer of the possible combination array values occur in the processing segment 203. These criteria are explained in further detail below with reference to FIGS. 6B and 6C. The second criterion is whether at least one bit value has an occurrence of 0 (i.e. there are no occurrences of the bit value within the processing segment).

For the purpose of explanation, the combination array configuration [3, 3, 0, 0, 0, 0] (reference number 28) will be considered.

The configuration [3, 3, 0, 0, 0, 0] dictates that each bit portion 205 is divided into two arrays, each comprising 3 bits.

As indicated in FIG. 6A, the first array is denoted $CA_0$, and the second array is denoted $CA_1$.

It will be appreciated that as $CA_0$ and $CA_1$ are each 3 bits long, each can have any of 8 different combination array values (CA values), as set out in Table 5, below.

TABLE 5

| Possible $CA_0$ values ($L_{CA0}$ = 3) | Possible $CA_1$ values ($L_{CA1}$ = 3) |
|---|---|
| 000 | 000 |
| 001 | 001 |
| 010 | 010 |
| 011 | 011 |
| 100 | 100 |
| 101 | 101 |
| 110 | 110 |
| 111 | 111 |

For each CA configuration (such as number 28 presently being considered), all equivalent combination arrays in the processing segment 203 are analysed collectively. For example, all the $CA_0$ arrays defined by CA configuration 28 are analysed to determine their values. The frequency of occurrence of each possible $CA_0$ value is determined, from which CA values can be assigned to levels. This is illustrated in FIG. 6B. The same analysis is done on all $CA_1$ arrays, as shown in FIG. 6C.

Considering FIG. 6B in more detail, the number of occurrences of each possible CA value is determined (i.e. the frequency of occurrence of each CA value within the segment). As shown, the most occurring value 010 occurs 30,000 times in the processing segment 203 and the least occurring value 100 occurs 3,981 times in the processing segment 203.

The $CA_0$ values are sorted in order of most occurring to least occurring (as long as more than 50% of the $CA_1$ values have an occurrence greater than 0 within the processing segment). The default order of CA values is from smallest to largest, and therefore when two CA values have the same number of occurrences within a processing segment (which may be, for example, zero), the CA values are not sorted and accordingly will remain in size order.

The number of compression levels is then determined based on the number of occurrences of each of the $CA_0$ values. In preferred embodiments, a "level" is defined as being a group of bit portion values in which none of the bit portion values occur less than half as frequently as the most occurring bit portion value in that group. In the example shown in FIG. 6B, the most occurring $CA_0$ value occurs 30,000 times, and the second most occurring $CA_0$ value occurs 20,000 times which is more than half of 30,000 and therefore both of the most occurring values are assigned to the same level (Level 0).

The third most occurring $CA_0$ value, 001, occurs 9,000 times within the processing segment 203. Since 9,000 is less than half of 30,000, the third most occurring $CA_0$ value 001 is assigned to a second level—Level 1.

As 9,000 is the highest occurring value in Level 1, any $CA_0$ values with an occurrence of less than 4,500 will be assigned to a different level. As shown in FIG. 6B, the sixth most occurring $CA_0$ value, 110, has an occurrence of 4,400, and therefore it is assigned to a third level—Level 2. No $CA_0$ values have an occurrence of less than 2,200, and therefore $CA_0$ has three levels in total.

Next, considering FIG. 6C in more detail, the second combination array $CA_1$ is analysed in the same way as for $CA_0$ in FIG. 4B. The frequency of occurrence of each possible $CA_1$ value is determined. As shown, the most occurring value 011 occurs 19,000 times in the processing segment 203 and the least occurring value 101 occurs 9,000 times in the processing segment 203.

In a similar way as performed for $CA_0$, the $CA_1$ values are sorted in order of most occurring to least occurring (as long as more than 50% of the $CA_1$ values have an occurrence greater than 0 within the processing segment). The number of compression levels is then determined based on the number of occurrences of each of the $CA_0$ values.

Using this technique for defining levels, it is found that the total number of levels for $CA_1$ is two levels.

The total number of levels for the CA configuration 28 [3, 3, 0, 0, 0, 0] is therefore 5 levels (3 levels for $CA_0$+2 levels for $CA_1$).

Turning back to FIG. 6A, the total number of levels for CA configuration 28 can be seen in the "total no. of levels" column. The "2× number of arrays" column indicates 4 for CA configuration 28 (as there are two combination arrays), and therefore the first criterion is fulfilled—the total number of levels is greater than twice the number of arrays.

It can be seen from FIGS. 6B and 6C that all the possible $CA_0$ values and all the possible $CA_1$ values occur in the processing segment 203, and therefore the second criterion is not fulfilled—for both of the combination arrays, more that 50% (in fact 100%) of the possible combination array values occur in the processing segment 203.

FIG. 6D illustrates that CA configuration 28 is treated at the chosen configuration, based on the analysis performed in FIGS. 6B and 6C. The chosen CA configuration is then used to compress the whole processing segment 203, by assigning labels to each of the bit portions 205 in the processing segment 203, where the labels are generated by splitting the bit portions 205 up into combination arrays 207 in accordance with CA configuration 28. This method of compressing the processing segment 203 is explained further below.

After the processing segment 203 is compressed using the chosen CA configuration, it is checked whether the compression has been successful (e.g. whether any compression has been achieved, or whether the compression is greater than a predefined threshold). If it is determined that compression has not been successful, the method will return to analysing CA configurations as shown in FIG. 6A, and a new CA configuration is chosen for use in compressing the processing segment 203.

If none of the possible CA configurations fulfil either of the two criteria, then the processing segment 203 is not compressed and is output by the compression apparatus 105 in its original form.

In some alternative embodiments, if none of the possible CA configurations fulfil either of the two criteria, a new bit portion length is selected using one or more of the methods described above. A new CA configuration can then be chosen based on the two criteria for selecting CA configurations. In such cases, it is preferable to set a processing time limit for attempting to compress a single processing segment, where expiry of the time limit results in the processing segment 203 not being compressed and being output by the compression apparatus 105 in its original form.

Furthermore, if none of the chosen CA configurations are found to result in successful compression, the processing segment 203 is not compressed and is output by the compression apparatus 105 in its original form.

Why Combination Arrays are Used

In a similar way to assigning levels to bit portions (explained above), the level in which a CA value is placed affects how large the disambiguation value assigned to the CA value can be.

In preferred embodiments, ca values in the $1^{st}$ level (level 0) are not allocated disambiguation values, and therefore all new CA values assigned to CA values in Level 0 must be unique.

It is noted that a bit portion having only 2 levels may not be able to be compressed using only the bit portion, or using a single combination array comprising all the bits of the bit portion (unless not all bit portion values, or not all CA values, occur within the processing segment 203). In such cases dividing the bit portion up into a plurality of combination arrays can allow compression to be achieved.

It is also noted that the higher the number of levels, the more compression will be achieved, because the resulting label will be smaller.

Frequency analysis is performed on the bit portions 205. In preferred embodiments, the bit portions 205 are subdivided up into smaller combination arrays 207 and frequency analysis is also performed on these combination arrays 207. For example, the bit portion 205 may be divided up into a left hand part and a right hand part, such as combination arrays $CA_0$ and $CA_1$ in FIGS. 4B and 4C. The frequency analysis of the left hand parts (the $CA_0$ values) allows the most occurring left hand part to be determined. Similarly, the frequency analysis of the right hand parts (the $CA_1$ values) allows the most occurring right hand part to be determined.

In preferred embodiments, the labels assigned to the bit portions are not only dependent on the frequency of occurrence of the whole bit portions, but also on the frequency of occurrence of the combination arrays which make up the bit portions. Therefore, in the example where the bit portion 205 is divided up into a left hand part and a right hand part, the most occurring left hand part of the bit portion will be associated with the smallest new $CA_0$ values, and the most occurring right hand part of the bit portion will be associated with the smallest new $CA_1$ value. Typically labels generated based on analysis of combination arrays will allow greater compression than labels generated only based on analysis of bit portions.

Also, breaking up bit portions 205 into combination arrays 207 allows the header 211 to use fewer bits. For example, consider a bit portion comprising 5 bits. Table 6 illustrates two possible CA configurations which can be used for a bit portion length of 5 bits—[5,0,0,0,0] and [2,3,0,0,0].

As shown in Table 6, if a CA of length 5 bits is used, the number of possible CA values (and BP values as in this case the combination array is the same as the bit portion) is:

$$2^{LCA}=2^5=32$$

For each of the 5 combination arrays, in the biggest header format all of the possible CA values are written out in order of occurrence, and therefore the maximum number of bits used for CA values within header is 32*5=160 bits in total.

As shown in Table 6, if two CAs of length 2 and 3 bits are used, the number of possible CA values (and BP values as in this case the combination array is the same as the bit portion) for CA length 2 is:

$$2^{LCA0}=2^2=4$$

The number of possible CA values (and BP values as in this case the combination array is the same as the bit portion) for CA length 3 is:

$$2^{LCA1}=2^3=8$$

For each of the 2 $CA_0$ combination arrays, in the biggest header format all of the possible CA values are written out in order of occurrence, and therefore the maximum number of bits used for CA values within header is 32*5=160 bits in total.

Table 6 illustrates the maximum number of bits used for CA values within the header for the bit portion alone (which can considered as a combination array comprising 5 bits) and for the bit portion being divided in to two combination arrays of 2 bits and 3 bits respectively.

TABLE 6

| CA configuration | Maximum no. of bits used for CA values within header |
|---|---|
| [5,0,0,0,0] | 160 bits in total (32 * 5) |
| [2,3,0,0,0] | 32 bits in total (4 * 2) + (8 * 3) |

As can be seen in Table 6, dividing the bit portion up into combination arrays results in fewer bit being used for the CA values in the header.

Method of Assigning Labels to Bit Portion Permutations Using Combination Arrays

FIGS. 7A and 7B illustrate a first part of a method of assigning labels to the permutations of bits represented by bit portions 205, and hence to the corresponding bit portions 205, once a combination array CA configuration has been selected according to the method illustrated in FIGS. 6A to 6D.

Figure 10:
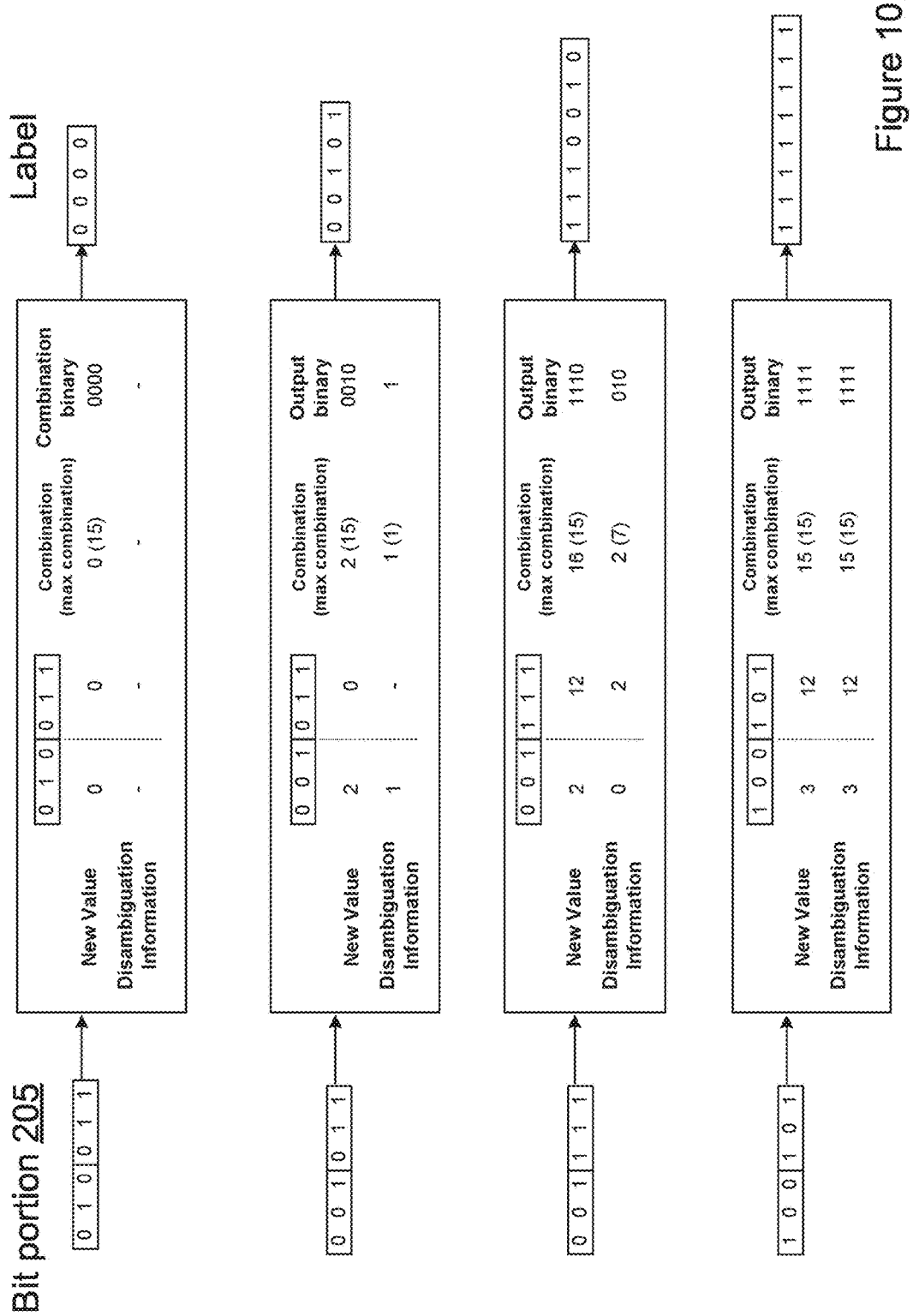
FIG. 10 illustrates how labels are assigned to bit portions.

In this example, the CA configuration 28 [3,3,0,0,0,0] was selected (as shown in FIG. 6D), which means that each bit portion 205 is split up into two combination arrays—$CA_0$ and $CA_1$. FIGS. 7A and 7B illustrate how, for each possible $CA_0$ value and each possible $CA_1$ value, a new CA value 701 and a disambiguation value 703 is assigned. FIG. 10, described below, illustrates how these new CA values 701 and disambiguation values 703 are used to generate labels for bit portion permutations.

The way in which new CA values 701 and disambiguation values 703 are assigned to CA values is similar to the way in which new BP values and disambiguation values are assigned to bit portion values, as shown in FIGS. 5B and 5C.

As stated above, the level to which a CA value is assigned affects how large the disambiguation value 703 assigned to the CA value can be.

The $CA_0$ and $CA_1$ values are initially assigned occurrence based levels, as explained above in reference to FIGS. 6B and 6C. However, in preferred embodiments, before new CA values 701 and disambiguation values 703 are assigned, the division of the $CA_0$ and $CA_1$ values into levels is optimised. The optimisation of levels for CA values follows a similar principle to optimisation of bit portion values, as described above.

A general aim of level optimisation is to ensure that the number $N_{Lev}^{CA}$ of CA values in each level is divisible by $2^{Lev}$ without remainder, where Lev is the level. This ensures efficient use of the assigned new CA values and disambiguation values.

This can be represented mathematically as:

$$N_{Lev}^{CA} \bmod 2^{Lev}=0 \qquad \text{Equation 6}$$

For example, as shown in FIG. 6B, Level 2 includes 3 CA values, so $N_{Lev}^{CA}=3$, and for Level 2, Lev=2, therefore the number $N_{Lev}^{CA}$ of CA values in the level is not divisible by $2^{Lev}$ without a remainder.

Specifically:

$$N_{Lev}^{CA} \bmod 2^{Lev}=3 \bmod 2^2=3 \bmod 4=3$$

In some examples, the condition $N_{Lev}^{CA} \bmod 2^{Lev}=0$ is satisfied by moving the highest-occurring CA values in the level from level Lev to level Lev −1. In other examples, the condition $N_{Lev}^{CA} \bmod 2^{Lev}=0$ may be satisfied by adding additional CA values to the level (e.g. the least-occurring CA value(s) from level Lev −1 are moved to level Lev).

In the present example, the least-occurring CA value, 101, from level 1 is moved to level 2.

In this way, the levels are optimised such that the number of CA values in each level is a multiple of $2^{Lev}$ or equal to $2^{Lev}$, thus satisfying $N_{Lev}^{CA} \bmod 2^{Lev}=0$.

This process of determining whether the condition $N_{Lev}^{CA} \bmod 2^{Lev}=0$ is satisfied is repeated for each level of each combination array, in this example combination arrays $CA_0$ and $CA_1$.

As described in relation to optimising levels of BP values, for level 0, $N_{Lev}^{CA} \bmod 2^{Lev}$ will always equal 0, because $2^0$ is equal to 1. Therefore, the condition $N_{Lev}^{CA} \bmod 2^{Lev}=0$ is always fulfilled for level 0, regardless of how many CA values are present in level 0.

Preferred further conditions for optimising CA levels are described below.

In FIGS. 7A and 7B, the levels of $CA_0$ and $CA_1$ are optimised using the condition above and the further preferred conditions for optimising described below.

Once the levels of $CA_0$ and $CA_1$ have been optimised, each of the $CA_0$ and $CA_1$ values can be assigned a new CA value 701 and a disambiguation value 703.

As described below, where a bit portion permutation is made up of a particular $CA_0$ value and a particular $CA_1$ value, the new CA values 701 and disambiguation values 703 associated with the $CA_0$ value and the $CA_1$ value are combined to generate a label for the bit portion value represented by that permutation.

In a simplified example, the $CA_0$ value 011 may be assigned a new CA value of 2, and a disambiguation value of 1. The $CA_1$ value 101 may be assigned a new CA value of 3, and a disambiguation value of 2.

To generate a label for the bit portion permutation 011101, the new CA values and disambiguation values for the CA values 011, 101 are combined. Specifically, new CA values 2 and 3 are combined by addition to give a combined new CA value of 5. New disambiguation values 1 and 2 are combined by addition to give a combined disambiguation value of 3. The label for bit portion permutation 011101 is created using the combined new CA value and the combined disambiguation value, so the label is 5, 3—which is preferably represented in binary, as 10111. The bit portion permutation 011101, comprising 6 bits, is therefore represented using the label 10111, which comprises 5 bits. As the label comprises fewer bits that the bit portion permutation it represents, compression is achieved for all bit portions 205 having bits arranged in that bit portion permutation.

As can be seen in FIGS. 7A and 7B, new CA values 701 are assigned based on the level a CA value is in, in a similar way to assigning new BP values as described above. As a general rule, the lower the level (where Level 0 is the lowest), the fewer CA values are assigned the same (repeated) new CA value. In this embodiment, maximum number of repetitions of a new CA value is set to be $2^{Lev}$, where Lev is the level of the CA values being assigned new values. This ensures that the maximum instance of CV values with a high frequency of occurrences is small and the maximum instance of CV values with a low frequency of occurrence is larger. For example, in level 3, the same new CA value can be assigned to up to 8 CA values.

A more general example of new CA value repetition is shown in Table 7, below.

TABLE 7

| CA Value | CA Level | New CA Value |
| --- | --- | --- |
| $a_0$ | Level 0 | $j_0$ |
| $a_1$ | Level 0 | $j_1$ |
| $a_2$ | Level 0 | $j_2$ |
| $a_3$ | Level 0 | $j_3$ |
| $a_4$ | Level 0 | $j_4$ |
| $a_5$ | Level 1 | $j_5$ |
| $a_6$ | Level 1 | $j_5$ |
| $a_7$ | Level 1 | $j_6$ |
| $a_8$ | Level 1 | $j_6$ |
| $a_9$ | Level 2 | $j_7$ |
| $a_{10}$ | Level 2 | $j_7$ |
| $a_{11}$ | Level 2 | $j_7$ |
| $a_{12}$ | Level 2 | $j_7$ |

As shown in Table 7, each new CA value is repeated $2^{Lev}$ times. In level 0, new CA values are repeated $2^0=1$ times each. In level 1, new CA values are repeated $2^1=2$ times each. In level 2, new CA values are repeated $2^2=4$ times each.

Since the assigned new CA values do not unambiguously identify an associated CA value in all cases, a disambiguation value is used to identify a particular one of the multiple CA values associated with the same new CA value.

The condition that the maximum number of repetitions of a new CA value in a level is $2^L$ev ensures that the most frequently occurring CA values are assigned the shortest disambiguation values. For example, the CA values in the first level (Level 0) are each assigned unique new values, since $2^0=1$ (as can be seen in FIGS. 7A and 7B). No disambiguation values are therefore used for CA values in level 0.

When assigning new CA values 701 to the CA values in level 1 onwards, the same new CA values 701 can be assigned to multiple CA values. Where this re-use of new CA values 701 occurs, the number of disambiguation values 703 which are needed corresponds to the number of bit portion values which have been assigned the same new bit portion value.

Considering FIG. 7A in detail, in $CA_0$ the two CA values in level 0 are assigned new CA values of 0 and 1 respectively. The instance column in FIG. 7A provides a count of new CA values, starting at 0. As can be seen from the instance column, there is only a single instance of each of the level 0 CA values. Therefore, no disambiguation information is assigned to either of the level 0 CA values.

The two CA values in level 1 are both assigned a new CA value of 2, and therefore the first (e.g. most occurring) level 1 CA value is assigned an instance value of 0 and the second (e.g. next most occurring) level 1 CA value is assigned an instance value of 1. Disambiguation values 703 are also assigned to the CA values. In this first combination array, $CA_0$, the disambiguation values can simply use the instance values, as there are no previous combination arrays to affect the disambiguation values.

In FIG. 7A there are four CA values in level 2, and therefore these CA values are all assigned a new CA value of 3, and disambiguation values of 0, 1, 2 and 3, corresponding to their instance values.

Considering FIG. 7B in detail, in $CA_1$ level 0 contains two CA values, and each is assigned a new CA value with a single instance—in this case the new CA values are 0 and 4 respectively. The two CA values in level 1 of $CA_1$ are assigned a new CA value of 8, while the four CA values in level 2 of $CA_1$ are assigned a new CA value of 12.

The new CA values assigned in $CA_0$ and $CA_1$ are selected such that any combination of new CA values from each of the combination arrays results in a unique combined new CA value.

FIGS. 8A to 8D are tables detailing possible combined new CA values with their corresponding new $CA_0$ values and new $CA_1$ values.

FIG. 8A is a table detailing every possible combination of new $CA_0$ values and new $CA_1$ values for the example illustrated in FIGS. 7A and 7B. As can be seen, the resulting combined new CA values contain no repetitions. Each combined value uniquely identifies a particular combination of a new $CA_0$ value and a new $CA_1$ value—for example the combined new CA value 7 can only be arrived at by combining new CA values 3 and 4 (using addition in this embodiment).

The new $CA_0$ values are consecutively numbered from 0 to 3, while the new $CA_1$ values are multiples of 4, from 4*0 to 4*3. As can be seen FIG. 8A, this results in efficient assigning of combined new CA values, because all the resulting values are consecutive, thus ensuring that the largest combined new CA value is as small as it can be (15 in this example).

More generally, the new CA values assigned for a combination array are multiples of the highest new CA value in the previous array+1.

FIG. 8B shows the combined new CA values for the example illustrated in FIGS. 7A and 7B in binary. The number of binary bits used to represent each of the combined new CA values is based on the size of the maximum combined new CA value, which in this example is 15. The number 15 is represented using four bits in binary (1111) and therefore all combined new CA values are represented using four bits.

FIG. 8C shows generalised new CA values for $CA_0$ and $CA_1$ where $CA_0$ is assigned new CA values from $X_0$ to $X_n$, and $CA_1$ is assigned new CA values from $Y_0$ to $Y_n$. As can be seen in FIG. 8C, in preferred embodiments the combined new CA values are generated by adding the corresponding new $CA_0$ and $CA_1$ values together.

FIG. 8D shows a further generalised way of assigning combined new CA values. In this Figure, each of the combined new CA values are unique (represented by values $z_0$ to $z_{19}$), however these values can be generated using any method and are not necessarily generated by adding together new CA values of $CA_0$ and $CA_1$.

As can be seen from FIGS. 7A and 7B, the way in which the disambiguation values 703 are assigned for a configuration array depends on the disambiguation values 703 used in the previous combination array. In FIG. 7B, the "Instance" column shows the same Instances as FIG. 7A. However, the three disambiguation value columns in FIG. 7B show how the disambiguation values of $CA_1$ change based on the previous combination array, $CA_0$.

In a similar way as described above in relation to new combination arrays, the disambiguation values of combination arrays, such as $CA_0$ and $CA_1$, are combined to generate a combined disambiguation value.

The disambiguation values assigned in $CA_0$ and $CA_1$ are selected such that any combination of disambiguation values from each of the combination arrays results in a unique combined disambiguation value. Furthermore, the disambiguation values are preferably selected such that the smallest possible integers are used as disambiguation values, while still resulting in unique combined disambiguation values.

Figure 9:
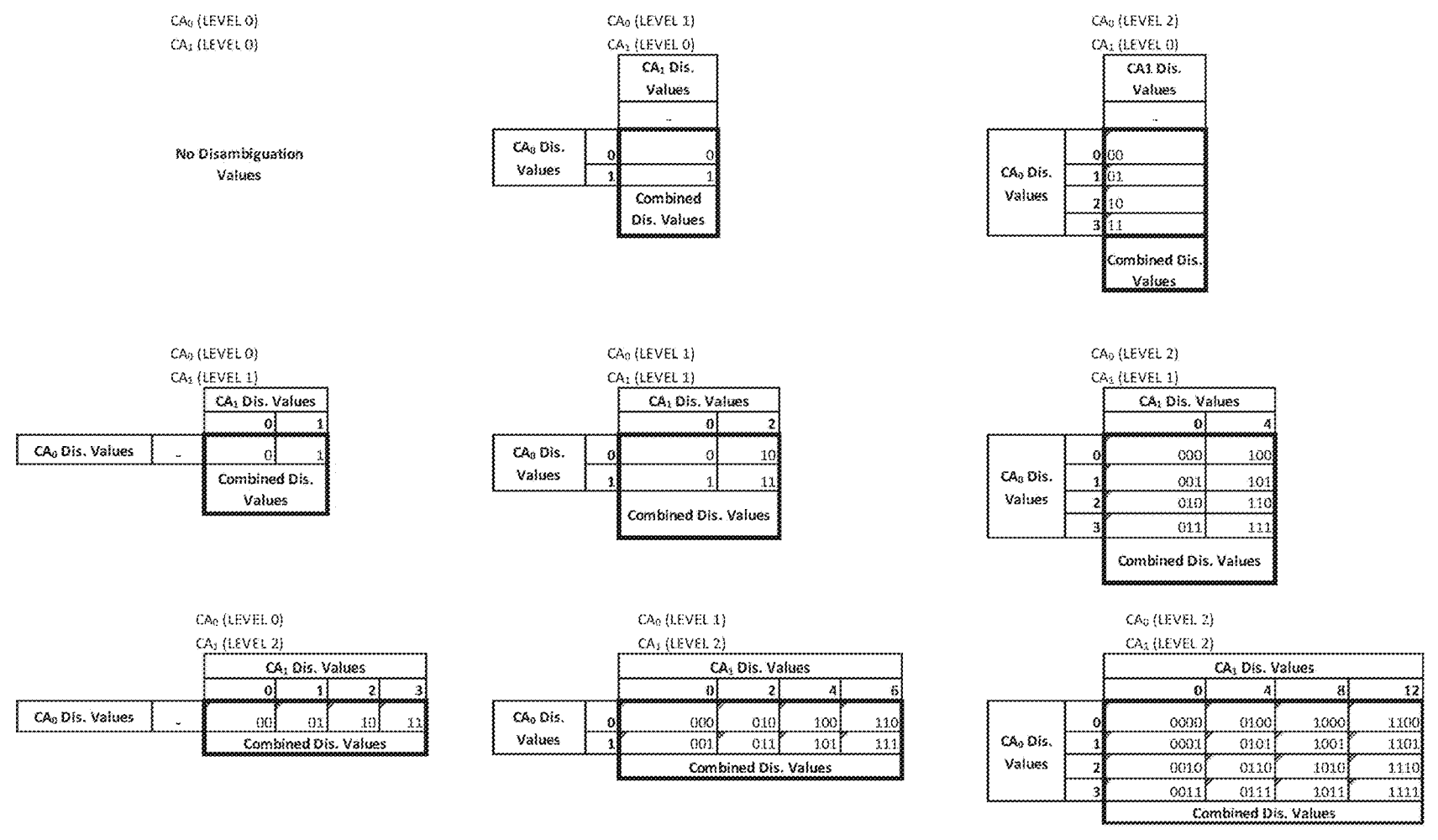

This can be seen in FIG. 9, which is a table detailing possible combination of $CA_0$ disambiguation values and $CA_1$ disambiguation values, and the resulting combined disambiguation values, represented in binary.

As can be seen, the disambiguation values associated with the combination array depends on the level of the CA values being combined.

If both of the new $CA_0$ and $CA_1$ values are in level 0, there are no disambiguation values to be combined. This means that the resulting label for the bit portion permutation corresponding to such CA values will include a combined new CA value (in this example comprising four bits) but will not include a combined disambiguation value. The new CA values in level 0 are the most occurring values and therefore this method of generating labels ensures that the bit portions comprising the most occurring CA values will be assigned the shortest labels.

In all other instances, FIG. 9 shows the possible CA disambiguation values for each combination array and the resulting combined disambiguation values for the example illustrated in FIGS. 7A and 7B.

As can be seen, the disambiguation values for $CA_0$ are 0-1 for level 1 and 0-3 for level 2. The disambiguation values for $CA_1$ for level 1 can be 0-1, 0 and 2, or 0 and 4; while for level 2 the disambiguation values can be 0-3; 0, 2, 4 and 6; or 0, 4, 8 and 12.

This ensures that all the resulting combined disambiguation values contain no repetitions. Each combined disambiguation value uniquely identifies a particular combination of a $CA_0$ disambiguation value and a $CA_1$ disambiguation value. Furthermore, as can be seen FIG. 9, this results in efficient assigning of combined disambiguation values, because all the resulting combined disambiguation values in each table of FIG. 9 are consecutive, thus ensuring that for each possible combination of disambiguation values the largest combined disambiguation value is as small as it can be (maximums may be 1, 11, 111 or 1111 in this example).

More generally, the disambiguation values assigned for the $CA_1$ combination array are multiples of the highest disambiguation value in $CA_0+1$ (with the multiples starting at 0).

The number of bits used to represent each combined disambiguation value depends on the maximum combined disambiguation value for the levels being combined. For example, combining the disambiguation value 2 from level 2 of $CA_0$ and 4 from level 2 of $CA_1$ results in a combined disambiguation value of 6 which is represented in binary using 4 bits as 0110 because the maximum combined disambiguation value for combining $CA_0$ level 2 with $CA_1$ level 2 is 15 which in binary using 4 bits is 1111. It can be seen in FIG. 9 that by adding together the levels associated with each combination array determines the length, in bits, of the combined disambiguation values, for example combining $CA_0$ level 1 with $CA_1$ level 2 results in a 3 bit disambiguation length.

Generally, the higher-occurring the CA values being combined are, the fewer bits will be present in the combined disambiguation value. As explained above, the bit portions comprising the most occurring CA values will be assigned the shortest labels, in which the labels do not include disambiguation information.

FIG. 10 illustrates how labels are assigned to bit portions permutations, by dividing the bit portion into combination arrays according to the chosen CA configuration and combining the new CA values and instance values associated with the combination array values of each of the combination arrays 207 of the bit portion 205.

As shown in the example of FIG. 10, the length of the first part (the "Combined new CA value") in bits remains constant for all bit portion values in a processing segment 203, while the length of the second part can vary, or the second part may not be used at all to identify some bit portion values.

Advantageously, using labels in which the length of the first part is constant means that during decompression the labels can be read more easily by the decompression apparatus 505, for example requiring less processing power, compared to existing compression methods which use labels which are based on prefix code alone.

This is because the decompression apparatus does not need to analyse each individual incoming bit in order to determine the division between labels. Instead, the decompression apparatus 505 can determine from the header 211 how many bits the first part of each label will comprise (for example in FIG. 10 the first part always comprises 4 bits, for instance 0000). It can also determine from the header how many instance bits (if any) will follow a first part from the value of the first part itself (e.g. first part 0010 in FIG. 10 is always followed by one bit—either a 0 or a 1).

FIG. 11 is a table listing all of the possible bit portions of length $L_{BP}$=6 bits and the labels assigned to each bit portion permutation, based on the combination arrays $CA_0$ and $CA_1$ in FIGS. 7A and 7B. As can be seen, the labels vary in length from 4 bits to 8 bits. The 4 bit labels are associated with the most occurring combined CA values, while the 8 bit labels are associated with the least occurring combined CA values. As explained above, the most occurring CA values do not have any disambiguation value assigned, and therefore the 4 bit labels associated with the most occurring combined CA values comprise only the combined new CA value part, without a combined disambiguation value part.

The labels made up of 5, 6, 7 and 8 bits all comprise a 4 bit combined new CA value part, along with a combined disambiguation value part which comprises 1, 2, 3 or 4 bits respectively.

It is noted that bit portions with 4 bit labels occur approximately twice as frequently as bit portions assigned a 5 bit label, four times as frequently as bit portions assigned a 6 bit label, eight times as frequently as bit portions assigned a 7 bit label and sixteen times as frequently as bit portions assigned an 8 bit label. This is because each additional bit in the disambiguation value represents an approximate halving of frequency of occurrence of the combined combination values. This is in turn due to the fact that the disambiguation value assigned to each CA value, for example as shown in FIGS. 7A and 7B, is based on the level of the CA value, which is determined based on frequency analysis. It is noted that the effect of optimising levels means that the halving of frequency between successive levels is only approximate.

FIGS. 12A to 12D are examples of generating new CA values (and disambiguation values) for bit portions having a bit portion length $L_{BP}$ of 8 bits, using a CA configuration of [5,3]—a five bit combination array and a three bit combination array.

FIG. 12A shows the new CA values assigned to the original CA values of the 5-bit $CA_0$ and the 3-bit $CA_1$ combination arrays. The CA values of the 5-bit $CA_0$ are divided into 3 levels, and the CA values of the 3-bit $CA_1$ are also divided into 3 levels.

FIG. 12A shows that the resulting maximum combined new CA value would be 63. This value can be representing in binary using 6 bits, and therefore the minimum bits label length is 6 bits.

The combined new CA values are generated by combining the two combination arrays—5-bit $CA_0$ and 3-bit $CA_1$—which each have 3 levels, and therefore the total number of levels in the combination arrays is 6.

FIG. 12B shows the possible disambiguation value lengths (in bits) in relation to the levels of the $CA_0$ and $CA_1$ values being combined in FIG. 12A.

It can be seen in FIG. 12B that each disambiguation value length (in bits) is the sum of levels of the CA values being combined—for example combining $CA_0$ level 1 with $CA_1$ level 2 results in a 3 bit disambiguation length.

The greatest number of bits used for the combined disambiguation values can also be determined by subtracting the number of arrays being combined from the total number of levels in the arrays. In this case, the total number of levels in the combination arrays is 6, and the number of arrays being combined is two, to the maximum combined disambiguation length is 4 (6−2=4).

As all combined CA values comprise 6 bits, the label length (in bits) is shown in FIG. 12B as the disambiguation bit length+6.

As can be seen from FIG. 12B, only 3 combinations have an label bit portion length of more bits than the input bit portion length (8 bits), meaning that 67% of the labels are either the same size or smaller than the input bit portion length.

In in FIG. 12C, the same CA configuration of [5,3] is used, however in this example the 5 bit combination array has been changed to use 4 levels instead of 3.

FIG. 12C shows that the resulting maximum combined new CA value would be 31. This value can be representing in binary using 5 bits, and therefore the minimum bits label length is 5 bits.

The combined new CA values are generated by combining the two combination arrays—5-bit $CA_0$ and 3-bit $CA_1$—which have 4 and 3 levels respectively, and therefore the total number of levels in the combination arrays is 7.

FIG. 12D shows the possible disambiguation value lengths (in bits) in relation to the levels of the $CA_0$ and $CA_1$ values being combined in FIG. 12C.

It can be seen in FIG. 12D that each disambiguation value length (in bits) is the sum of levels of the CA values being combined—for example combining $CA_0$ level 3 with $CA_1$ level 1 results in a 4 bit disambiguation length.

The greatest number of bits used for the combined disambiguation values can also be determined by subtracting the number of arrays being combined from the total number of levels in the arrays. In this case, the total number of levels in the combination arrays is 7, and the number of arrays being combined is two, to the maximum combined disambiguation length is 5 (7−2=5).

As all combined CA values comprise 5 bits, the label length (in bits) is shown in FIG. 12B as the disambiguation bit length+5.

As can be seen from FIG. 12D, only 3 combinations have an label bit portion length of more bits than the input bit portion length (8 bits), meaning that 75% of the labels are either the same size or smaller than the input bit portion length.

It is noted that even though the number of levels used for $CA_0$ in FIGS. 12C and 12D has increased from 3 to 4, the maximum label size in bits remains at 10 bits.

Preferred Conditions for Optimising CA Levels

In preferred embodiments, level optimisation is based on the following conditions.

Firstly, the number of levels in a combination array should not exceed the combination array length:

$$N_{CA}^{LevelsMAX} = L_{CA} \qquad \text{Equation 7}$$

Secondly, the number $N_{Lev}^{CA}$ of combination array values in each level should be divisible by $2^{Lev}$ $$N_{Lev}^{CA} \bmod 2^{Lev} = 0 \qquad \text{Equation 8}$$

Thirdly, the maximum new combination array value assigned to one or more values in a combination array should equal a target maximum new combination array value.

$$\text{MaxNewCAVal} = \text{TargetMaxNewCAVal} \qquad \text{Equation 9}$$

Where the target maximum new combination array value assigned to one or more combination array values is defined as follows:

$$\text{TargetMaxNewCAVal} = 2^{\lfloor \log_2(N_{CA}^{Levels}) \rfloor + 1} - 1 \qquad \text{Equation 10}$$

And the maximum new combination array value is defined as follows:

$$\text{MaxNewCAVal} = \left( \sum_{Lev=0}^{Lev=N_{CA}^{Levels}-1} \frac{N_{Lev}^{CA}}{2^{Lev}} \right) - 1 \qquad \text{Equation 11}$$

$L_{CA}$ is the combination array length in bits;
$N_{CA}^{Levels}$ is the number of levels into which the combination array values of a combination array 207 are divided;
$N_{CA}^{LevelsMAX}$ is the maximum number of levels into which the combination array values of a combination array 207 can be divided;
Lev is the level index, for example Lev=0 for level 0 and Lev=1 for level 1;
MaxNewCAVal is the maximum new combination array value assigned to one or more combination array values in a processing segment
TargetMaxNewCAVal is the target maximum new combination array value assigned to one or more bit portion values in a processing segment;
$N_{Lev}^{CA}$ is the number of combination array values in a level;

However, in some situations not all conditions can be met. For example, if only two levels are present, it may not be possible for the maximum new combination array value to equal the target maximum new combination array value, but all other conditions can be met. In such situations, for example in FIG. 5B, the combination array configuration can still be used, as compression is still achievable.

Splitting the analysed CA values into more levels generally results in a smaller maximum new value and ultimately smaller labels being assigned to bit portions.

Hard-to-Compress Data

It is possible to achieve compression using the above described methods even if the frequency of occurrence of BP/CA values is substantially even across all possible BP/CA values and thus all BP/CA values exist in the same level, so long as at least one of the BP values and/or CA values has an occurrence of 0.

Compression can be achieved in such cases by assigning one of the BP values and/or CA values to a different level (e.g. assigning the first BP/CA value to level 0 and all others to level 1). This causes the first BP and/or CA value to be assigned fewer disambiguation value bits than the remaining BP and/or CA values (for example, the BP value in level 0 may not be assigned a disambiguation value, and as a result the label assigned to the BP value in level 0 will be 1 bit in length smaller than the BP values in level 1).

For example, using a bit portion length of 8 bits, the BP value of level 0 is assigned a new BP value of 0000000 with no disambiguation information. This level 0 BP value is therefore assigned a label which is 7 bits long; 1 bit shorter than the original 8 bits of the BP value. The remaining BP values are assigned new BP values of 1-127 (0000001-1111111), each with a disambiguation value of either 0 or 1. Therefore, the level 1 new BP values are assigned labels with 8 bits, which is the same number of bits as the original BP values.

Due to the relatively small size of the header in most situations, compression can still be achieved even if BP/CA value in level 0 has exactly the same number of occurrence as all other BP/CA values. This occurs more often when using smaller bit portion lengths because the occurrence values are higher and offset the header size. It is noted that that the BP/CA values are preferable not sorted to achieve this compression, in order to avoid having to use a larger header to indicate how the BP/CA values have been sorted. Therefore, the BP/CA value assigned to a different level (e.g. level 0) need not be the most occurring.

It should be noted that for each additional BP value and/or CA value that is not in use (occurrence is 0), the compression which can be achieved increases.

For example, if two BP/CA values have an occurrence of 0, the first two BP/CA values can be assigned to level 0 and the remaining BP/CA values would be assigned to level 1. The result would be that the two new BP/CA values in level 0 are assigned labels which are 1 bit shorter than the original BP/CA values. All other BP/CA values would be assigned labels which are the same length as the original BP/CA values.

For a substantially evenly distributed processing segment, new BP/CA values and disambiguation values are assigned in the same way, until the point at which 50% of the available BP/CA values be not in use. At this point, all BP/CA values can be assigned to level 0 and compression can still be achieved.

If more than 50% of the BP/CA values have an occurrence of 0, higher compression can be achieved by assigning new BP/CA values and disambiguation values are in the same way as described above. At this point each additional BP/CA value with an occurrence of 0 can be assigned to level 0, resulting in labels which are two bits shorter. The other BP/CA values can be assigned to level 1, resulting in labels which are one bit shorter than the original BP/CA values.

TABLE 10

| Number of BP/CA values with occurrence greater than 0 in level 0 | No. of bits saved in level 0 | No. of bits saved in level 1 |
|---|---|---|
| 128 to 255 | 1 bit less | 0 bit less |
| 64 to 127 | 2 bits less | 1 bit less |
| 32 to 63 | 3 bits less | 2 bits less |
| 16 to 31 | 4 bits less | 3 bits less |
| 8 to 15 | 5 bits less | 4 bits less |
| 4 to 7 | 6 bits less | 5 bits less |
| 1 to 3 | 7 bits less | 6 bits less |

Table 10 shows the number of bits saved for a BP/CA with length of 8 bits, depending on the number of BP/CA values with occurrence greater than 0.

TABLE 11

| Bit Portion Length (in bits) | Number of different possible BP values (i.e. permutations of bits) | Expected number of occurrences of each possible BP value in a processing segment of length 64 KB |
|---|---|---|
| 1 | 2 | 262144 |
| 2 | 4 | 65536 |
| 3 | 8 | 21846 |
| 4 | 16 | 8192 |
| 5 | 32 | 3277 |
| 6 | 64 | 1366 |
| 7 | 128 | 586 |
| 8 | 256 | 256 |
| 9 | 512 | 114 |
| 10 | 1024 | 52 |
| 11 | 2048 | 24 |
| 12 | 4096 | 11 |
| 13 | 8192 | 5 |
| 14 | 16384 | 3 |
| 15 | 32768 | 2 |
| 16 | 65536 | 1 |

Table 11 shows the expected number of occurrences of each possible BP value in a processing segment of length 64 KB, where all possible BP values occur in the processing segment, and the frequency of occurrence of BP values is substantially even across all possible BP values. For example, if the bit portion length is 1, each of the possible BP values (0 and 1) would be expected to occur 262144 times in the processing segment of 65536 bytes (64 KB).

In the case where the frequency of occurrence of BP values is substantially even across all possible BP values, but at least one BP value does not occur, the number of bits which can potentially be saved is the expected number of occurrences of each possible BP value in a processing segment shown in Table 11 above (less the size of the header). For example, for a bit portion length of 3, if only 7 of the 8 possible BP values occur in the processing segment, 21846 bits could potentially be saved (less the size of the header). As long as the header does not exceed the expected number of occurrences, compression can be achieved.

The expected number of occurrences of each possible BP value in Table 11 is given by:

$$N^{BP}_{occurrences} = \frac{L_{PS}}{L_{BP} \times 2^{L_{BP}}} \quad \text{Equation 12}$$

Where:

$L_{PS}$ is the processing segment length in bits.

Table 12 shows the expected number of occurrences of each possible CA value for a bit portion length of 4 bits.

TABLE 12

| Bit Portion Length (in bits) | Combination array Length (in bits) | Number of different possible CA values (i.e. permutations of bits) | Expected number of occurrences of each possible CA value in a processing segment of length 64 KB |
|---|---|---|---|
| 4 | 1 | 2 | 65536 |
| 4 | 2 | 4 | 32768 |
| 4 | 3 | 8 | 16384 |
| 4 | 4 | 16 | 8192 |

The possible CA configuration for a bit portion length of 4 are [1,1,1,1], [1,1,2,0], [1,2,1,0], [1,3,0,0], [2,1,1,0], [2,2,0,0], [3,1,0,0], [4,0,0,0]. Therefore, as shown in Table 12, CA lengths of 1, 2, 3 and 4 are possible.

Table 12 shows the expected number of occurrences of each possible CA value in a processing segment of length 64 KB, where all possible CA values occur in the processing segment, and the frequency of occurrence of CA values is substantially even across all possible CA values. For example, if the CA length is 1, each of the possible CA values (0 and 1) would be expected to occur 65536 times in the processing segment of 65536 bytes (64 KB).

In the case where the frequency of occurrence of CA values is substantially even across all possible CA values, but in one combination array at least one CA value does not occur, the number of bits which can potentially be saved is the expected number of occurrences of each possible CA value in a processing segment shown in Table 12 above (less the size of the header). For example, for a CA length of 3, if only 7 of the 8 possible CA values of a combination array occur in the processing segment, 16384 bits could potentially be saved (less the size of the header). As long as the header does not exceed the expected number of occurrences, compression can be achieved.

The expected number of occurrences of each possible CA value in Table 12 is given by:

$$N^{CA}_{occurrences} = \frac{L_{PS}}{L_{BP} \times 2^{L_{CA}}}$$

Equation 13

Header Structure

FIGS. 13A to 13D are simplified representations of four exemplary header structures.

As stated previously, preferably, each header starts with a compression method signature, and provides information relating to the chosen bit portion length $L_{BP}$, the combination array configuration used, the size of the original processing segment 203, and information on how labels were assigned to each of the bit portions 205. FIGS. 13A to 13D are preferred header structures.

Header Format 0

As shown in FIG. 13A, the header starts with a signature. In this example, the signature is referred to as a "SISP" signature, which is an exemplary trade name for the presently described compression method. The "SISP" signature is 32 bits long.

The header also specifies the bit portion length $L_{BP}$, which in this example is allocated 4 bits in the header (and therefore, in this example, the bit portion length $L_{BP}$ can be a maximum of 16 bits). The number of bits allocated to the bit portion length $L_{BP}$ in the header may be CPU dependent.

The CA configuration is also specified in the header, which uses $L_{BP}$ bits. Preferably, the CA configuration is specified by its reference number, which (in combination with knowledge of the bit portion length $L_{BP}$) unambiguously identifies the CA configuration used to assign labels to the bit portions 205.

Furthermore, the size of the processing segment (in bytes) is specified, and in this embodiment the processing segment size can be between 0 and 65535 bytes because the length of the processing segment size part of the header is 16 bits as shown.

Also, in preferred embodiments, multiple different header formats can be used (e.g. 3). The header format can be chosen based on which will result in the smallest total header size for a processing segment. Therefore, the header includes a part comprising two bits for indicating the header choice.

As described above, the CA configuration may use any number of arrays within a range, where the range is from one array to $L_{BP}$ arrays ($L_{BP}$ arrays would occur when all arrays are one bit in size). The header contains information relating to each of the combination arrays in the combination array configuration, and therefore as a minimum the header will contain $CA_0$ information if only one array is used by the CA configuration.

In the example given in FIG. 13A, the CA configuration uses more than one array, and therefore the combination array information comprises $CA_0$ information through to $CA_n$ information.

As shown, the $CA_0$ information comprises a count for each of levels 0 to $L_{CA0}$, where the count indicates how many $CA_0$ values are present in the respective level. The count can be from level 0 to level $L_{CA0}$ because the maximum number of levels in a combination array is length of the combination array in bits ($L_{CA}$).

The $CA_0$ information further comprises a single bit indicator to indicate whether the $CA_0$ values are sorted (e.g. by frequency of occurrence).

The $CA_0$ information also comprises frequency of occurrence information, which indicates the rankings of $CA_0$ values and whether they are in use.

Specifically, if the CA values have been sorted, all possible CA values are written out in order of occurrence, including any CA values having an occurrence of 0.

If the CA values have not been sorted, then a single bit for each possible CA value is written out in unsorted order, where a value of 0 represents no occurrences of the CA value and a value of 1 represents one or more occurrences of the CA value.

As shown, the $CA_n$ information comprises the same information fields as the $CA_0$ information.

It will be appreciated that equivalent information as the $CA_0$ information and $CA_n$ information will be included in the header for any intervening combination arrays present in the CA configuration.

Header Format 1

Figure 13B:
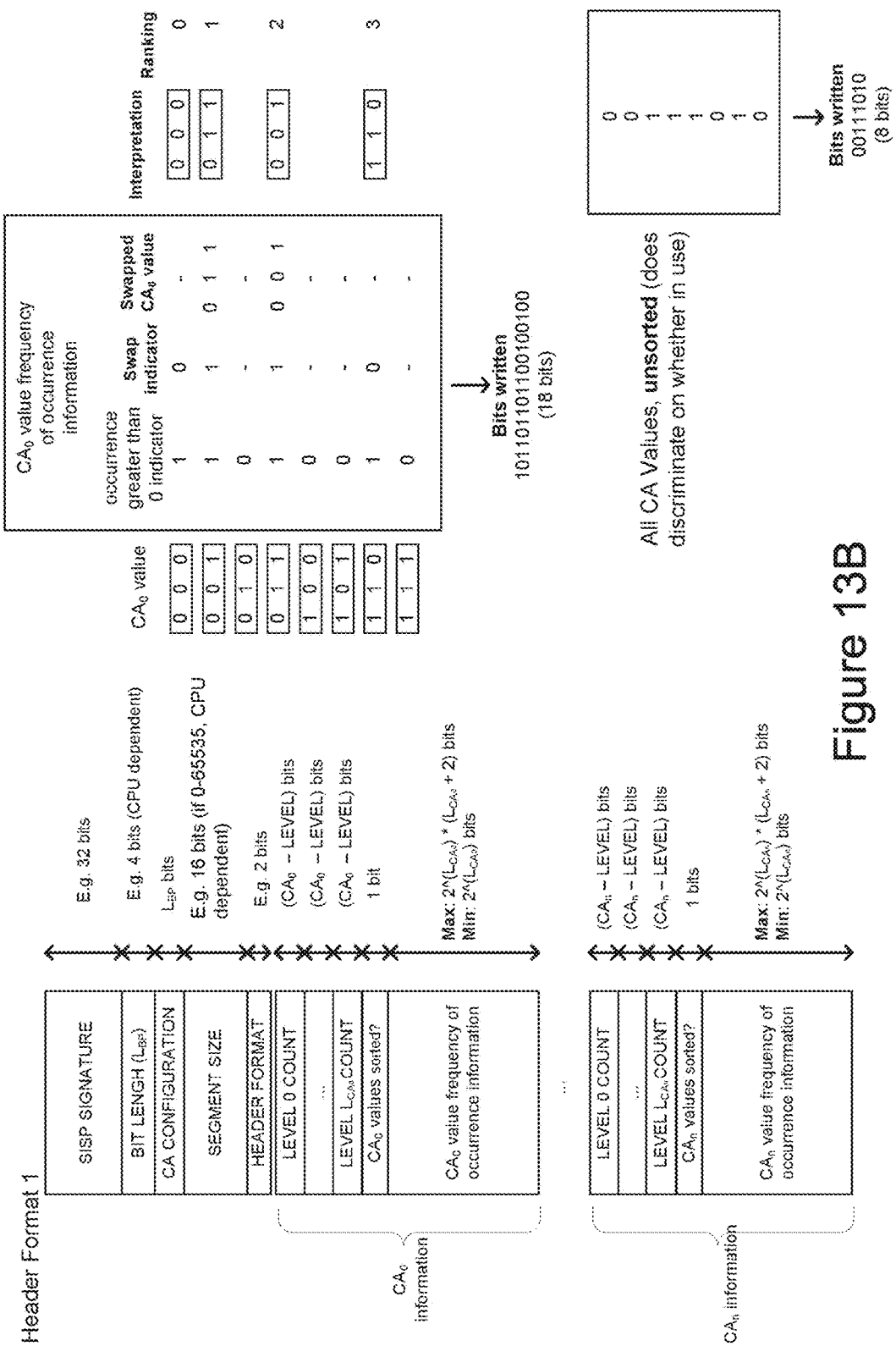

FIG. 13B illustrates header format 1. The header format contains the same parts as header format 0, with the exception of the frequency of occurrence information.

Specifically, for header format 1, if the CA values have been sorted, a single bit for each possible CA value is written out in unsorted order, where a value of 0 represents no occurrences of the CA value and a value of 1 represents one or more occurrences of the CA value. In addition to the occurrence indicating bit, additional bits may be included after this bit, depending on whether or not the occurrence is 0 and whether the CA value has been swapped with another CA value. If the occurrence of a CA value is greater than 0 and the CA value has not been swapped, a "swap indicator" bit of 0 is included after the occurrence indictor bit. If the occurrence of a CA value is greater than 0 and the CA value has been swapped, then a "swap indicator" bit is included after the occurrence indictor bit along with the swapped CA value assigned to the CA value (where the swapped CA value is represented in bits).

If the CA values have not been sorted, then a single bit for each possible CA value is written out, where a value of 0 represents no occurrences of the CA value and a value of 1 represents one or more occurrences of the CA value.

As shown, the $CA_n$ information comprises the same information fields as the $CA_0$ information.

It will be appreciated that equivalent information as the $CA_0$ information and $CA_n$ information will be included in the header for any intervening combination arrays present in the CA configuration. Advantageously, header format 1 does not write out every possible CA value in the CA value frequency of occurrence information part, and therefore the resulting header is smaller.

Header Format 2

Figure 13C:
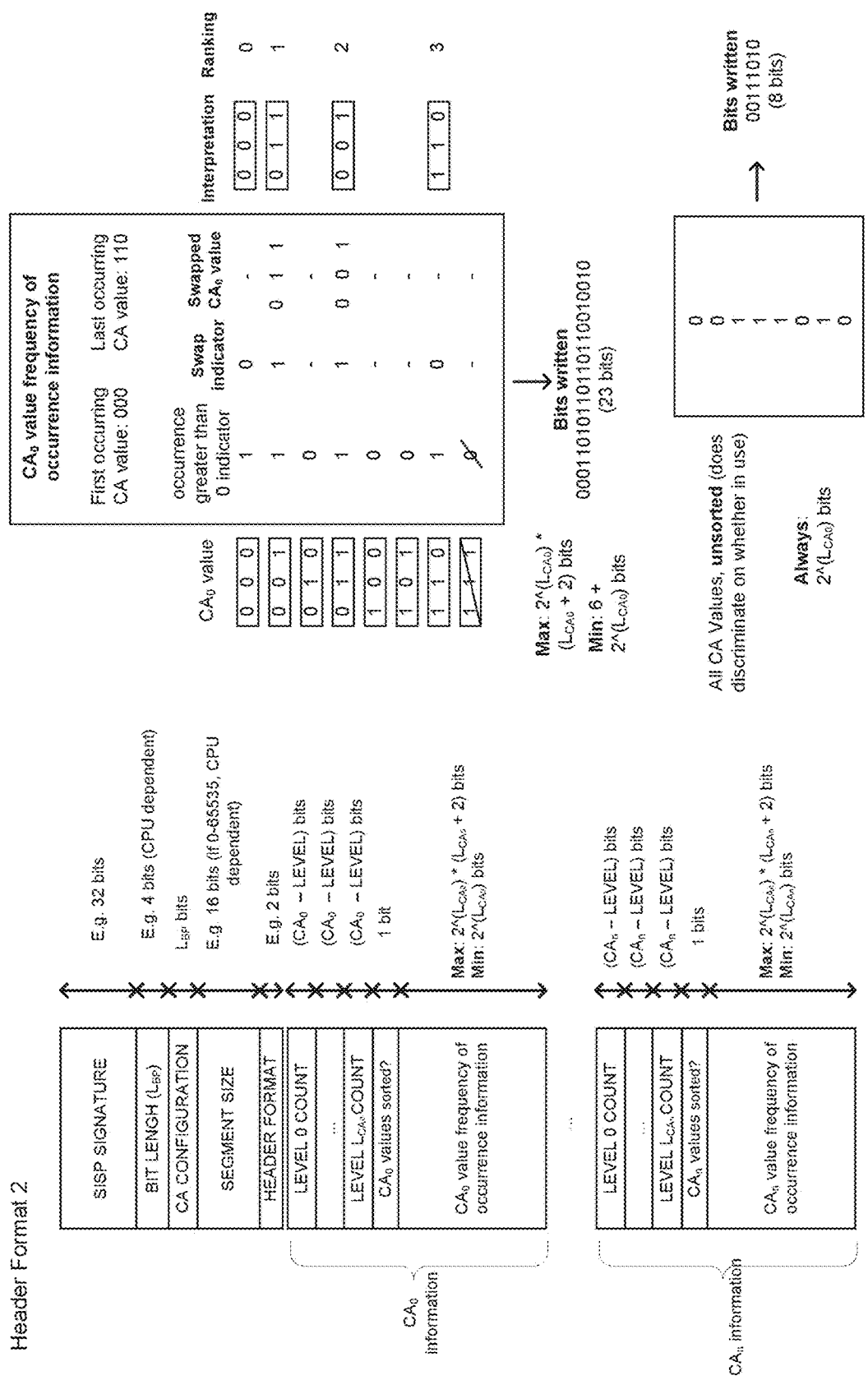
Figure 13D:
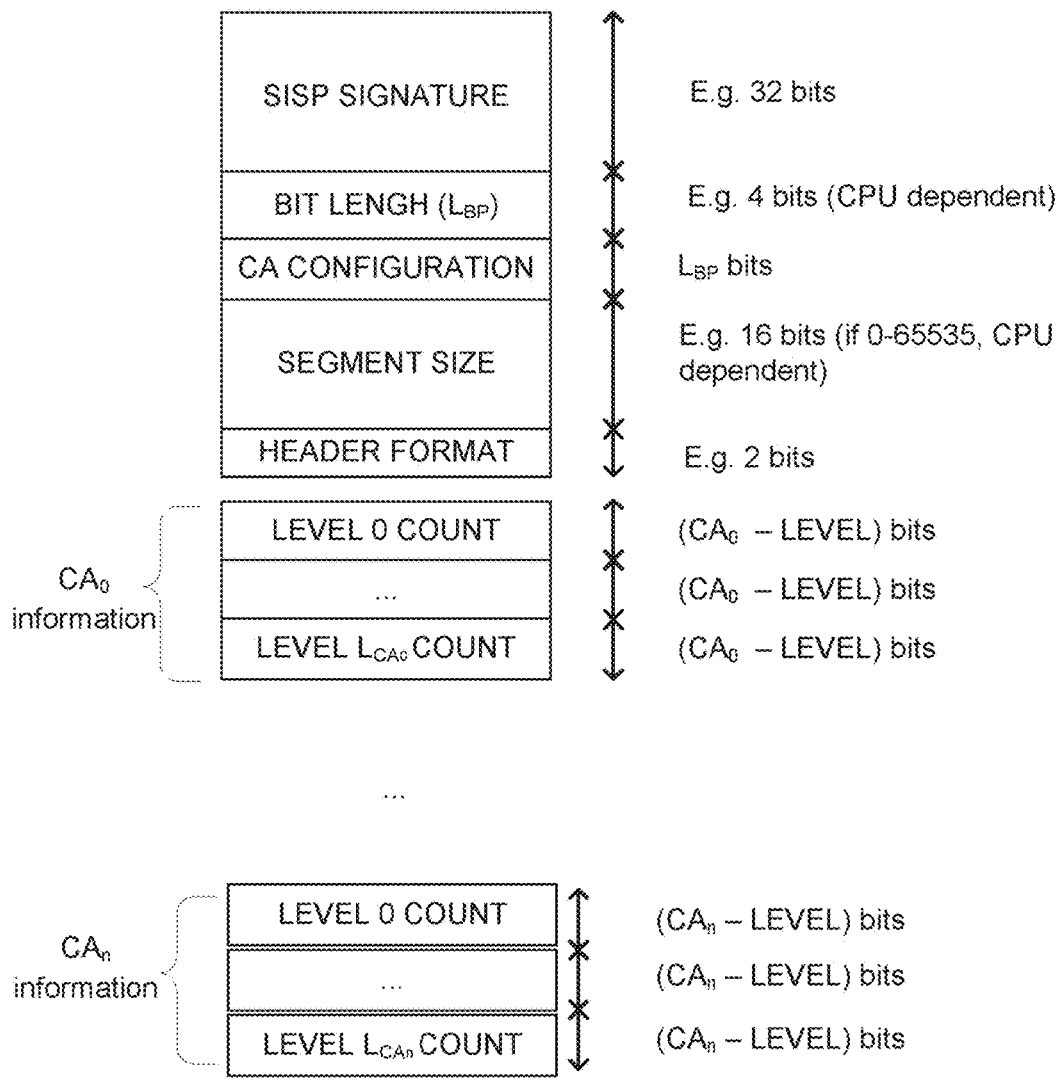

FIG. 13C illustrates header format 2. The header format contains the same parts as header format 1, with the exception that the frequency of occurrence information specifies the first occurring CA value (in this example 000) and the last occurring CA value (in this example 110), and that no information on CA values before and after these first and last occurring CA values is included.

As shown, the $CA_n$ information comprises the same information fields as the $CA_0$ information.

It will be appreciated that equivalent information as the $CA_0$ information and $CA_n$ information will be included in the header for any intervening combination arrays present in the CA configuration.

Advantageously, header format 2 does not write out every possible CA value in the CA value frequency of occurrence information part, and therefore the resulting header is smaller.

Header Format 3

FIG. 13C illustrates header format 3. This header format contains the same parts as the other header formats, with the exception that no frequency of occurrence information is included. This means that header format 3 is preferably only be used if all $CA_0$ to $CA_n$ values occur in the processing segment and no sort has occurred.

It is noted that the headers advantageously don't require the mapping between each CA (or BP) value and the corresponding new value (or label) to be written out specifically. The header instead just indicates how the permutations (BP or CA values) have been grouped, which allows a decompression apparatus to determine the mapping between each CA (or BP) value and the corresponding new value (or label).

Reprocessing Processed Segments and Associated Headers

Once all of the bit portions 205 of a processing segment 203 have been assigned labels, a processed segment 209 is output in which the bit portions are represented using their respective labels. A header 211 is output with the processed segment 209 in order to allow the processed segment 209 to be decompressed (e.g. by a decompression apparatus 505).

In preferred embodiments, the processed segment 209 and associated header 211 are then reprocessed, using the methods described above, treating the processed segment 209 and associated header 211 as a new processing segment 203. The reprocessing of the processed segment 209 and associated header 211 results in the generation of a new processed segment 209 and new associated header 211, where the total size in bits of the new processed segment 209 and new associated header 211 is less than the total size in bits of the processed segment 209 and associated header 211.

In alternative embodiments, the compressed file 202 is reprocessed, by dividing the compressed file 202 into new processing segments and performing the methods for compression described above.

Although it is recognised that generally it is not possible to recompress data using the same compression method, the methods of compression described in this application advantageously allow the way in which data is processed to be significantly varied, on the fly, (for example changing bit length, changing CA configuration, changing grouping (levels) of permutations (BP or CA values), in order to allow data to be recompressed at least once.

Alternative Method for Calculating Target Maximum BP Values and CA Values

FIG. 14 illustrates the target maximum BP and/or CA values calculated in accordance with an alternative embodiment. In this embodiment, the target maximum new bit portion value assigned to one or more bit portion values in a processing segment is defined as follows:

$$\text{TargetMaxNewBPVal} = 2^{\lfloor \log_2 \lfloor \log_2 (N_{BP}^{Present}) \rfloor \rfloor + 1} - 1 \quad \text{Equation 14}$$

$N_{BP}^{Present}$ is the number of bit portions with an occurrence greater than 0 in the processing segment.

Similarly, in this embodiment, the target maximum new CA value assigned to one or more CA values in a processing segment is defined as follows:

$$\text{TargetMaxNewCAVal} = 2^{\lfloor \log_2 \lfloor \log_2 (N_{CA}^{Present}) \rfloor \rfloor + 1} - 1 \quad \text{Equation 15}$$

$N_{CA}^{Present}$ is the number of combination arrays with an occurrence greater than 0 in the processing segment.

As can be seen from FIG. 14, in an example where only 255 out of 256 possible bit portions are present in a processing segment (where a bit portion length $L_{BP}=8$ is being used), the target maximum BP value is 7 rather than 15. Since 7 can be represented in binary using one less bit than 15, this means that the label assigned to the most occurring BP values will be one bit less.

This method of calculating the target maximum new bit portion value can advantageously achieve higher levels of compression; however it may require additional manipulation of the levels. For example, in some cases the number of levels determined using frequency analysis will be too low to achieve the target maximum new bit portion value. Therefore, in some embodiments where this method of calculating the target maximum new bit portion value is used the bit portions values may be divided into levels using methods different to those described above.

Combination Array Configuration Reference Number

As explained above, a processing segment 203 may be divided into a series of bit portions 205, and each bit portion may be divided into a plurality of combination arrays 207 according to a CA configuration.

For ease of understanding a particular CA configuration can be represented by a series of numbers within brackets, where each number represents the size of a combination array in bits, and where 0 indicates that no array is used. For example, {1, 1, 3, 1, 0, 0} denotes a bit portion 205 with a bit length of 6 comprising four combination arrays 207, the first two combination arrays comprising a single bit each, followed by a 3 bit combination array, in turn followed by another single bit array. The sum of the numbers within the brackets dictates the bit length associated with the CA configuration.

Another way of representing a particular CA configuration is using a visual mask which visually shows then number of arrays, with each array depicted using a pair of square brackets and the number of elements in the array depicted using one or more letters (in this case the letter x). Accordingly, CA configuration {1, 1, 3, 1, 0, 0} can be represented as [x][x][xxx][x].

Generally, a CA configuration defines a repeating pattern of one or more arrays which repeats every $L_{BP}$ bits.

It will be appreciated that a bit portion 205 which is not subdivide into combination arrays can also be represented as a CA configuration made up of a single array. For example, a bit portion having a bit length $L_{BP}$ of 3 can be considered a CA configuration of {3,0,0}.

FIG. 15 illustrates a number of CA configurations and associated reference numbers, or indexes. FIG. 15 shows CA configurations from CA configuration {1} which corresponds to a single array with a bit length of 1 to CA configuration {16,0,0,0,0,0,0,0,0,0,0,0,0,0,0,0} which corresponds to a single array of has a bit length of 16.

As shown in FIG. 15, each CA configuration is assigned a reference number which uniquely identifies the CA configuration, referred to as the CAref (or the "SISP Number"). CA configuration {1} is assigned a CAref of 1, while CA configuration {16,0,0,0,0,0,0,0,0,0,0,0,0,0,0,0} is assigned a CAref of 65535.

In order to map a CAref to a CA configuration, the binary representation of the CAref is used. As shown in FIG. 15, the conventional representation of binary is used, where leading zeros are omitted. The binary bits of each binary CAref indicate how to divide a series of bits into combination arrays.

Specifically, the number of bits in the CAref corresponds to the bit length, which dictates how many bits are included in each bit portion. The division between combination arrays within the bit portion is indicated by a change in value of adjacent bits (from a 0 to a 1 or vice versa). Therefore, the number of bits assigned to each combination array is indicated by how many consecutive bits have the same value.

The binary CAref can therefore be used as a mask itself which can be used to control how a bit stream is broken up into arrays.

For example, CAref 25 is 11001 in binary, which represents CA configuration {2, 2, 1, 0, 0}—i.e. a CA configuration of three arrays, comprising two bits, two bits and 1 bit respectively. This can also be represented as a visual mask, as shown in FIG. 15, as [xx][xx][x].

The bit length $L_{BP}$ of a CA configuration can also be determined from its decimal CAref directly, without converting the CAref into its binary form. The CAref can be directly mapped to the $L_{BP}$ using equation 16:

$$L_{BP} = \lfloor \log_2(\text{CAref}) + 1 \rfloor \quad \text{Equation 16}$$

Alternative Example of Dividing Data into Portions

It will be appreciated that, depending of the data being processed, certain CA configurations and bit lengths will provide better prospects for compression than others. In some examples described above, the bit length is first selected and the bit portions are then divided into combination arrays. However, in examples described below, the selection of bit length and combination array configuration is made simultaneously by analysing different combination array configurations with various bit lengths.

Figure 16:
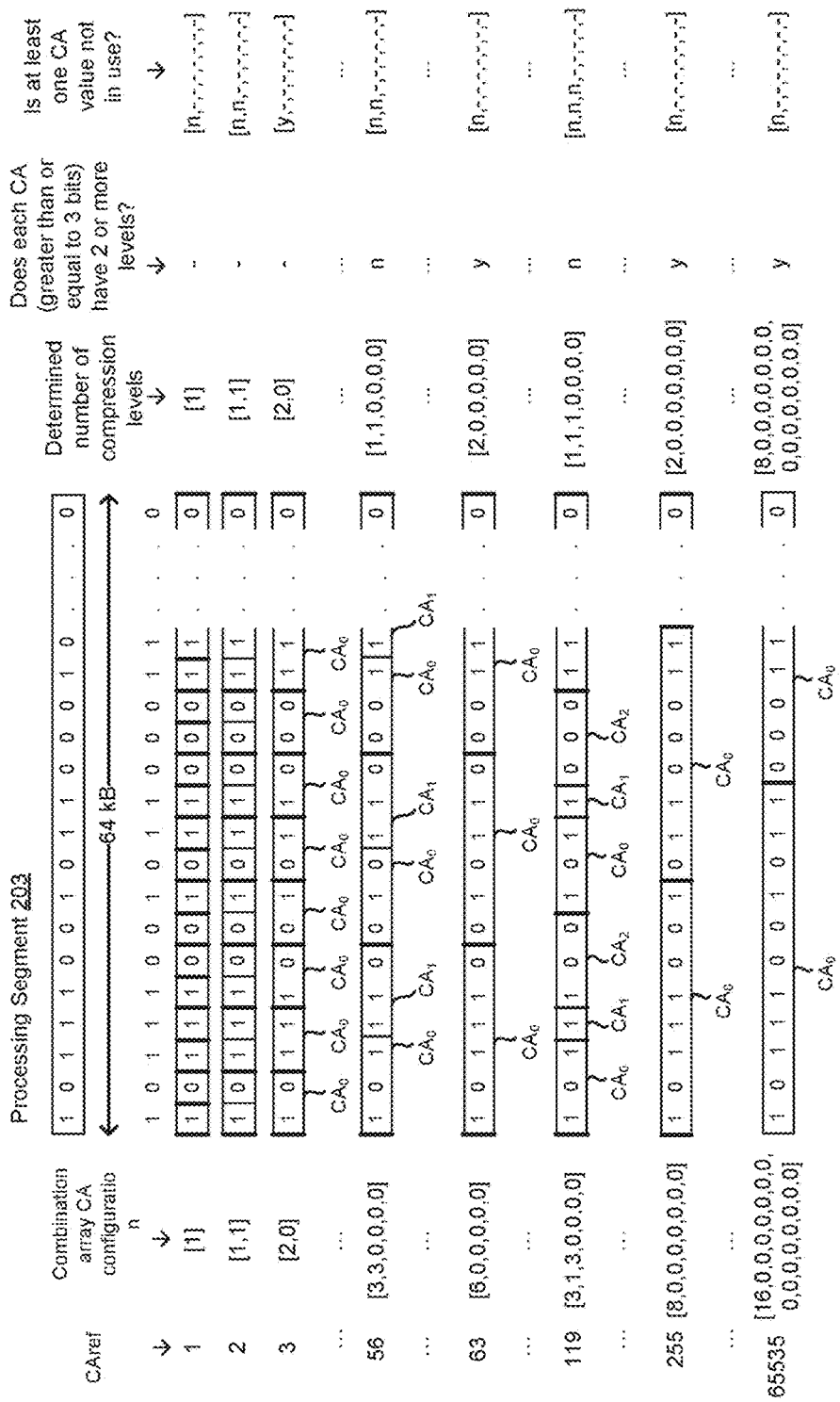
FIG. 16 illustrates a method of determining which configuration of combination arrays to use to divide up a processing segment.

FIG. 16 illustrates a method of determining which configuration of combination arrays 207 to use to divide up a processing segment 203. The method involves dividing processing segment 203 into combination arrays according to each CA configuration and performing frequency analysis on the combination arrays, in order to determine which configuration of combination arrays 207 has the best prospects for compressing the processing segment 203. As shown in FIG. 16, CA configurations of any bit length (in this case up to and including 16 bits) are analysed and the CA configuration with the best prospects for compression is selected.

In FIG. 16, instead of first selecting a bit length (using frequency analysis as explained above) and then splitting the bit length up into different combination array configurations in order to determine a suitable CA configuration, in this alternative example every different CA configuration of every bit length is tested until a CA configuration which fulfils a predetermined processing criterion is identified.

The predetermined processing criteria which are considered are equivalent those described above with reference to FIG. 6A. The first criterion is whether the total number of levels is greater than or equal to twice the number of arrays. The second criterion is whether, for any of the combination arrays of a CA configuration, 50% or fewer of the possible combination array values occur in the processing segment 203. In other words, the second criterion is whether at least one bit value has an occurrence of 0 (i.e. there are no occurrences of the bit value within the processing segment).

It will be appreciated that when the combination arrays of a processing segments have similar frequencies of occurrence for every possible CA value, in other words where a processing segment has a relatively even distribution when divided up based on a particular CA configuration, the predetermined processing criteria are less likely to be fulfilled. Conversely, the more uneven the distribution of possible CA values, the more likely it is that a predetermined processing criterion will be fulfilled.

The method illustrated in FIG. 16 generally requires more processing to be performed before a CA configuration is selected, when compared to the method illustrated in FIGS. 6A to 6D. However, the method illustrated in FIG. 16 has the advantage that the selected CA configuration has the smallest possible bit length. Selecting a bit length before testing any CA configurations can mean that CA configurations with sufficiently uneven distributions can be missed if the distribution of the associated bit length happens to be even. For example, even if a segment split up into bit portions of bit length LBP=7 has even distribution, a CA configuration of {3,1,3} may still have a very uneven distribution.

It is noted that, in this example, the bit portion module 253 is configured to split processing segments into combination arrays.

Further Exemplary Header Structure

Figure 17:
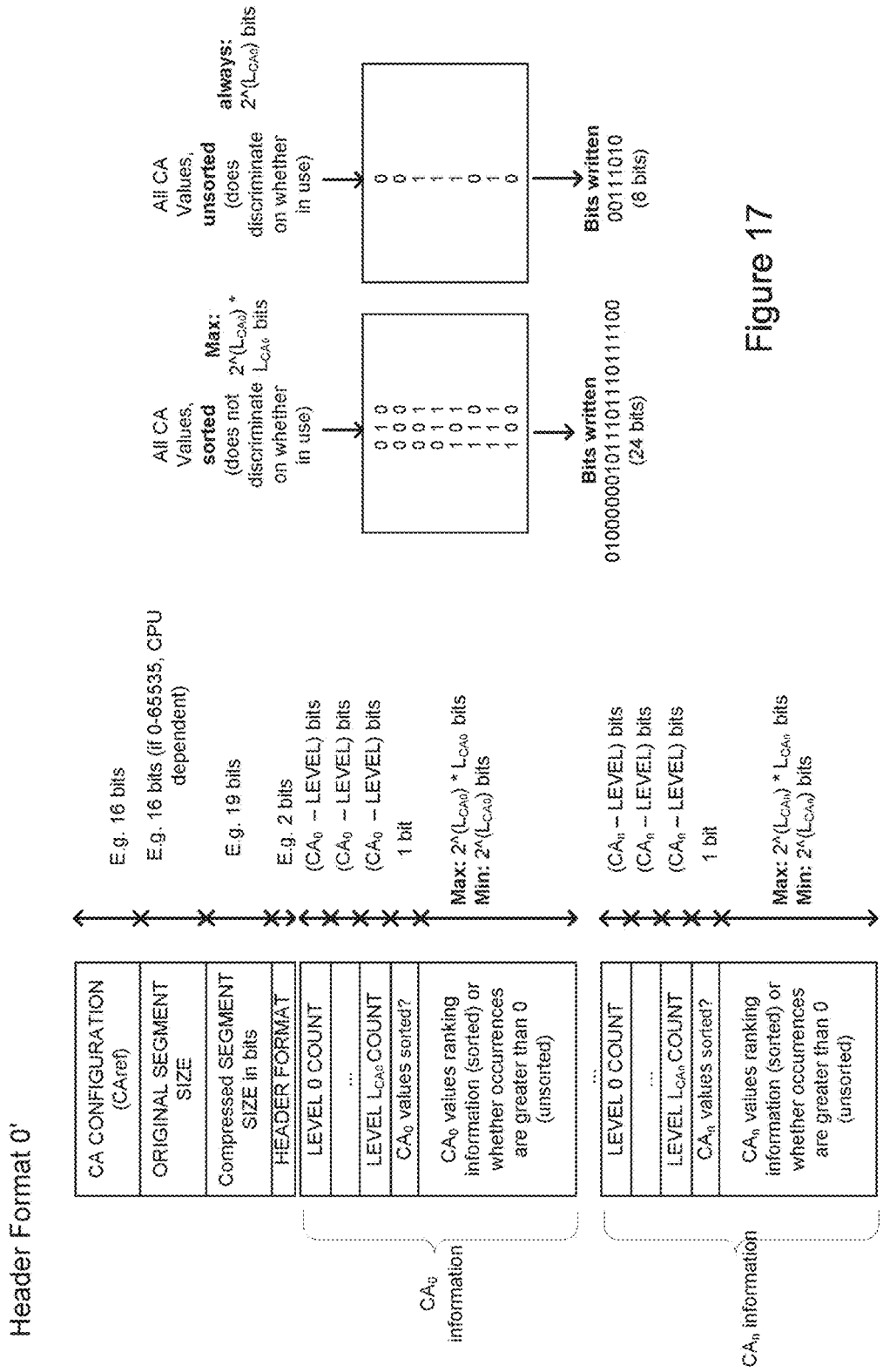
FIG. 17 is a simplified representation of a further exemplary header structure.

FIG. 17 is a simplified representation of a further exemplary header structure for use where a CAref is used to identify the CA configuration (and bit length) used in the processing of segments.

The header structure illustrated in FIG. 17 is based on the header structure shown in FIG. 13A, with some modifications, and is therefore referred to as Header Format 0'.

Unlike the header structure shown in FIG. 13A, the Header Format 0' does not include a "SISP" signature in order to decrease the size of the header.

As shown in FIG. 17, the header starts with specifying the CA Configuration used to process the processing segment, preferably in the form of a CAref as described above.

Furthermore, the size of the original processing segment (in bytes) is specified, and in this embodiment the processing segment size can be between 0 and 65535 bytes because the length of the processing segment size part of the header is 16 bits (though segments can be any size so this part of the header is not limited to 16 bits). In some examples the original processing segment size is not included.

Next, the header specifies the size of the compressed segment in bits. It is advantageous that the segment size is specified in bits because once a segment has been processed it does not necessarily includes a round number of bytes (i.e. the number of bits may not be a multiple of 8) and therefore specifying the processed segments length as a number of bit means that the end of the current processed segment and the start of the next one can be determined. It is noted that the size of the compressed segment in bits may or may not include the header size.

The other information provided in header format 0' is equivalent to that described with relation to FIG. 13A, and will therefore not be described further here.

Segment Marker

Each processing segment 203 will have particular characteristics—for example some segments will have large variations in data and some will have very little variation. The distribution of byte value occurrences (and/or bit portion value occurrences and/or combination array value occurrences) can be very even, or can be very uneven. Furthermore, some will have many bytes having low values and some will have many bytes having high values. In preferred examples, segments are assigned segment markers, herein referred to as segmarks (also referred to as SISP Signatures), where the segmark reflects to particular characteristics of the segment. In other words, the segmark represents the distribution of data values within a segment.

The segmark assigned to a processing segment 203 can be used as a pointer to a table identifying one or more CA configurations which are likely to provide good compression of the segment. Preferably, the table of CA configuration choices comprises one or more combination array configuration references (CArefs, also referred to as SISP numbers) to identify corresponding CA configurations which are likely to provide good compression of the segment. Furthermore, the segmark can be used to identify processing segments with similar characteristics, in turn identify CA configurations which achieved compression of these similar processing segments.

Segmarks comprise one or more values which reflect the data within a processing segment, such as the average byte value in the segment. The segmark can be single or multi-dimensional. FIGS. 18a, 18b, 19a-19d and 20a-20c illustrate how an exemplary segmark is determined, where the segmark comprises three values—the average byte value, the average change in byte value and the average change in occurrence of byte value within the processing segment.

FIGS. 18a and 18b show extracts from an exemplary 65536 byte processing segment. Specifically, FIG. 18a shows the values of the first 55 bytes (of the 65536 bytes in the segment), along with the change in value of each of these bytes with respect to the preceding byte. As the byte in position 0 has no preceding byte, the change in byte value is not applicable. The change in byte value is an absolute value.

In alternative examples, the change in byte value for the byte in position 0 is determined to be the same as the value of the byte in position 0. In further alternative examples, the value of the change in byte value for the byte in position 0 is 0, or half of the value of the byte in position 0.

FIG. 18b shows the number of occurrences of byte values within the segment, along with the change in number of occurrences of the byte values with respect to the preceding byte. For simplicity, FIG. 18b only shows the first 16 and last 6 byte values (0-15 and 250-255). As byte value 0 has no preceding byte value, the change in number of occurrences is not applicable. The change in number of occurrences is an absolute value.

FIGS. 19a, 19b, 19c and 19d are graphs plotting the data shown in the tables of FIGS. 18a and 18b.

Figure 19A:
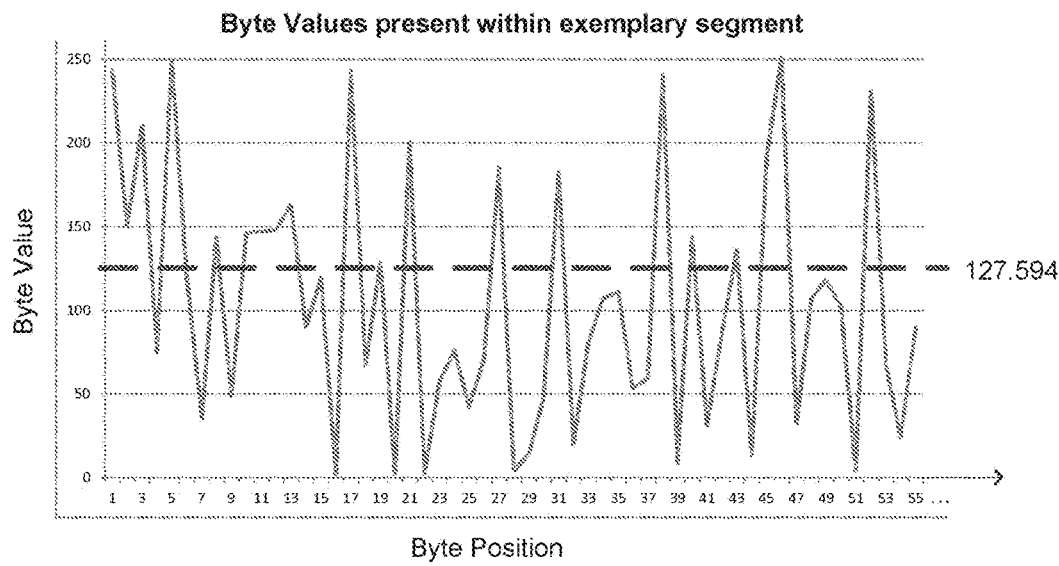
FIGS. 19a, 19b, 19c and 19d are graphs plotting the data shown in the tables of FIGS. 18a and 18b.

Specifically, FIG. 19a is a line graph plotting each byte value within the segment, against its position within the segment. The average byte value in the processing segment is 127.594, which is indicated by the dashed line in FIG. 19a. For simplicity, FIG. 19a only shows the byte values of the first 55 byte positions.

Figure 19B:
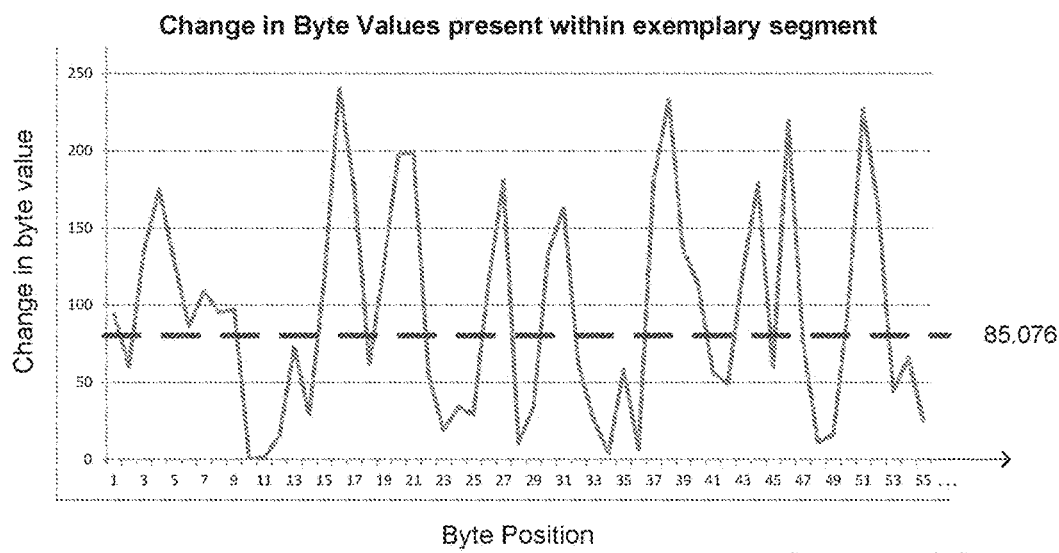

FIG. 19b is a line graph plotting the change in each byte value within the segment, against its position within the segment. The average change in byte value in the processing segment is 85.076, which is indicated by the dashed line in FIG. 19b. For simplicity, FIG. 19b only shows the change in byte values of the first 55 byte positions.

Figure 19C:
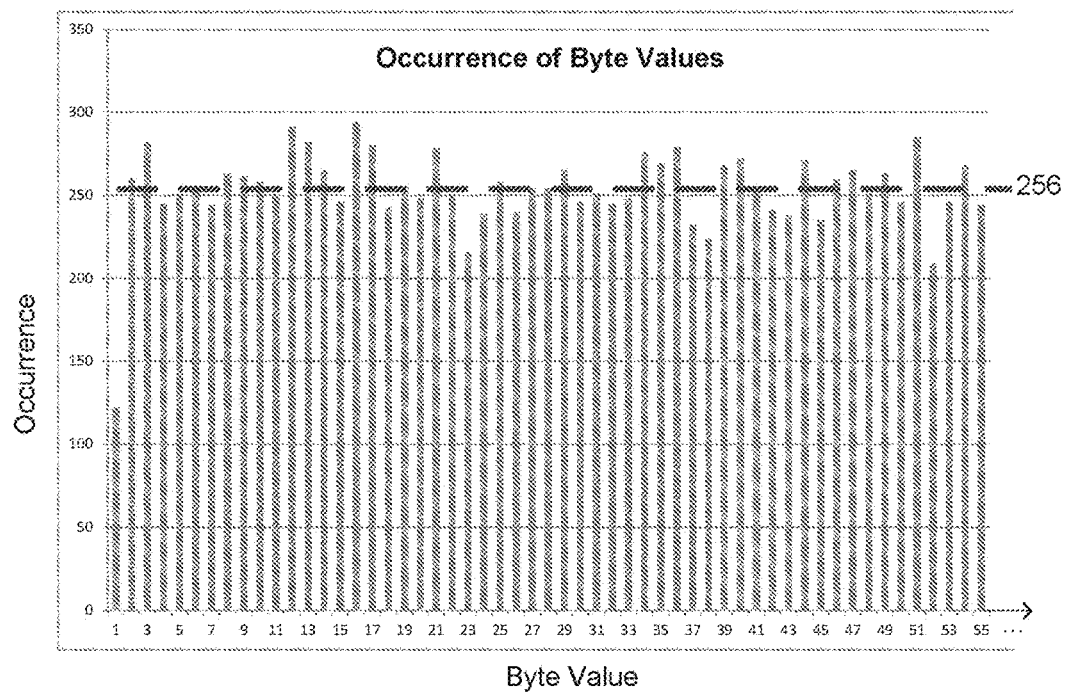

FIG. 19c is a bar graph plotting the number of occurrences of each byte value within the segment. The average occurrence is 256, which is indicated by the dashed line in FIG. 19c. For simplicity, FIG. 19c only shows the number of occurrences of the first 55 byte values.

It will be appreciated that, regardless of the number of times each particular byte occurs within a segment, the average byte value occurrence will always be the same for segments of the same size. For example, for a processing segment comprising 65536 bytes, the average byte value occurrence will always be 256 no matter what distribution. For this reason, the average byte value occurrence is not used to generate a segmark. However, the average change in occurrence can vary greatly between segments of the same size, and therefore this measurement is suitable for use in the generation of the segmark.

Figure 19D:
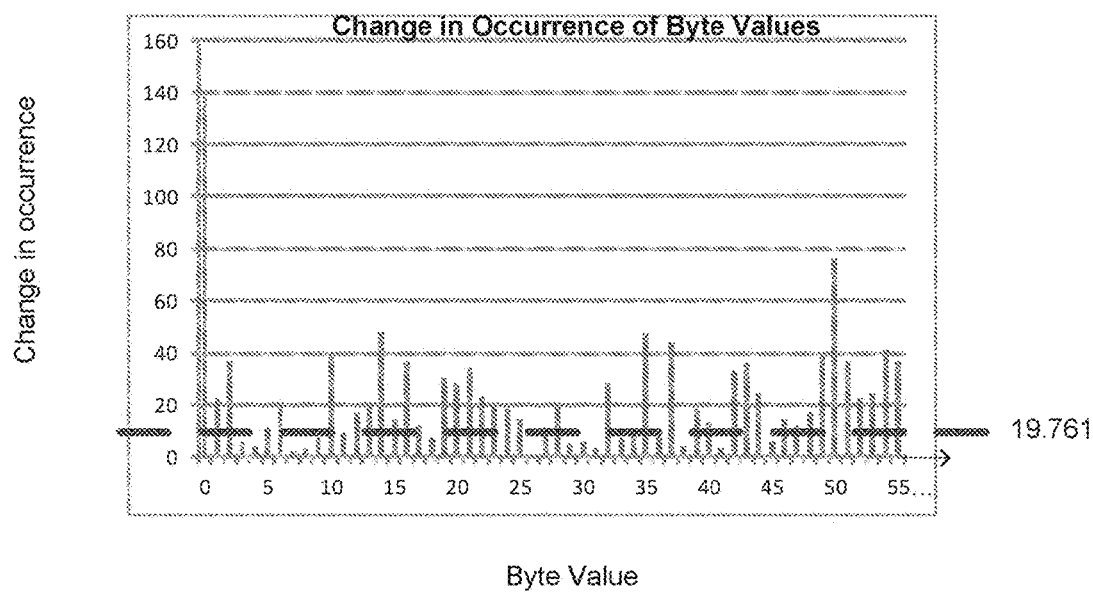

FIG. 19d is a bar graph plotting the change in number of occurrences of each byte value within the segment. The average change in occurrence is 19.761, which is indicated by the dashed line in FIG. 19d. For simplicity, FIG. 19d only shows the change in number of occurrences of the first 55 byte values.

Figure 20A:
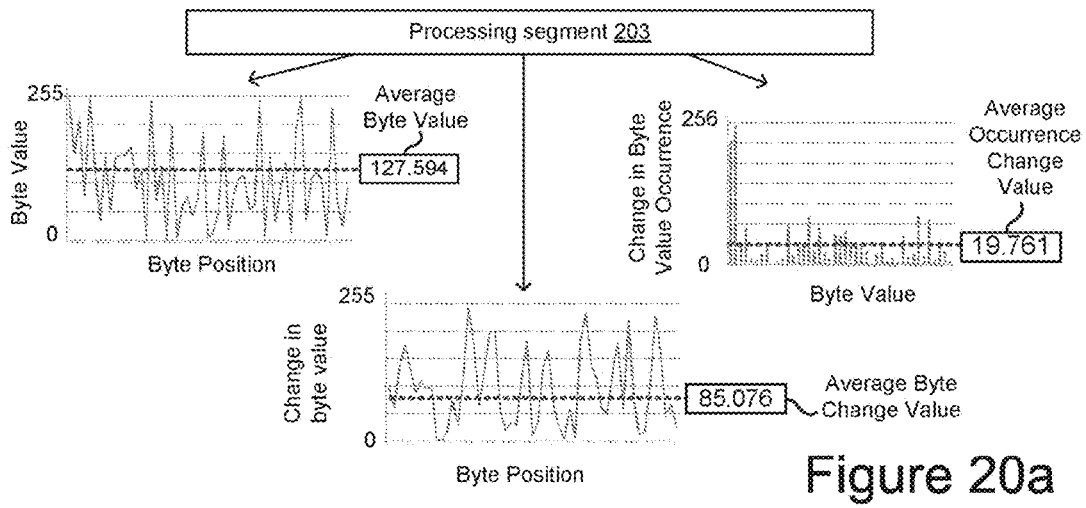
FIGS. 20a, 20b, and 20c are schematic diagrams illustrating a simplified overview of how a segment marker is generated.
Figure 20B:
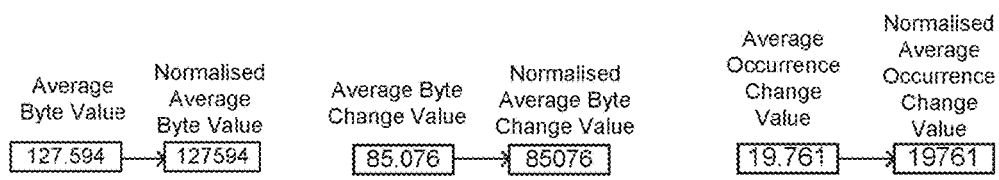
Figure 20C:
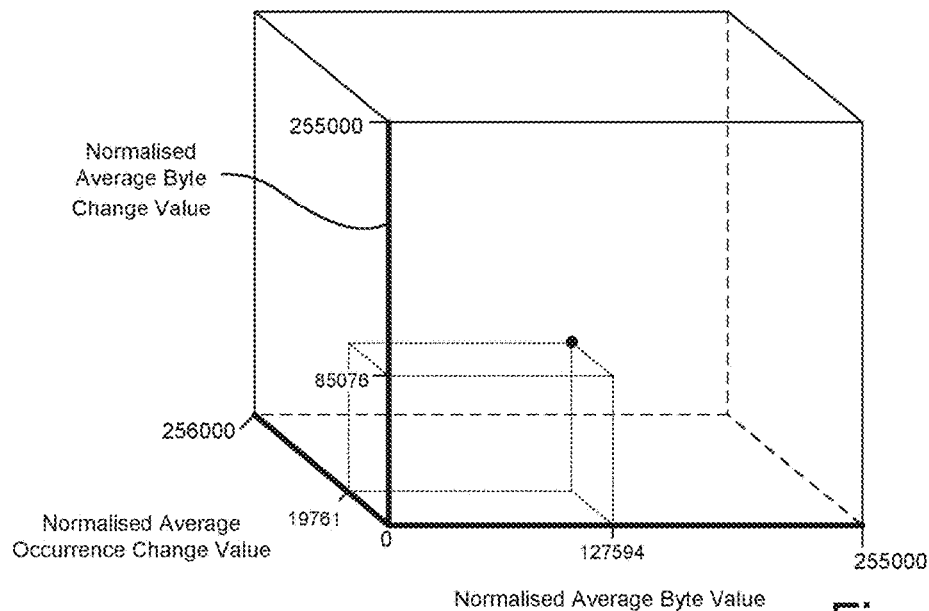

FIGS. 20a to 20c are schematic diagrams illustrating a simplified overview of how a segmark is generated. In this example, the whole processing segment is analysed to determine the average byte value, the average change in byte value, and the average change in byte value occurrence.

In FIG. 20a, the determination of these three values is represented using three graphs. The leftmost graph is a plot showing byte value for each byte position, with the average byte value of 127.594 depicted using a dotted line. The middle graph is a plot showing the change in byte value for each byte position, with the average change in byte value of 85.076 depicted using a dotted line. The rightmost graph is a plot showing the change in byte value occurrence for each byte value, with the average change in byte value occurrence of 19.761 depicted using a dotted line.

It is noted that two segments can have the same segmark (for example, this could occur if the bytes of the processing segment have the same occurrence but the order is different).

FIG. 20b shows normalisation of each of the three values used in the segmark. Normalisation is performed to make storage and comparison of segmarks easier, and can involve weighting and/or rounding of the three values. In this example, each of the values is multiplied by 1000 and converted to an integer. The number is normalised to three decimal places in order to generate a sufficiently accurate segmark, which minimises the number of segments which have the same segmark.

In this example, the total number of different possible segmarks is $1.664641*10^{16}$, which is a 17 digit number. The total number of different possible 16 bit segments is $2^{524288}$, which is approximately a 157800 digit number. Therefore, it can be seen that multiple processing segments can have the same segmark.

FIG. 20c is a visual representation of a three dimensional matrix made up of the three parameters used to define the segmark (average byte value, average change in byte value, average change in occurrence). In FIG. 20c, each of the three parameters are normalised as integers as shown in FIG. 20b. Therefore the three dimensional matrix comprises an element for every possible segmark. When a processing segment is compressed, a pointer to the CA configuration used to achieve compression can be stored in the element of the three dimensional matrix corresponding to the segmark. Additionally or alternatively, the CAref of the CA configuration is stored in the three dimensional matrix.

It is noted that a three dimensional matrix is one option for storing information relating to segmarks; however this information can be stored in any suitable way, such as in a one dimensional array.

In FIG. 20c the normalised average byte value is shown on the x axis, with a range from 0 (which would occur if every byte in the segment had a value 0) to 255000 (which would occur if every byte in the segment has a value 255).

The normalised average byte change value is shown on the y axis, with a range from 0 (which would occur if all bytes in the segment have the same size) to 255000 (which would occur if every byte in the segment changed the maximum amount with respect to the previous value—e.g. if the byte of the segment were 0, 255, 0, 255, 0, 255 . . . ).

The normalised average occurrence change value is shown on the z axis, with a range from 0 (which would occur if all bytes in the segment had the same occurrence) to 256000 (which would occur if the segment does not include any two consecutive byte values with a non-zero occurrence, or in other words if at least every other byte has an occurrence of 0). For a segment to have a normalised average occurrence change value of 256000, at least half of the bytes in the segment must have an occurrence of 0.

In FIG. 20c, the matrix element at position (127594, 85076, 19761) is represented using a solid back dot in the three-dimensional space. When the exemplary processing segment shown in FIGS. 18a and 18b is compressed, the CA configuration reference number (CAref) used to achieve compression is stored in the matrix element at position (127594, 85076, 19761).

In other non-limiting examples, values such as segment length, lowest byte value present in the segment, highest byte value present in the segment, standard deviation of byte values in the segment, one or more Fourier analysis coefficients of the bytes in the segment, may be used in addition to or instead of the three segmark values described above. Furthermore, the average deviation of byte value occurrences from the mean byte value occurrence can be used. Yet further, the coefficient of variation of bit portion (or combination array) occurrences can be used.

In this example, the segmark is generated by analysing the segment based on splitting the data into bytes. This is useful as bytes are a standard unit for processing binary data. However, it will be appreciated that the segmark can be generated based on analysis based on splitting the data into portions other than bytes—for example 16 bit portions (aka a word).

Although in this example the segmark is generated from analysing all of the bytes present in the segment, it will be appreciated that a sample of the bytes can instead be analysed.

Normally, CA configurations are tested in order of their CAref, from lowest to highest. However, if it is determined that one or more neighbouring segmarks have a successful CA reference number assigned, then the order in which CA configurations is tested is changed such that the successful CA configurations associated with neighbouring segmarks are tested first.

Using Segment Marker to Point to CA Configuration Table

FIGS. 21a to 21h illustrate the process of populating the three dimensional segmark matrix and populating an associated table of successful CA configurations.

Figures 21A, 21B:
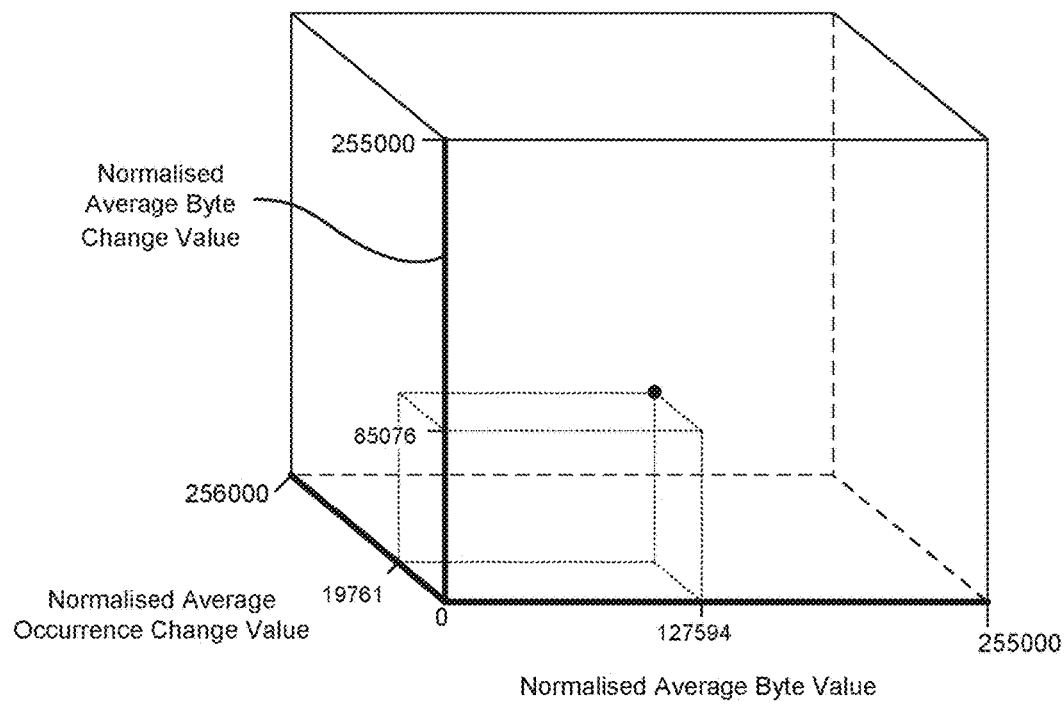
FIGS. 21a, 21b, 21c, 21d, 21e, 21f, 21g and 21h illustrate the process of populating the three dimensional segmark matrix and populating an associated table of successful CA configurations.

Initially, with reference to FIGS. 21a and 21b, a first processing segment is analysed and determined to have a segmark of (127594, 85076, 19761). In FIG. 21a, the matrix element at position (127594, 85076, 19761) is indicated in the three dimensional segmark matrix as a solid black dot.

Next, it is determined whether a processing segment having the same segmark has previously been successfully compressed. This can be established by determining whether the corresponding element of the segmark array—element (127594, 85076, 19761)—contains a pointer (e.g. a CAref) to a successful CA configuration. In this case, as the processing segment is the first to be processed, the segmark matrix is empty and the element does not contain a pointer.

If the element corresponding to the segmark does not contain a pointer, it is next determined whether any neighbouring elements contain a pointer. Again, in this case the processing segment is the first to be processed and thus no neighbouring elements contain a pointer.

The method therefore proceeds to the next step, where the processing segment is analysed based on different CA configurations in order to identify a CA configuration with good prospects for compression, and compression of the processing segment is attempted using different CA configurations until compression is achieved.

In this example, the first processing segment having is compressed using CA configuration {1,1,1,9,0,0,0,0,0,0,0, 0} which has a CAref of 2560. The CAref is therefore stored in the element (127594, 85076, 19761) of the segmark matrix.

FIG. 21b shows a table of successful CA configurations associated with the three dimensional segmark matrix of FIG. 21a. The CA configuration table is made up of 65536 rows, with each row corresponding to a CAref, and 65536 columns, with each column corresponding to a successful compression of a processing segment.

Each CAref stored in the segmark matrix is used as a pointer to the corresponding row of the CA configuration table. Therefore, the CAref 2560 points to row 2560 of the CA configuration table. The CAref of the CA configuration used to achieve compression, CAref 2560, is then stored in the CA configuration table, in the first available element in row 2560, which in this case is the element in the column labelled "success 1".

Figures 21C, 21D:
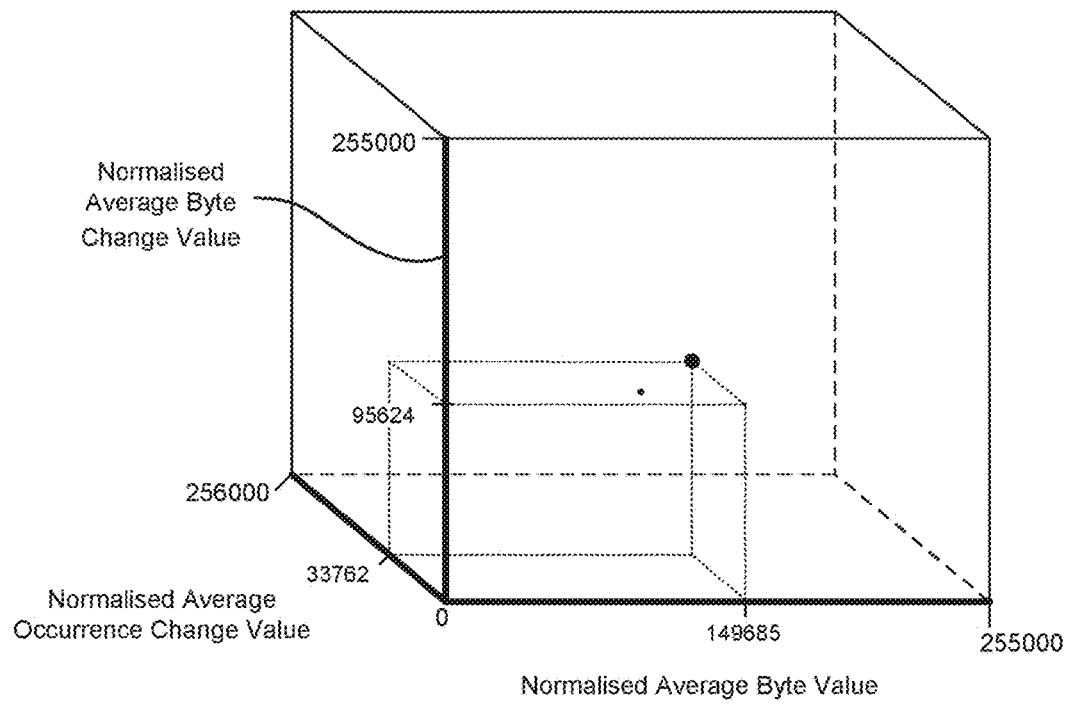

Next, referring to FIGS. 21c and 21d, a second processing segment is analysed to determine its segmark and processed to compress the segment.

In this example, the second processing segment is analysed and determined to have a segmark of (149685, 95624, 33762). As shown in FIG. 21c, the segmark matrix element of the second processing segment at position (149685, 95624, 33762) is indicated in the three dimensional segmark matrix as a solid black dot. The segmark matrix element of the first processing segment is indicated using a smaller black dot.

In the same way as before, it is then determined whether a processing segment having the same segmark has previously been successfully compressed. This can be established by determining whether the segmark matrix element of the second processing segment—element (149685, 95624, 33762)—contains a pointer (e.g. a CAref) to a successful CA configuration. In this case, the segmark matrix element of the second processing segment does not contain a pointer.

Therefore, it is next determined whether any neighbouring elements contain a pointer. In this case, the segmark matrix element of the first processing segment (the smaller black dot) is considered to be a neighbouring element, and this element contains a pointer to row 2560 of the CA configuration table. The CArefs stored in row 2560, in this case the single CAref 2560, can then be used to attempt compression of the second processing segment, preferably only if the CA configuration corresponding to CA ref 2560 is determined to fulfil at least one predetermined processing criteria.

In this example, the CA configuration corresponding to CAref 2560 fails to achieve compression of the second processing segment. As a result, the second processing segment is analysed based on different CA configurations in order to identify a CA configuration with good prospects for compression, and compression of the processing segment is attempted using different CA configurations until compression is achieved.

In this example, the second processing segment is compressed using CA configuration {1,1,1,7,2,0,0,0,0,0,0,0} which has a CAref of 2563. The CAref is therefore stored in the element (149685, 95624, 33762) of the segmark matrix.

Referring to FIG. 21d, the CAref 2563 points to row 2563 of the CA configuration table. The CAref of the CA configuration used to achieve compression, CAref 2563, is then stored in the CA configuration table, in the first available element in row 2563, which in this case is the element in the column labelled "success 1".

Figures 21E, 21F:
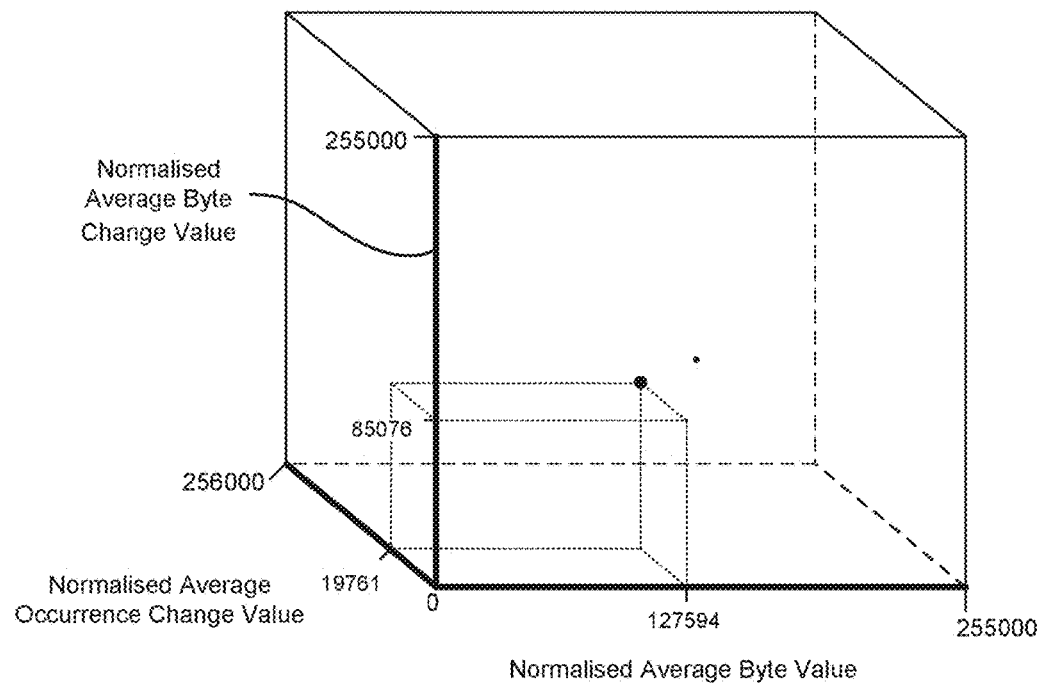

Next, referring to FIGS. 21e and 21f, a third processing segment is analysed to determine its segmark and processed to compress the segment.

In this example, the third processing segment is analysed and determined to have the same segmark as the first processing segment—a segmark of (127594, 85076, 19761). As shown in FIG. 21e, the segmark matrix element of the third processing segment at position (127594, 85076, 19761) is indicated in the three dimensional segmark matrix as a solid black dot. The segmark matrix element of the second processing segment is indicated using a smaller black dot.

In the same way as before, it is then determined whether a processing segment having the same segmark has previously been successfully compressed. This can be established by determining whether the segmark matrix element of the third processing segment—element (127594, 85076, 19761)—contains a pointer (e.g. a CAref) to a successful CA configuration. In this case, the segmark matrix element of the third processing segment does contain a pointer to row 2560 of the CA configuration table.

In this example, the CA configuration corresponding to CAref 2560 fails to @@achieve compression of the third processing segment. As a result, the third processing segment is analysed based on different CA configurations in order to identify a CA configuration with good prospects for compression, and compression of the processing segment is attempted using different CA configurations until compression is achieved.

In this example, the third processing segment is compressed using CA configuration CA configuration of {2,3, 4,1,2,2,0,0,0,0,0,0,0} which has a CAref of 12780. As shown in FIG. 21f, this CAref is stored in the next available element of row 2560 of the CA configuration table, which in this case is the element in the column labelled "success 2".

Figures 21G, 21H:
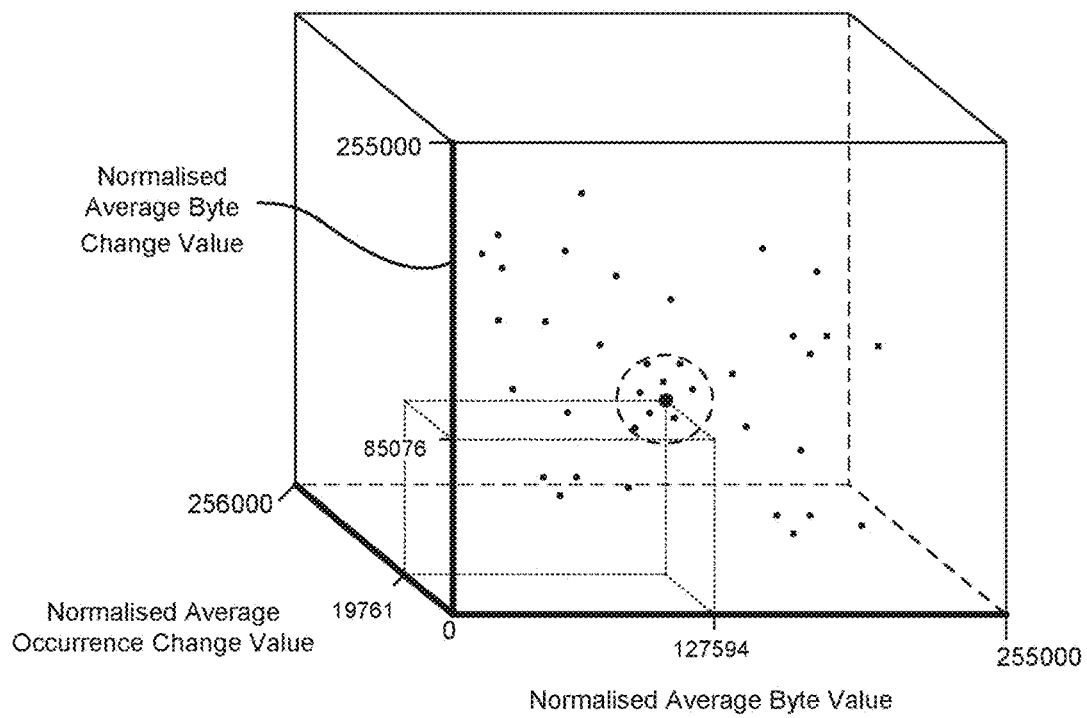

FIGS. 21g and 21h show the three dimensional segmark matrix and associated table of successful CA configurations once they have both been populated with numerous values.

As shown in FIG. 21g, neighbouring elements can be defined as elements within a certain volume of the three dimensional matrix space. This is indicated in FIG. 21g as a sphere surrounding a particular element, represented as a dashed circular line with a larger solid dot at its centre. The sphere contains eight neighbouring elements, represented as smaller solid dots.

In some examples, neighbouring elements to a segmark matrix element are considered to be a predefined number of the closest elements in 3D space, e.g. the closest eight elements. In other examples, neighbouring elements can be considered to be all elements within a certain distance. The analysis of how close neighbouring elements are can be performed using known cluster analysis methods.

Using segmarks as described above can advantageously increase the speed in which CA configurations that achieve compression are identified.

Fourier Analysis to determine Processing Configuration

Figures 22A, 22B, 22C:
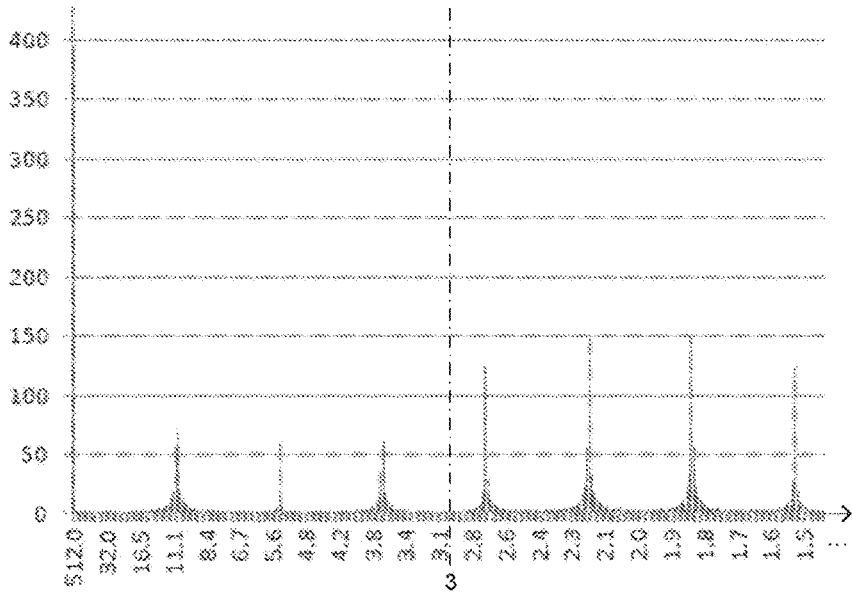
FIGS. 22a, 22b and 22c illustrate schematically steps of a method of analysing a processing segment using Fourier analysis to determine a bit length $L_{BP}$ to use in splitting up the processing segment into bit portions and/or combination arrays.

FIGS. 22a, 22b and 22c illustrate schematically steps of a method of analysing a processing segment using Fourier analysis to determine a bit length $L_{BP}$ to use in splitting up the processing segment into bit portions and/or combination arrays. Obtained Fourier coefficients can be used as guidance as to which CA configurations are likely to yield good compression.

FIG. 22a shows an exemplary processing segment 203, in this case made up of 512 bits, although it will be appreciated that typical processing segments contain significantly more bits.

FIG. 22b shows a sample of the bit values in the segment, in this case the first 55 bits, plotted as bit value versus bit position. Many bit portions have some degree of bit pattern repetition at one or more frequencies. FIG. 22b shows that this exemplary segment includes a bit pattern which repeats every 11 bits.

FIG. 22c is a graph illustrating the results of a Fourier analysis of the exemplary processing segment 203. In this example, a fast Fourier transform (FFT) has been performed on the bit values of the exemplary processing segment 203. The resulting FFT amplitude is plotted against bit length, which is equivalent the period (i.e. 1/frequency). As can be seen from FIG. 22c, a series of peaks in amplitude is typically obtained, which correspond to Fourier coefficients. A peak can indicate the existence of repeating patterns at a particular bit length. In this case, a large peak is present at a bit length of 512, which is the total number of bits in the processing segment, and therefore in this case can be disregarded. The next peak, occurring at a bit length of 11, indicates that some degree of repetition occurs every 11 bits. As stated above, this reflects the bit pattern which repeats every 11 bits.

Therefore, combination arrays (or bit portions) with a bit length of 11 are determined to have good potential for compressing the processing segment.

The next peak occurs at a bit length of 5.5 bits, and a subsequent peak occurs at 3.6 bits. In this example, the nearest integer bit length of a peak amplitude is considered as a candidate bit length. Accordingly, in this case bit lengths of 6 and 4 are also considered as candidate bit lengths, in addition to a bit length of 11. It is noted that the nearest integer bit lengths both above and below a peak value may be considered.

In some examples, peaks can be identified by determining the average of all obtained Fourier amplitudes and then identifying amplitude values which are at least twice the average amplitude.

Preferably, any peaks occurring at a bit length of less than three bits are ignored because compression is less likely to be successful at bit lengths of less than three bits (as explained above).

Optimising Binary Values Assigned to New CA Values (Recompression Index)

FIG. 23a is a table showing every possible 4 bit binary value from 0000 to 1111, in which a recompression index is assigned to each binary value. The recompression index indicates how compressible the binary value is; for example binary value 0001 has a recompression index of 3, indicating relatively good compressibility, while binary value 1011 has a recompression index of 12, indicating relatively poor compressibility.

In the examples described above, each CA value is assigned a new CA value, and the new CA values of different arrays are combined to give combined new CA values. This can be seen in FIGS. 8a to 8d. For example, if two combination arrays are being combined, the original CA values 100 and 010 may be assigned new CA values 2 and 8, resulting in a combined new CA value of 10. The assigned binary label for the combined new CA value would, according to the examples described above, be 1010 (i.e. the binary representation of 10). However, in this preferred example, the assigned binary label for each of the combined new CA values is optimised such that the combined new CA values associated with the highest occurring CA values are assigned binary labels which have the best prospects for recompression, e.g. higher levels of statistical redundancy. This is achieved by analysing all relevant binary values and determining a "recompression index" for each binary value.

The recompression index is calculated by determining how many times strings of consecutive repeated bits occurs within the binary value. The minimum length of repeated bits which is analysed is two bits, and the maximum is the bit length of the maximum combined new CA value being considered. Considering FIG. 23a, all 4 bit binary values are listed in the leftmost column and their respective recompression indices are listed in the rightmost column. The 4 bit binary values are sorted based on the recompression index, from low to high. Binary values with better prospects for recompression have a lower recompression index, and binary values with more prospects for recompression have a higher recompression index.

The intermediate columns show how the recompression index is calculated. The column entitled "2 Bit Reps." lists the number of repetitions of 2 consecutive identical bits in the binary value. For example, the binary value 0001 contains two pairs of consecutive O's and no pairs of consecutive 1's (in this example the two pairs can be shown as *00*01 and 0*00*1). Therefore, the repetition of two consecutive bits is considered to be 2 for the binary value 0001. As can be seen from FIG. 23a, the number of repetitions of three and four consecutive identical bits is also determined for each bit value. The two, three and four bit repetitions are then summed to give a repetition tally. As can be seen, some of the repetition tallies are the same, in which case the binary values are sorted by their own relative value, from low to high. Each of the sorted four bit binary values is then assigned a recompression index, from 0 to 15. In this way, binary values with better prospects for recompression have a lower recompression index, and binary values with more prospects for recompression have a higher recompression index.

FIG. 23b is a table showing the previously described standardised binary values associated with combined new CA values 0-15 along with the optimised binary values which are assigned to combined new CA values. The optimised binary values are assigned using the recompression index, where in this example the optimised binary value assigned to the new CA value is the optimised binary value having a recompression index which matches the combined new CA value.

FIGS. 24a and 24b are equivalent to FIGS. 23a and 23b, but instead show how binary values with a bit length of 6 are optimised. These optimised binary values are used for combined new CA values where the maximum combined new CA value is between 32 and 63, e.g. a number which is normally represented using 6 bits.

Hard-to-Compress Segments

An advantage of the present invention is that it can be used to compress data which is usually considered hard to compress. Specifically, data which is more evenly distributed is harder to compress.

The present invention can vary the bit length of bit portions used to process data in order to capitalise on variations in distribution depending on the bit length being used. FIGS. 25a, 25b, 26, 27a to 27d and 28a to 28d illustrate how a segment can have a relatively even distribution when divided up into bit portions of some bit lengths, but a relatively uneven distribution when divided up into bit portions of other bit lengths.

Figures 25A, 25B, 26:
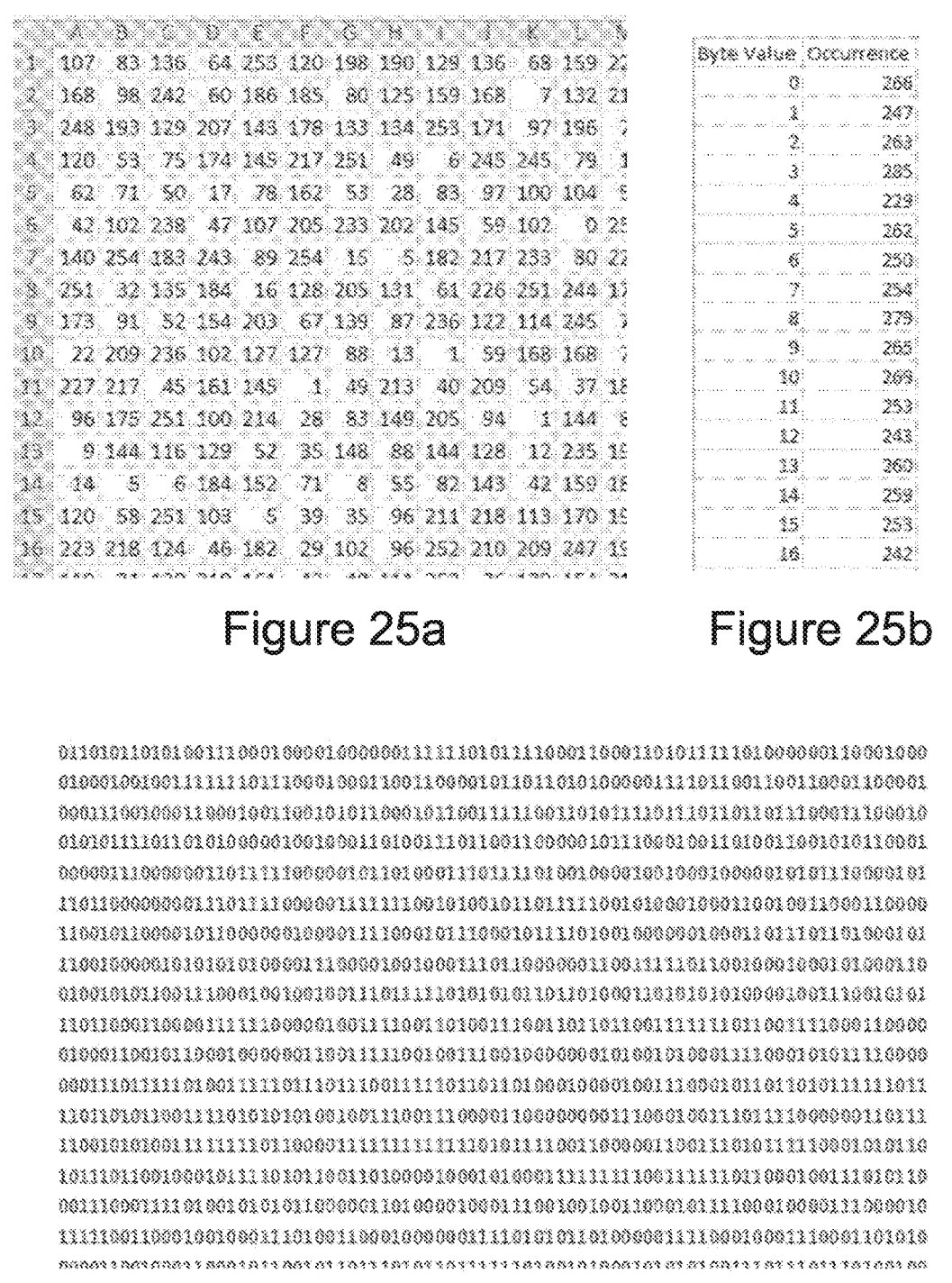

FIG. 25a is an extract from an exemplary array which represents a segment of randomly organised and evenly distributed data. In this example, the array comprises 65536 elements, each element representing a byte (i.e. 8 bits), so in this instance the array includes 65536 bytes having values between 0 and 255. It will be appreciated that the array could comprise any number of elements and the elements can represent any number of bits. FIG. 25b is a table showing the number of occurrences, within the segment, of the first 17 byte values (from 0 to 16). As can be seen from FIG. 25b, the occurrence of each byte is similar, with the occurrences in the table of FIG. 25b ranging from 229 to 285. This represents a reasonably even distribution.

FIG. 26 is an extract from the exemplary array of FIG. 25a written as a binary stream.

Figures 27A, 27B, 27C, 27D, 28A, 28B, 28C, 28D:
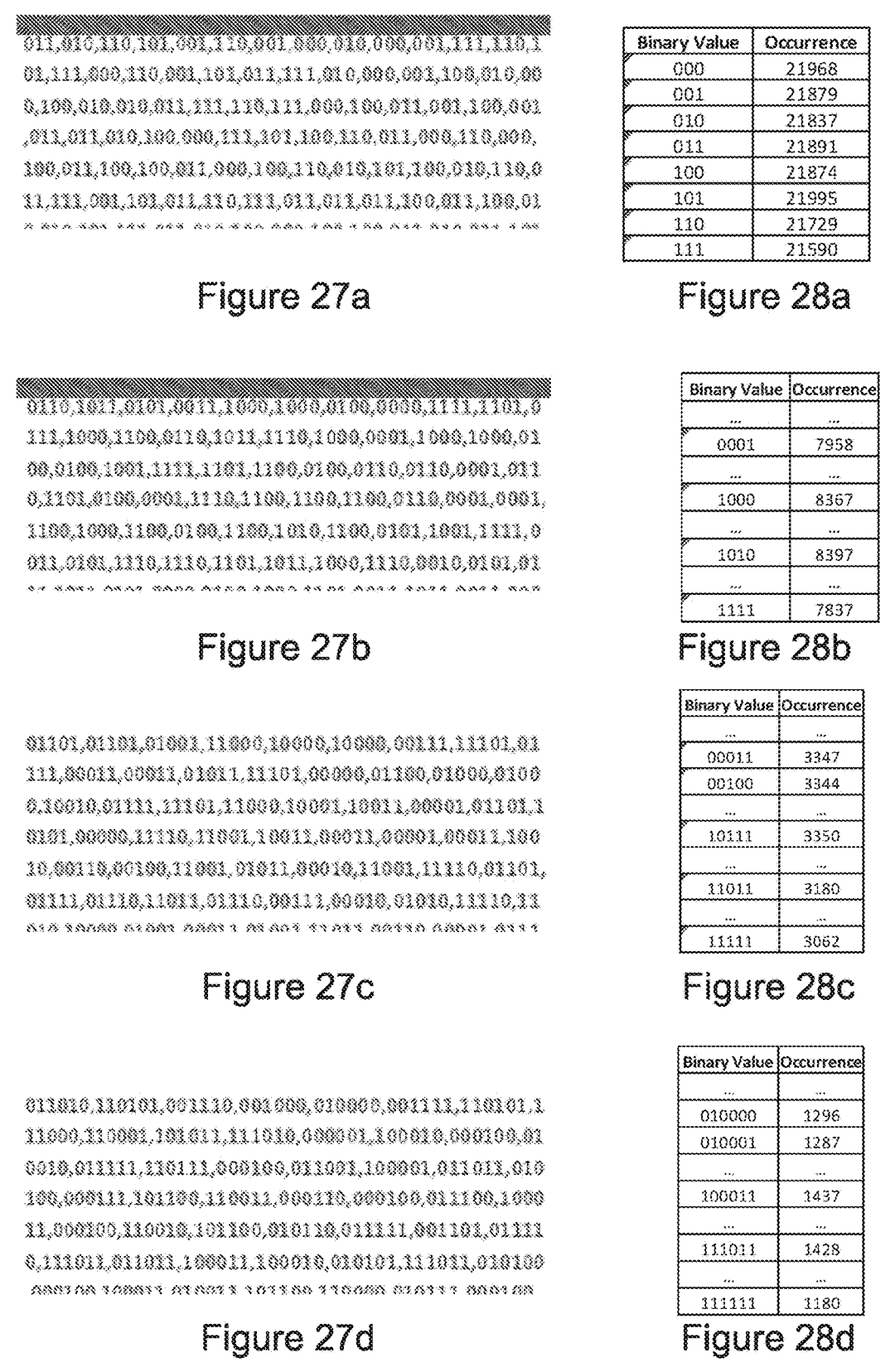

FIGS. 27a to 27d are extracts from the exemplary array of FIG. 25a, written as a binary stream and split into bit portions having different bit lengths. In FIG. 27a the binary stream is split into bit portions having a bit lengths of 3, and in FIGS. 27b, 27c and 27d the binary stream is split into bit portions having bit lengths of 4, 5 and 6 respectively FIGS. 28a to 28d are tables showing the number of occurrences, within the segment, of a selection of bit portion values, including the portion values having the highest and lowest occurrences.

In order to quantify and compare the variability (e.g. distribution) of data in processing segments, the coefficient of variation can be used. The coefficient of variation is given by the standard deviation of the data divided by its mean, and is conventionally expressed as a percentage. For example, the coefficient of variation of occurrence of each possible byte value within a processing segment may be determined.

FIG. 28a shows the number of occurrences of each of the possible 3 bit values within the segment, when the segment is divided up into bit portions of 3 bits. As can be seen from FIG. 28a, the occurrence of each 3 bit binary value is similar, with the occurrences in the table of FIG. 28a ranging from 21590 to 21995. The average deviation of occurrences from the mean occurrence of 21845 is 122.6, and the coefficient of variation is 0.56%. Therefore, the distribution of the binary values when the segment is split up into three bits is highly evenly distributed.

FIG. 28b shows the number of occurrences of each of a selection of 4 bit values within the segment, when the segment is divided up into bit portions of 4 bits. As can be seen from FIG. 28b, the occurrence of each 4 bit binary value is similar, with the occurrences in the table of FIG. 28b ranging from 7837 to 8397. The average deviation of occurrences from the mean occurrence of 8192 is 140.0, and the coefficient of variation is 1.71%. Therefore, the distribution of the binary values when the segment is split up into 4 bits is still quite even, but less so than then the segment is split up into 4 bits.

FIG. 28c shows the number of occurrences of each of a selection of 5 bit values within the segment, when the segment is divided up into bit portions of 5 bits. As can be seen from FIG. 28c, the occurrence of each 5 bit binary value is similar, with the occurrences in the table of FIG. 28c ranging from 3062 to 3350. The average deviation of occurrences from the mean occurrence of 3277 is 72.0, and the coefficient of variation is 2.2%. Therefore, the distribution of the binary values when the segment is split up into 5 bits is less even than then the segment is split up into 3 or 4 bits.

FIG. 28d shows the number of occurrences of each of a selection of 6 bit values within the segment, when the segment is divided up into bit portions of 6 bits. As can be seen from FIG. 28d, the occurrence of each 6 bit binary value is similar, with the occurrences in the table of FIG. 28d ranging from 1180 to 1437. The average deviation of occurrences from the mean occurrence of 1365 is 64.25, and the coefficient of variation is 4.7%. Therefore, the distribution of the binary values when the segment is split up into 6 bits is less even than when the segment is split up into 3, 4 or 5 bits.

Accordingly, the exemplary array used in FIGS. 25a, 25b, 26, 27a to 27d and 28a to 28d exhibits more even distributions when divided up into 3, 4 and 8 bit portions, but less even distributions when split up into 5 and 6 bit arrays. Therefore, a bit length of 6 can be used to process the segment using the methods described herein, and compression of the segment can be achieved.

Preferably, where data is split up into only bit portions, the standard deviation of the occurrences of all possible bit portion values (also referred to as bit portion permutations) is determined; and where data is split up into combination arrays, the standard deviation of the occurrences of all possible combination array values (also referred to as combination array permutations) is determined, As a general point, when analysing data from a typical file and considering the individual bits in the data (i.e. splitting the data up with a bit length $L_{BP}$ of 1), it is common to have a similar number of occurrences of each of the two possible bit values, 0 and 1. Therefore, at bit length 1, distribution of occurrences of across possible bit portion values tends to be very even. As the bit length increases, the distribution will become less evenly distributed across the possible bit portion values. Furthermore, when analysing data (such as processing segments), the number of levels identified in the bit portion values is related to the distribution of occurrences of bit portion (and/or combination array) values. This means that, as the bit length is increased, the number of levels identified tends to increase, up to a maximum number of levels which is equal to the bit length.

Moreover, by continuing to analyse a segment using different (generally increasing) bit lengths, a more uneven distribution can normally be identified. A bit length is considered to result in a sufficiently uneven distribution when one of the predetermined processing criteria is fulfilled. In some cases the bit length may be so long (e.g. 8 bits or more) that the associated header size would be undesirably large. In such cases, the bit portions are sub-divided into combination arrays such that an uneven distribution remains present, but the smaller size of the headers associated with the combination arrays helping to reduce the overall size of the compressed file.

Other alternative or additional predetermined processing criteria may be defined. For example, a predetermined processing criterion may be that, from analysing the coefficient of variation of bit portion (or combination array) occurrences, the coefficient of variation exceeds a threshold. The threshold may be, for example, 1%, 2%, 5%, or 10%.

A further predetermined processing criterion may be that, from analysing the average deviation of bit portion (or combination array) occurrences from the mean bit portion (or combination array) occurrence, the number of bits saved is more than the size of the header.

In some examples, the first combination arrays tested for splitting up a processing segment have a bit length which tends to provide compression—for example a bit length of 6. Optionally, particular configurations can also be tested first, such as {3, 3, 0, 0, 0, 0}, which has also been determined to frequently achieve compression.

Modifications and Alternatives

Detailed embodiments have been described above. As those skilled in the art will appreciate, a number of modifications and alternatives can be made to the above embodiments whilst still benefiting from the inventions embodied therein.

Although it is described above that a "file" is compressed, it will be appreciated that any data may be compressed using the same methods as described.

The processing segments 203 can have different sizes to one another even when forming part of the same file. In one example this allows the final segment 203 of a file 201 to have a smaller size than the other segments, avoiding the need to use padding bits/bytes. In other examples the size of the processing segments 203 can be chosen using a similar method to that used to choose the size of bit portions 205.

The bit portions 205 are generally all of the same size within a processing segment 203; however in some embodiments the bit portions 205 may be of different sizes (i.e. have different bit portion lengths) within a processing segment 203.

In some alternative embodiments, each bit portion corresponds to a byte (i.e. 8 bits) of the processing segment, and there is no further division of the bit portions into combination arrays.

In some embodiments, different bit portions of the same processing segment may be divided into different configurations of combination arrays, which allows further exploitation of patterns, repetition and/or redundancy in a processing segment 203.

Although FIG. 3A shows the frequency analysis starting with a bit portion length of 2 bits, it can start at any bit portion length, for example 1 bit or 3 bits.

In other alternative embodiments, the target maximum new bit portion value assigned to one or more bit portion values in a processing segment is defined as follows:

$$TargetMaxNewBPVal = L_{BP} - \left\lfloor \frac{N_{BP}^{Levels}}{2} \right\rfloor$$

Similarly, in this embodiment, the target maximum new CA value assigned to one or more CA values in a processing segment is defined as follows:

$$TargetMaxNewCAVal = L_{CA} - \left\lfloor \frac{N_{CA}^{Levels}}{2} \right\rfloor$$

This method of calculating the target maximum new bit portion value and/or new CA value is simpler and therefore the calculation can be made more quickly and/or using less processing power, although the level of compression achieved may not always be as high.

In some alternative embodiments, the labels assigned to bit portions may be configured to be larger than the bit portions themselves, for example to increase the level of encryption.

It will be appreciated by those skilled in the art that binary can be written right to left or left to right. For example, the binary string 00010 would be considered to represent the number 2 if written right to left, but would be considered to represent the number 16 if written left to right. In preferred embodiments, the binary used in the methods described above is written left to right as this can make the decompression process quicker and easier when using variable bit length. For example, writing the binary left to right can make it easier to identify any padding bits included at the end of a processing segment.

In some alternative embodiments, no extraction information is included in a compressed file. In some cases, the same configurations are used to process all processing segments, and therefore the decompression apparatus can use information corresponding to a "static header" for decompressing all processed segments. In some alternative embodiments, extraction information is output separately to the processed segments.

Not including a header with processed segments can be particularly advantageous when encrypting data, as the "static header" acts as a key for compression, where the key is private and only available to the compression and decompression apparatus.

In some embodiments, for example when processing large amounts of similar data, all processing segments are processed in the same way, using the same configurations, and therefore no header is guaranteed by the compression apparatus 105, and the decompression apparatus 505 decodes all processed segments 209 in the same way.

It is noted that not all permutations may be assigned labels.

In the above description, processing criteria are employed in order to select bit lengths and/or CA configurations. In some alternative examples, where segments are encrypted rather than compressed, different processing criteria may be used. For example, even there are no bit values with an occurrence of 0, a CA configuration may still be selected.

Using a variable bit length, from e.g. 2 bits up to and including all the bits of the segment, provides great flexibility in achieving compression. For example, if a segment is highly ordered such that the first half of the segment comprises one repeating pattern and the second half of the segment comprises another repeating pattern, then a longer bit length can be used in order to achieve optimal compression.

Typically, each segment may comprise, for example, 65536 bytes when using a maximum bit length of 16 bits (n.b. 16 bits provides 65536 different combinations). This segment size is preferred because it optimises the balance between making sure the segment is small enough to find patterns or redundancy within the data, and large enough to ensure that the header size isn't too large in proportion to the segment.

It is noted that splitting segments up into CA configurations which include only one and/or two bit arrays is less likely to achieve compression unless at least one CA value has no occurrences.

As described above with reference to FIG. 13A, if the CA values have been sorted, in the header (e.g. header format 0) all possible CA values are written out in order of occurrence, including any CA values having an occurrence of 0.

In alternative examples, the order of the sorted CA values can be indicated in the header without writing out all the possible CA values in order of occurrence. Instead, each possible way of arranging the CA values is assigned an index, and the index corresponding to the arrangement of CA values in the sorted CA values is included in the header. The number of bits in the index is less than the number of bits required to write out all the possible CA values in order of occurrence. This can be seen in table 13, below.

TABLE 13

| CA value arrangement | Index (decimal) | Index (binary) |
| --- | --- | --- |
| 00,01,10,11 | 0 | 00000 |
| 00,01,11,10 | 1 | 00001 |
| 00,10,01,11 | 2 | 00010 |
| 00,10,11,01 | 3 | 00011 |
| 00,11,01,10 | 4 | 00100 |
| 00,11,10,01 | 5 | 00101 |
| 01,00,10,11 | 6 | 00110 |
| 01,00,11,10 | 7 | 00111 |
| 01,10,00,11 | 8 | 01000 |
| 01,10,11,00 | 9 | 01001 |
| 01,11,00,10 | 10 | 01010 |
| 01,11,10,00 | 11 | 01011 |
| 10,00,01,11 | 12 | 01100 |
| 10,00,11,01 | 13 | 01101 |
| 10,01,00,11 | 14 | 01110 |
| 10,01,11,00 | 15 | 01111 |
| 10,11,00,01 | 16 | 10000 |
| 10,11,01,00 | 17 | 10001 |
| 11,00,01,10 | 18 | 10010 |
| 11,00,10,01 | 19 | 10011 |
| 11,01,00,10 | 20 | 10100 |
| 11,01,10,00 | 21 | 10101 |
| 11,10,00,01 | 22 | 10110 |
| 11,10,01,00 | 23 | 10111 |

Table 13 shows all the possible ways of arranging the two-bit CA values 00, 01, 10, 11 (without repetition). As can be seen, there are 24 different arrangements of these two-bit CA values. This is due to the fact that there are four different two-bit CA values, and the number of permutations of four options is 4!=4*3*2*1. More generally, if a is the number of bits in a CA value, the number of possible permutations P without repetition is:

$$P=2^a!$$ Equation 17

Various other modifications will be apparent to those skilled in the art and will not be described in further detail here.

What is claimed is:

1. A method of processing data comprising an input sequence of bits, the method comprising the steps of:
   dividing the input sequence of bits into a plurality of portions;
   respectively sub-dividing each portion into a plurality of sub-divisions comprising at least a first sub-division and a second sub-division, wherein each sub-division of the plurality of sub-divisions comprises at least one bit, wherein the at least one bit of each first sub-division is arranged in a respective first sub-division permutation, and wherein the at least one bit of each second sub-division is arranged in a respective second sub-division permutation;

performing frequency analysis:
- to determine, for each of a plurality of possible first sub-division permutations, how many times, within said input sequence of bits, a portion comprises a first sub-division having bits arranged in that possible first sub-division permutation; and
- to determine, for each of a plurality of possible second sub-division permutations, how many times, within said input sequence of bits, a portion comprises a second sub-division having bits arranged in that possible second sub-division permutation; and forming a processed sequence of bits based on said frequency analysis;

wherein said forming a processed sequence of bits further comprises including extraction information in the processed sequence of bits, said extraction information for use in reconstructing said input sequence of bits from said processed sequence of bits; and wherein the extraction information comprises at least one of:
- first sub-division order information identifying an ordered sequence comprising each possible first sub-division permutation arranged in order of how many times, within said input sequence of bits, a portion comprises a first sub-division having bits arranged in that possible first sub-division permutation; and
- second sub-division order information identifying an ordered sequence comprising each possible second sub-division permutation arranged in order of how many times, within said input sequence of bits, a portion comprises a second sub-division having bits arranged in that possible second sub-division permutation; and wherein the at least one of said first sub-division order information and said second sub-division order information comprises an index value, representing the order of the corresponding ordered sequence, based on a preconfigured mapping between said index value and the order of the corresponding ordered sequence.

2. A method according to claim 1, wherein said extraction information is configured for use in identifying how the said plurality of possible first (or second) sub-division permutations are grouped into sets.

3. A method according to claim 2, wherein said extraction information identifies how many first (or second) sub-division permutations each set comprises.

4. A method according to claim 3, wherein the extraction information is further configured to identify how each portion is sub-divided into a plurality of sub-divisions.

5. A method according to claim 4, wherein the extraction information is further configured to identify how many bits each first sub-division comprises and how many bits each second sub-division comprises.

6. A method according to 3, wherein the extraction information is further configured to identify how many bits the input sequence of bits comprises.

7. A method according to claim 2, wherein the extraction information is further configured to identify how each portion is sub-divided into a plurality of sub-divisions.

8. A method according to claim 7, wherein the extraction information is further configured to identify how many bits each first sub-division comprises and how many bits each second sub-division comprises.

9. A method according to claim 2, wherein the extraction information is further configured to identify how many bits the input sequence of bits comprises.

10. A method according to claim 1, wherein the extraction information is further configured to identify how each portion is sub-divided into a plurality of sub-divisions.

11. A method according to claim 10, wherein the extraction information is further configured to identify how many bits each first sub-division comprises and how many bits each second sub-division comprises.

12. A method according to claim 11, wherein the extraction information is further configured to identify how many bits the input sequence of bits comprises.

13. A method according to claim 10, wherein the extraction information is further configured to identify how many bits the input sequence of bits comprises.

14. A method according to claim 1, wherein the extraction information is further configured to identify how many bits the input sequence of bits comprises.

* * * * *